(12) United States Patent
Xu

(10) Patent No.: US 11,210,377 B2
(45) Date of Patent: Dec. 28, 2021

(54) FINGERPRINT RECOGNITION METHOD AND TERMINAL DEVICE

(71) Applicant: Huawei Technologies Co., Ltd., Shenzhen (CN)

(72) Inventor: Jie Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 252 days.

(21) Appl. No.: 16/470,011

(22) PCT Filed: Dec. 14, 2016

(86) PCT No.: PCT/CN2016/109928
§ 371 (c)(1),
(2) Date: Jun. 14, 2019

(87) PCT Pub. No.: WO2018/107396
PCT Pub. Date: Jun. 21, 2018

(65) Prior Publication Data
US 2020/0089857 A1    Mar. 19, 2020

(51) Int. Cl.
*G06K 9/00* (2006.01)
*G06F 21/32* (2013.01)
*G06F 3/0488* (2013.01)
*G06F 21/31* (2013.01)
*G06F 21/44* (2013.01)

(52) U.S. Cl.
CPC ............ *G06F 21/32* (2013.01); *G06F 3/0488* (2013.01); *G06F 21/316* (2013.01); *G06F 21/44* (2013.01); *G06K 9/00006* (2013.01); *G06K 9/00026* (2013.01); *G06K 9/00087* (2013.01)

(58) Field of Classification Search
None
See application file for complete search history.

(56) References Cited

U.S. PATENT DOCUMENTS

| | | | |
|---|---|---|---|
| 2016/0042166 A1* | 2/2016 | Kang | G06F 21/32 726/7 |
| 2016/0253510 A1 | 9/2016 | Lim | |
| 2017/0308732 A1 | 10/2017 | Wang et al. | |
| 2018/0173867 A1* | 6/2018 | De | G06F 21/32 |
| 2018/0198619 A1* | 7/2018 | Zhang | G06F 21/51 |

(Continued)

FOREIGN PATENT DOCUMENTS

| | | |
|---|---|---|
| CN | 103593214 A | 2/2014 |
| CN | 103984888 A | 8/2014 |

(Continued)

*Primary Examiner* — Joseph R Haley
(74) *Attorney, Agent, or Firm* — Slater Matsil, LLP

(57) ABSTRACT

When detecting a first touch operation performed by a user on a touchscreen of the terminal device, the terminal device determines an object in an area corresponding to the first touch operation as a touch object, and the touchscreen has a fingerprint recognition function. The terminal device determines whether the touch object is included in a preset whitelist, and the whitelist includes at least one touch object that supports fingerprint authentication. If the touch object is included in the whitelist, the terminal device collects fingerprint information of the user by using the touchscreen. The terminal device performs fingerprint authentication by using the collected fingerprint information.

14 Claims, 86 Drawing Sheets

(56) References Cited

U.S. PATENT DOCUMENTS

| | | | |
|---|---|---|---|
| 2018/0211030 A1* | 7/2018 | Kim | ................. G06F 21/45 |
| 2018/0276356 A1* | 9/2018 | Kim | ................. G06F 21/31 |

FOREIGN PATENT DOCUMENTS

| | | | |
|---|---|---|---|
| CN | 104991721 A | 10/2015 | |
| CN | 105335053 A | 2/2016 | |
| CN | 105335641 A | 2/2016 | |
| CN | 105574388 A | 5/2016 | |
| CN | 105574393 A | 5/2016 | |
| CN | 105678147 A | 6/2016 | |
| CN | 105912913 A | 8/2016 | |
| WO | 2016037318 A1 | 3/2016 | |

* cited by examiner

C

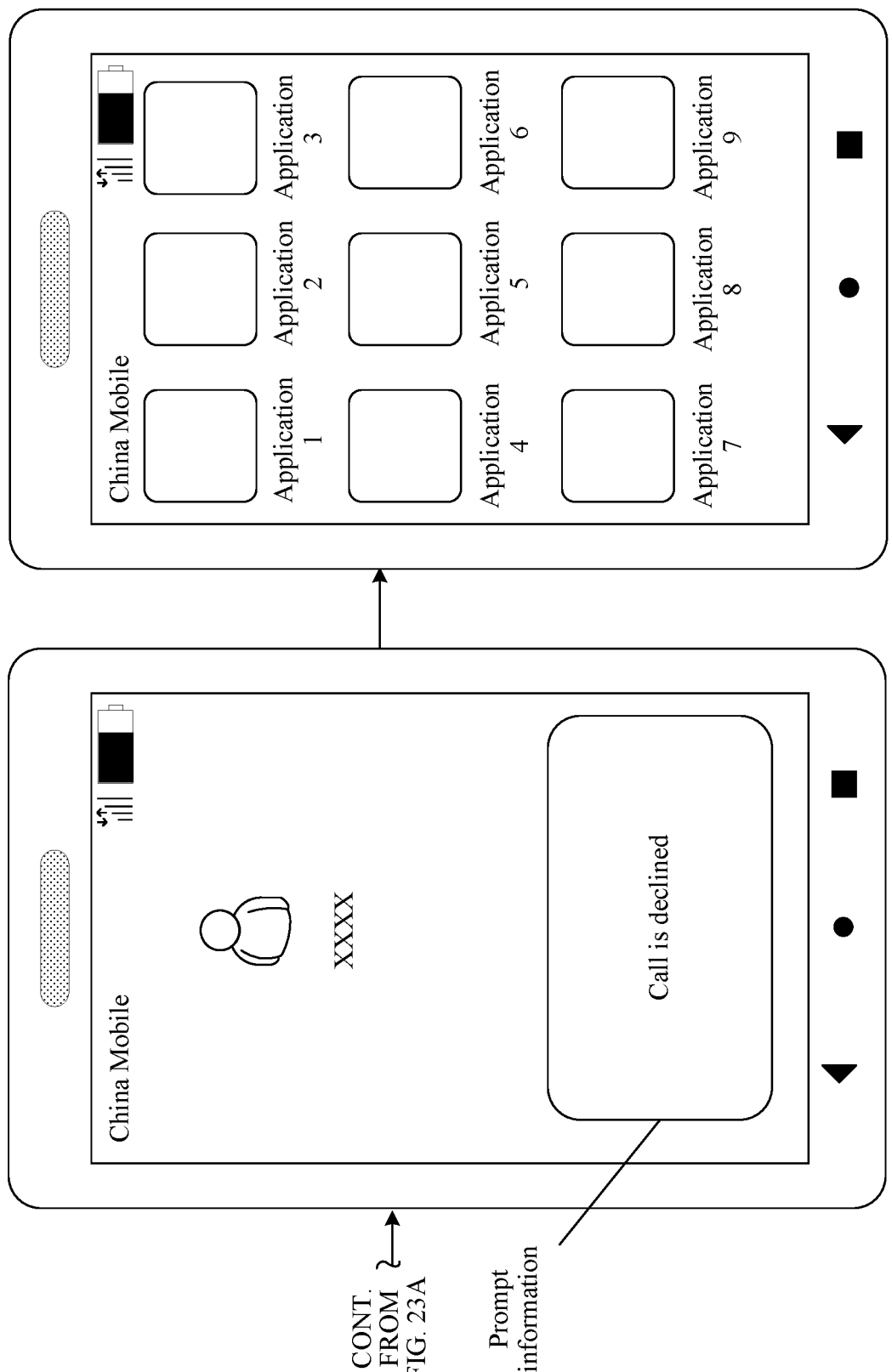

ant device, the operation corresponding to the authentication
FINGERPRINT RECOGNITION METHOD AND TERMINAL DEVICE

CROSS-REFERENCE TO RELATED APPLICATIONS

This application is a national stage of International Application No. PCT/CN2016/109928, filed on Dec. 14, 2016, which is hereby incorporated by reference in its entirety.

TECHNICAL FIELD

Embodiments of the present invention relate to the communications field, and in particular, to a fingerprint recognition method and a terminal device.

BACKGROUND

In recent years, a fingerprint recognition technology serving as an identity authentication technology based on a biometric feature has been widely used in intelligent terminals. A specific implementation process of fingerprint recognition is as follows: After detecting a touch operation of a user, an intelligent terminal collects fingerprint information of the user, and performs a corresponding operation when determining that the collected fingerprint information matches pre-stored fingerprint information. For example, when the fingerprint recognition technology is applied to a scenario of unlocking a mobile phone, if the user needs to unlock the mobile phone, the user can successfully unlock the mobile phone by directly performing a simple touch operation without a need to enter a tedious unlocking password. That is, application of the fingerprint recognition technology greatly improves user experience.

Currently, the fingerprint recognition technology may be applied by disposing a fingerprint recognition device in an intelligent terminal. In the prior art, a fingerprint recognition device is usually installed on a back facet or a home key of an intelligent terminal. However, with development of fingerprint recognition technologies, to improve user experience to a greater extent, how to perform fingerprint recognition on a screen of the intelligent terminal becomes a key subject researched by a person skilled in the art.

SUMMARY

Embodiments of the present invention provide a fingerprint recognition method and a terminal device, so as to implement fingerprint recognition on a screen of an intelligent terminal.

To achieve the foregoing objective, the embodiments of the present invention use the following technical solutions:

According to a first aspect of the embodiments of the present invention, a fingerprint recognition method is provided, and includes:

when detecting a first touch operation performed by a user on a touchscreen of a terminal device, determining, by the terminal device, an object in an area corresponding to the first touch operation as a touch object, where the touchscreen has a fingerprint recognition function; determining whether the touch object is included in a preset whitelist including at least one object that supports fingerprint authentication; if the touch object is included in the whitelist, collecting, by the terminal device, fingerprint information of the user by using the touchscreen; and in this case, performing, by the terminal device, fingerprint authentication by using the fingerprint information.

The touchscreen of the terminal device provided in this embodiment of the present invention has the fingerprint recognition function. Therefore, when the user performs the touch operation on the touchscreen, fingerprint recognition may be implemented on the screen of the terminal device. In addition, the terminal device may collect the fingerprint information of the user by using the touchscreen only when determining that the object in the area corresponding to the touch operation of the user is included in the preset whitelist. In this way, power consumption caused by performing fingerprint recognition on the screen is reduced.

With reference to the first aspect, in a possible implementation, if the touch object is not included in the whitelist, the terminal device displays first prompt information, where the first prompt information is used to prompt the user that the touch object does not support the fingerprint authentication. In this way, the terminal device displays the first prompt information, so that the user learns that the object in the area corresponding to the touch operation does not support the fingerprint authentication, thereby improving user experience.

With reference to the first aspect and the foregoing possible implementation, in another possible implementation, to prevent fingerprint information from being incorrectly collected, before the collecting, by the terminal device, fingerprint information of the user by using the touchscreen, the method may further include: obtaining, by the terminal device, a first touch gesture of the user, where the first touch gesture is a gesture used when the user performs the first touch operation on the touchscreen. In this case, the collecting, by the terminal device, fingerprint information of the user by using the touchscreen may specifically include: when determining that the obtained first touch gesture is an authentication gesture, collecting, by the terminal device, the fingerprint information by using the touchscreen, where the authentication gesture is used to trigger collection of the fingerprint information.

With reference to the first aspect and the foregoing possible implementations, in another possible implementation, when the fingerprint information is authenticated by using a fingerprint, the terminal device obtains, based on a pre-stored correspondence between fingerprint information and authentication information, authentication information corresponding to the collected fingerprint information; and performs an operation corresponding to the obtained authentication information. In this way, the terminal device may perform the corresponding operation by using the collected fingerprint information. Compared with a case in which the user implements a corresponding operation by entering tedious information, a user operation is simplified, and user experience is improved.

With reference to the first aspect and the foregoing possible implementations, in another possible implementation, to prevent the terminal device from incorrectly performing the operation corresponding to the authentication information, before the performing, by the terminal device, an operation corresponding to the authentication information, the method may further include: determining, by the terminal device based on a pre-stored correspondence between authentication information and an authentication level, an authentication level corresponding to the authentication information, where the authentication level includes a first level and a second level. In this case, the performing, by the terminal device, an operation corresponding to the authentication information may specifically include: if the authentication level corresponding to the authentication information is the first level, performing, by the terminal device, the operation corresponding to the authentication information; or if the authentication level corresponding to the authentication information is the second level, obtaining, by the terminal device, an authentication operation of the user, determining whether the authentication operation meets an authentication confirmation condition, and when the authentication operation meets the authentication confirmation condition, performing the operation corresponding to the authentication information.

With reference to the first aspect and the foregoing possible implementations, in another possible implementation, to prevent the terminal device from incorrectly performing the operation corresponding to the authentication information, before the performing, by the terminal device, an operation corresponding to the authentication information, the method may further include: determining, by the terminal device, an authentication area in which the touch object is located, where the authentication area includes a first area and a second area. In this case, the performing, by the terminal device, an operation corresponding to the authentication information may specifically include: if the authentication area in which the touch object is located is the first area, performing, by the terminal device, the operation corresponding to the authentication information; or if the authentication area in which the touch object is located is the second area, obtaining, by the terminal device, an authentication operation of the user, determining whether the authentication operation meets an authentication confirmation condition, and when the authentication operation meets the authentication confirmation condition, performing the operation corresponding to the authentication information.

With reference to the first aspect and the foregoing possible implementations, in another possible implementation, to prevent the terminal device from incorrectly performing the operation corresponding to the authentication information, the obtaining, by the terminal device, an authentication operation of the user, determining whether the authentication operation meets an authentication confirmation condition, and when the authentication operation meets the authentication confirmation condition, performing the operation corresponding to the authentication information may specifically include: when detecting a second touch operation performed by the user on the touchscreen, obtaining, by the terminal device, a second touch gesture of the user, where the second touch gesture is a gesture used when the user performs the second touch operation on the touchscreen; and determining whether the second touch gesture is an authentication confirmation gesture, and when determining that the second touch gesture is the authentication confirmation gesture, performing the operation corresponding to the authentication information.

With reference to the first aspect and the foregoing possible implementations, in another possible implementation, to prevent the terminal device from incorrectly performing the operation corresponding to the authentication information, the obtaining, by the terminal device, an authentication operation of the user, determining whether the authentication operation meets an authentication confirmation condition, and when the authentication operation meets the authentication confirmation condition, performing the operation corresponding to the authentication information may specifically include: determining, by the terminal device, whether a cancellation operation of the user is detected within a preset time period, and when no cancellation operation of the user is detected within the preset time period, performing the operation corresponding to the authentication information.

With reference to the first aspect and the foregoing possible implementations, in another possible implementation, when the fingerprint information fails to be authenticated by using a fingerprint, the terminal device displays second prompt information, where the second prompt information is used to prompt the user that the fingerprint information is not matched. In this way, the terminal device displays the second prompt information, so that the user learns that the fingerprint information is not matched, thereby improving user experience.

With reference to the first aspect and the foregoing possible implementations, in another possible implementation, the authentication information includes at least one of a login account and password, a payment password, an unlocking password, an encryption password, a decryption password, and a function instruction.

With reference to the first aspect and the foregoing possible implementations, in another possible implementation, the first touch gesture includes at least one of a pressure recognition gesture, a long-press gesture, an area change gesture, a multi-touch gesture, a sliding gesture, a double-press gesture, a double-tap gesture, a tangential gesture, and a specified area gesture.

With reference to the first aspect and the foregoing possible implementations, in another possible implementation, the second touch gesture includes at least one of a pressure recognition gesture, a long-press gesture, an area change gesture, a multi-touch gesture, a sliding gesture, a double-press gesture, a double-tap gesture, a tangential gesture, and a specified area gesture.

With reference to the first aspect and the foregoing possible implementations, in another possible implementation, the touch object includes at least one of an application and a screen area.

According to a second aspect of the embodiments of the present invention, a terminal device is provided, where the terminal device includes a touchscreen, the touchscreen includes a detection module and a collection module, and the terminal device further includes a determining unit, a judging unit, and an authentication unit, where the determining unit is configured to: when the detection module detects a first touch operation performed by a user on the touchscreen, determine an object in an area corresponding to the first touch operation detected by the detection module as a touch object;

the judging unit is configured to determine whether the touch object determined by the determining unit is included in a preset whitelist, where the whitelist includes at least one object that supports fingerprint authentication;

the collection module is configured to: if the judging unit determines that the touch object is included in the whitelist, collect fingerprint information of the user on the touchscreen; and the authentication unit is configured to perform fingerprint authentication by using the fingerprint information collected by the collection module.

With reference to the second aspect, in a possible implementation, the touchscreen further includes a display module; and the display module is configured to: if the judging unit determines that the touch object is not included in the whitelist, display first prompt information, where the first prompt information is used to prompt the user that the touch object does not support the fingerprint authentication.

With reference to the second aspect and the foregoing possible implementation, in another possible implementation, the terminal device further includes an obtaining unit; the obtaining unit is configured to obtain a first touch gesture of the user, where the first touch gesture is a gesture used when the user performs the first touch operation on the touchscreen; and the collection module is specifically configured to: when it is determined that the first touch gesture obtained by the obtaining unit is an authentication gesture, collect the fingerprint information, where the authentication gesture is used to trigger the collection module to collect the fingerprint information.

With reference to the second aspect and the foregoing possible implementations, in another possible implementation, the terminal device further includes an obtaining unit and a processing unit; the obtaining unit is further configured to: when the fingerprint information is authenticated by using a fingerprint, obtain, based on a pre-stored correspondence between fingerprint information and authentication information, authentication information corresponding to the fingerprint information collected by the collection module; and the processing unit is configured to perform an operation corresponding to the authentication information obtained by the obtaining unit.

With reference to the second aspect and the foregoing possible implementations, in another possible implementation, the determining unit is further configured to determine, based on a pre-stored correspondence between authentication information and an authentication level, an authentication level corresponding to the authentication information, where the authentication level includes a first level and a second level; the processing unit is specifically configured to: if the determining unit determines that the authentication level corresponding to the authentication information is the first level, perform the operation corresponding to the authentication information; the obtaining unit is further configured to obtain an authentication operation of the user; the judging unit is further configured to: if the determining unit determines that the authentication level corresponding to the authentication information is the second level, determine whether the authentication operation obtained by the obtaining unit meets an authentication confirmation condition; and the processing unit is specifically configured to: when the judging unit determines that the authentication operation meets the authentication confirmation condition, perform the operation corresponding to the authentication information.

With reference to the second aspect and the foregoing possible implementations, in another possible implementation, the determining unit is further configured to determine an authentication area in which the touch object is located, where the authentication area includes a first area and a second area; the processing unit is specifically configured to: if the determining unit determines that the authentication area in which the touch object is located is the first area, perform the operation corresponding to the authentication information; the obtaining unit is further configured to obtain an authentication operation of the user; the judging unit is further configured to: if the determining unit determines that the authentication area in which the touch object is located is the second area, determine whether the authentication operation obtained by the obtaining unit meets an authentication confirmation condition; and the processing unit is specifically configured to: when the judging unit determines that the authentication operation meets the authentication confirmation condition, perform the operation corresponding to the authentication information.

With reference to the second aspect and the foregoing possible implementations, in another possible implementation, the processing unit is specifically configured to: when the detection module detects a second touch operation performed by the user on the touchscreen, obtain a second touch gesture of the user, where the second touch gesture is a gesture used when the user performs the second touch operation on the touchscreen; and determine whether the second touch gesture is an authentication confirmation gesture, and when the second touch gesture is the authentication confirmation gesture, perform the operation corresponding to the authentication information.

With reference to the second aspect and the foregoing possible implementations, in another possible implementation, the processing unit is specifically configured to: determine whether the detection module detects a cancellation operation of the user within a preset time period, and when no cancellation operation of the user is detected within the preset time period, perform the operation corresponding to the authentication information.

With reference to the second aspect and the foregoing possible implementations, in another possible implementation, the display module is further configured to: when the fingerprint information fails to be authenticated by using a fingerprint, display second prompt information, where the second prompt information is used to prompt the user that the fingerprint information is not matched.

With reference to the second aspect and the foregoing possible implementations, in another possible implementation, the authentication information includes at least one of a login account and password, a payment password, an unlocking password, an encryption password, a decryption password, and a function instruction.

With reference to the second aspect and the foregoing possible implementations, in another possible implementation, the first touch gesture includes at least one of a pressure recognition gesture, a long-press gesture, an area change gesture, a multi-touch gesture, a sliding gesture, a double-press gesture, a double-tap gesture, a tangential gesture, and a specified area gesture.

With reference to the second aspect and the foregoing possible implementations, in another possible implementation, the second touch gesture includes at least one of a pressure recognition gesture, a long-press gesture, an area change gesture, a multi-touch gesture, a sliding gesture, a double-press gesture, a double-tap gesture, a tangential gesture, and a specified area gesture.

With reference to the second aspect and the foregoing possible implementations, in another possible implementation, the touch object includes at least one of an application and a screen area.

For specific implementations, refer to behavior functions of the terminal device in the fingerprint recognition method provided in the first aspect or the possible implementations of the first aspect. Details are not described herein again.

According to a third aspect of the embodiments of the present invention, a terminal device is provided, and includes at least one processor, a memory, and a touchscreen, where the memory is configured to store an instruction; and the processor is configured to invoke the instruction stored in the memory, to perform the following operations:

when a first touch operation performed by a user on the touchscreen of the terminal device is detected, determining an object in an area corresponding to the first touch operation as a touch object, where the touchscreen has a fingerprint recognition function;

determining whether the touch object is included in a preset whitelist, where the whitelist includes at least one object that supports fingerprint authentication;

if the touch object is included in the whitelist, collecting fingerprint information of the user by using the touchscreen; and performing fingerprint authentication by using the fingerprint information.

With reference to the third aspect, in a possible implementation, the touchscreen is configured to: if the touch object is not included in the whitelist, display first prompt information, where the first prompt information is used to prompt the user that the touch object does not support the fingerprint authentication.

According to a fourth aspect of the embodiments of the present invention, a computer storage medium is provided, and is configured to store a computer software instruction used by the foregoing terminal device, where the computer storage instruction includes a program designed for performing the foregoing fingerprint recognition method.

BRIEF DESCRIPTION OF DRAWINGS

FIG. 9-1. FIG. 9-2, and FIG. 9-3 are a schematic diagram of another authentication gesture according to an embodiment of the present invention;

FIG. 23A and FIG. 23B are a schematic diagram of another scenario in which a fingerprint recognition method in an embodiment of the present invention is applied according to an embodiment of the present invention;

DESCRIPTION OF EMBODIMENTS

To implement fingerprint recognition on a screen of an intelligent terminal, embodiments of the present invention provide a fingerprint recognition method, applied to a terminal device. A touchscreen of the terminal device has a fingerprint recognition function. A basic principle of the fingerprint recognition method is as follows: When detecting a first touch operation performed by a user on a touchscreen of the terminal device, the terminal device determines an object in an area corresponding to the first touch operation as a touch object, and determines whether the touch object is included in a preset whitelist. The whitelist includes at least one touch object that supports fingerprint authentication. If the touch object is included in the whitelist, the terminal device collects fingerprint information of the user by using the touchscreen, and performs fingerprint authentication by using the collected fingerprint information. The touchscreen of the terminal device provided in the embodiments of the present invention has the fingerprint recognition function. Therefore, when the user performs the touch operation on the touchscreen, fingerprint recognition may be implemented on the screen of the terminal device. In addition, the terminal device may collect the fingerprint information of the user by using the touchscreen only when determining that the object in the area corresponding to the touch operation of the user is included in the preset whitelist. In this way, power consumption caused by performing fingerprint recognition on the screen is reduced.

The following describes the embodiments of the present invention in detail with reference to the accompanying drawings.

It should be noted that the fingerprint recognition method provided in the embodiments of the present invention is applicable to a terminal device provided with a touchscreen. The terminal device may be a terminal device such as a mobile phone, a tablet computer, a notebook computer, an ultra-mobile personal computer (Ultra-mobile Personal Computer, UMPC), a netbook, or a personal digital assistant (Personal Digital Assistant, PDA).

Specifically, in the embodiments of the present invention, an example in which the terminal device is the mobile phone is used to describe the fingerprint recognition method provided in the present invention. The following describes each constituent component of a mobile phone 10 in detail with reference to the accompanying drawing.

Figure 1:
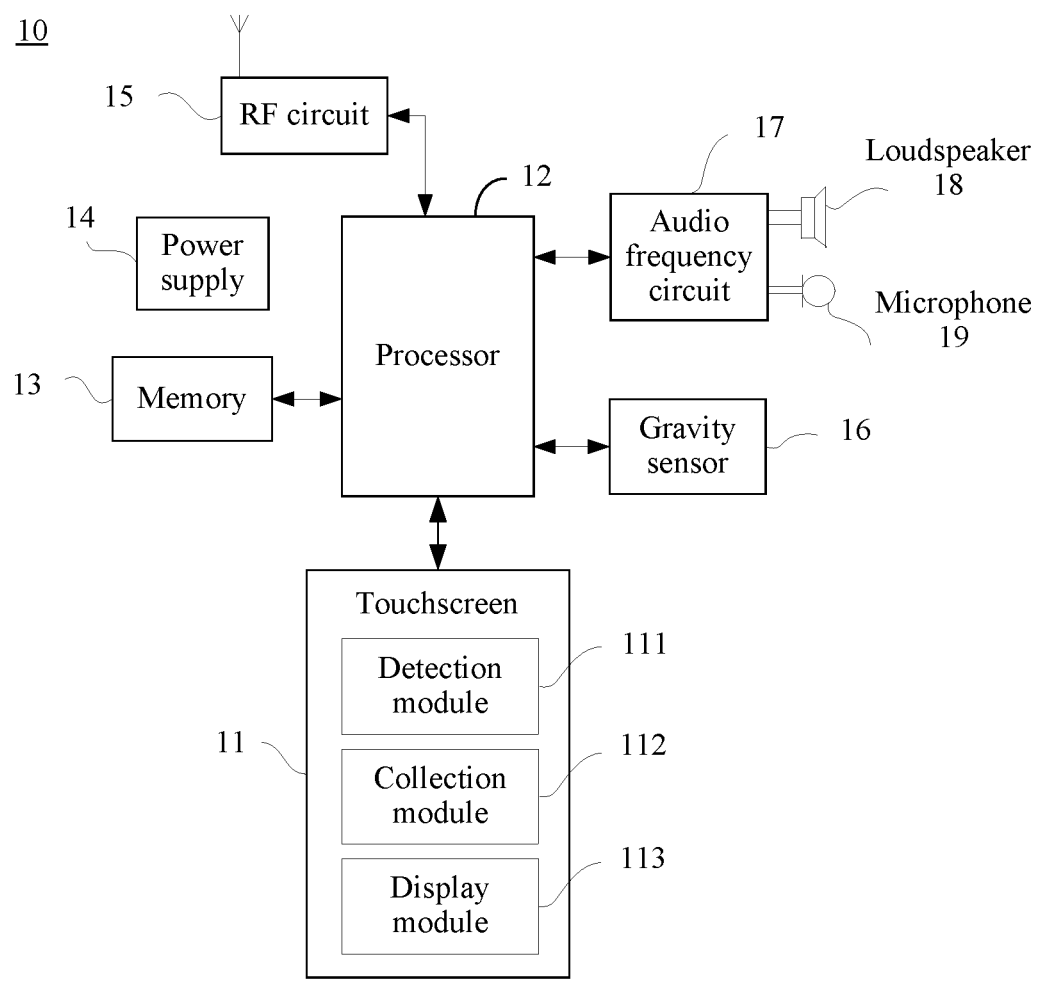
FIG. 1 is a schematic diagram of composition of a terminal device according to an embodiment of the present invention.

As shown in FIG. 1, the mobile phone 10 may include components such as a touchscreen 11, a processor 12, a memory 13, a power supply 14, a radio frequency (Radio Frequency, RF) circuit 15, a gravity sensor 16, an audio frequency circuit 17, a loudspeaker 18, and a microphone 19. These components may be connected by using a bus, or may be directly connected. A person skilled in the art may understand that a structure of the mobile phone shown in FIG. 1 constitutes no limitation on the mobile phone, and the mobile phone may include more components than those shown in FIG. 1, or combine some components, or have different component arrangements.

The touchscreen 11 has a fingerprint recognition function. For example, the fingerprint recognition function may be implemented by disposing a fingerprint recognition component for the touchscreen 11 (for example, the fingerprint recognition function may be implemented by installing a fingerprint recognition component on a back facet of the touchscreen), or the fingerprint recognition function may be implemented by using a logic circuit to control the touchscreen 11. In addition, further, to reduce power consumption caused by performing fingerprint recognition on a screen, the touchscreen 11 of the mobile phone may enable the fingerprint recognition function when detecting a touch operation performed by a user on the touchscreen 11 (for example, when detecting an operation performed by the user on the touchscreen 11 or near the touchscreen 11).

The touchscreen 11 may be referred to as a touch display panel. The touchscreen 11 is configured to implement an input and output function of the mobile phone 10, and may collect a touch operation performed by the user on or near the touchscreen 11 (for example, an operation performed by the user on the touchscreen 11 or near the touchscreen 11 by using any proper object or accessory such as a finger or a stylus), and drive a corresponding connection apparatus based on a preset program. The touchscreen 11 may also be configured to display information entered by the user or information provided for the user (for example, an image captured by a camera) and various menus of the mobile phone. For example, the touchscreen 11 may be implemented by using a plurality of types such as a resistive type, a capacitive type, an infrared light perception type, and an ultrasonic wave type. This is not limited in this embodiment of the present invention. The operation performed by the user near the touchscreen 11 may be referred to as a floating touch, and a touchscreen on which a floating touch can be performed may be implemented by using a capacitive type, an infrared light perception type, an ultrasonic wave type, and the like.

Specifically, in this embodiment of the present invention, the touchscreen 11 may include a detection module 111, a collection module 112, and a display module 113. The detection module 111 may detect a touch operation performed by a user on the touchscreen 11, and after the touch operation is performed on the touchscreen 11, may transmit a parameter generated by the touchscreen 11 to the processor 12 (for example, assuming that the touchscreen 11 is implemented by using the capacitive type, the detection module 111 may transmit a change parameter on the touchscreen 11 to the processor 12, and the change parameter refers to a size, a shape, a quantity, and a distribution status of a capacitor whose capacitance changes), so that the processor 12 determines an object in an area corresponding to the touch operation, that is, determines a touch object, and sends a collection indication to the collection module 112 when determining that the touch object is included in a preset whitelist. The collection indication is used to trigger the collection module 112 to collect fingerprint information of the user. The collection module 112 may receive the collection indication sent by the processor 12, and collects the fingerprint information of the user. The display module 113 may display information entered by the user, information provided by the mobile phone for the user, and various menus of the mobile phone.

The processor 12 is a control center of the mobile phone 10, uses various interfaces and lines to connect all components of the entire mobile phone, and performs various functions of the mobile phone 10 and processes data by running or executing a software program and/or a module that are/is stored in the memory 13 and by invoking data stored in the memory 13, so as to perform overall monitoring on the mobile phone 10. In specific implementation, in an embodiment, the processor 12 may include one or more processing units, and the processor 12 may integrate an application processor and a modem processor. The application processor mainly processes an operating system, a user interface, an application program, and the like, and the modem processor mainly processes wireless communication. It may be understood that the modem processor may alternatively be not integrated into the processor 12.

Specifically, in this embodiment of the present invention, the processor 12 may receive the parameter that is generated by the touchscreen 11 and that is sent by the detection module 111, determine, based on the parameter, the object in the area corresponding to the touch operation, that is, determine the touch object, and send the collection indication to the collection module 112 when determining that the touch object is included in the preset whitelist.

It may be understood that in this embodiment of the present invention, in another implementation, the touchscreen 11 may be further configured to: determine the touch object based on the touch operation performed by the user on the touchscreen 11, and report the touch object to the processor 12, so that the processor 12 performs further processing, for example, determines whether the touch object is included in the preset whitelist, and sends the collection indication to the collection module 112 if the touch object is included in the whitelist.

The memory 13 may be configured to store data, a software program, and a module, and may be a volatile memory (Volatile Memory) such as a random-access memory (Random-Access Memory, RAM), or a non-volatile memory (Non-Volatile Memory) such as a read-only memory (Read-Only Memory, ROM), a flash memory (Flash Memory), a hard disk drive (Hard Disk Drive, HDD), or a solid-state drive (Solid-State Drive, SSD), or a combination of the foregoing types of memories. Specifically, the memory 13 may store program code, and the program code is used to enable the processor 12 to perform the fingerprint recognition method provided in this embodiment of the present invention by executing the program code.

The power supply 14 may be a battery, and is logically connected to the processor 12 by using a power supply management system, so as to implement functions such as charging management, discharging management, and power consumption management by using the power supply management system.

The RF circuit 15 may be configured to receive and send information, or receive and send a signal in a call process. Particularly, the RF circuit 15 sends received information to the processor 12 for processing, and sends a signal generated by the processor 12. Generally, the RF circuit includes but is not limited to an antenna, at least one amplifier, a transceiver, a coupler, a low noise amplifier (Low Noise Amplifier, LNA), a duplexer, and the like. In addition, the RF circuit 15 may further communicate with a network and another device through wireless communication.

The gravity sensor (Gravity Sensor) 16 may detect acceleration values of the mobile phone in all direction (generally, three axes), may detect a gravity value and direction in a static mode, and may be used for an application for identifying a mobile phone gesture (for example, switching between landscape and portrait screens, a related game, or magnetometer gesture calibration), a vibration identification-related function (for example, a pedometer and a strike), and the like. It should be noted that the mobile phone 10 may further include another sensor such as a pressure sensor, a light sensor, a gyroscope, a barometer, a hygrometer, a thermometer, an infrared sensor, and another sensor. Details are not described herein again.

The audio frequency circuit 17, the loudspeaker 18, and the microphone 19 may provide an audio interface between the user and the mobile phone 10. The audio frequency circuit 17 may transmit, to the loudspeaker 18, an electrical signal into which received audio data is converted, and the loudspeaker 18 converts the electrical signal into a sound signal for output. In addition, the microphone 19 converts the collected sound signal into the electrical signal, and after receiving the electrical signal, the audio frequency circuit 17 converts the electrical signal into audio data, and then transmits the audio data to the RF circuit 15, so as to send the audio data to, for example, another mobile phone, or transmits the audio data to the processor 12 for further processing.

Although not shown, the mobile phone 10 may further include function modules such as a Wireless Fidelity (Wireless Fidelity, WiFi) module, a Bluetooth module, and a camera. Details are not described herein.

To make the objectives, technical solutions, and advantages of the embodiments of the present invention clearer, with reference to the specific components in the mobile phone 10 shown in FIG. 1, a fingerprint recognition method provided in the embodiments of the present invention is described below in detail by using a flowchart of the fingerprint recognition method shown in FIG. 2A and FIG. 2B. Shown steps may also be performed in any terminal device other than the mobile phone shown in FIG. 1. In addition, although a logical sequence of the fingerprint recognition method provided in this embodiment of the present invention is shown in the method flowchart, in some cases, the shown or described steps may be performed in a sequence different from the sequence herein.

It should be noted that a touch object used in this embodiment of the present invention may be one or more of an application icon, a document, a picture, a screen area, and the like. In addition, in this embodiment of the present invention, a touch operation performed by a user on a touchscreen may be an operation performed by the user on the touchscreen such as a press operation, a long-press operation, a sliding operation, and a tap operation, or may be an operation performed by the user near the touchscreen, that is, a floating touch. This embodiment of the present invention is described by using an example in which the touch operation performed by the user on the touchscreen is the press operation performed by the user on the touchscreen.

201. When a touchscreen of a mobile phone detects a first touch operation performed by a user on the touchscreen, a processor of the mobile phone determines an object in an area corresponding to the first touch operation as a touch object.

When the user performs the first touch operation on the touchscreen of the mobile phone, a detection module of the touchscreen of the mobile phone may detect the first touch operation performed by the user on the touchscreen. In addition, the detection module of the touchscreen of the mobile phone may send, to the processor of the mobile phone, a parameter generated by the touchscreen after the first touch operation is performed. After receiving the parameter, the processor of the mobile phone may determine, based on the parameter, the object in the area corresponding to the first touch operation as the touch object. Alternatively, the operation of determining the touch object may be performed by the touchscreen of the mobile phone.

For example, it is assumed that the touch object is an application. When the user performs a press operation on an application icon in a display screen of the mobile phone, the detection module of the touchscreen of the mobile phone may detect the press operation, and send, to the processor of the mobile phone, a parameter generated by the touchscreen after the press operation is performed. After receiving the parameter, the processor of the mobile phone may determine, based on the parameter, an application in an area corresponding to the press operation as the touch object.

202. The processor of the mobile phone determines whether the touch object is included in a preset whitelist.

In a possible implementation of this embodiment of the present invention, the whitelist may include at least one touch object that supports fingerprint authentication.

After determining the touch object, the processor of the mobile phone may determine whether the touch object is included in the preset whitelist. If the touch object is not included in the whitelist, the following step 203 may be performed. If the touch object is included in the whitelist, the following step 204 may be performed.

In addition, in another possible implementation of this embodiment of the present invention, the whitelist may include an authentication area, and the authentication area is an area that is in the touchscreen of the mobile phone and that has a fingerprint recognition function. In this case, the processor of the mobile phone may determine whether the touch object is included in the authentication area, to determine whether the touch object is included in the whitelist.

It should be noted that the processor of the mobile phone may perform visual processing on the at least one touch object that supports the fingerprint authentication and that is included in the whitelist, and send the visually processed touch object to a display module of the touchscreen, so that the display module can display the visually processed touch object. For example, it is assumed that the touch object is an application, and a display effect after visual processing is performed on the application supporting the fingerprint authentication is to display a symbol "*" on an application icon of the application. In this way, the user may learn, based on the display effect, which touch object supports the fingerprint authentication and which touch object does not support the fingerprint authentication. Certainly, a manner such as an application icon jitter of an application, mobile phone vibration, or a voice prompt may be used to prompt a user which touch object supports the fingerprint authentication and which touch object does not support the fingerprint authentication. In addition, an implementation of prompting the user which touch object supports the fingerprint authentication and which touch object does not support the fingerprint authentication is not specifically limited in this embodiment of the present invention.

In addition, in this embodiment of the present invention, the touchscreen of the mobile phone may be divided into a common area and an authentication area. When the user performs the first touch operation on the authentication area of the touchscreen of the mobile phone, after detecting the first touch operation performed by the user on the touchscreen, the touchscreen of the mobile phone may directly collect fingerprint information of the user, and send, to the processor of mobile phone, the parameter generated by the touchscreen after the first touch operation is performed, and the collected fingerprint information. After receiving the fingerprint information and the parameter, the processor of the mobile phone may perform the following step 204 and step 205, and step 207 to step 213. When the user performs the first touch operation on the common area of the touchscreen of the mobile phone, after detecting the first touch operation performed by the user on the touchscreen, the touchscreen of the mobile phone may send, to the processor of the mobile phone, the parameter generated by the touchscreen after the first touch operation is performed, and perform the following step 203.

203. The touchscreen of the mobile phone displays first prompt information.

The first prompt information is used to prompt the user that the touch object does not support the fingerprint authentication. If the processor of the mobile phone determines that the touch object is not included in the whitelist, it indicates that the touch object of the user does not support the fingerprint authentication. In this case, the processor of the mobile phone may send an indication to the display module of the touchscreen of the mobile phone, to instruct to display the first prompt information. After receiving the indication, the display module of the touchscreen of the mobile phone may display the first prompt information used to prompt the user that the touch object does not support the fingerprint authentication.

Certainly, the mobile phone may make no response to the first touch operation of the user, to prompt the user that the touch object does not support the fingerprint authentication.

204. The processor of the mobile phone obtains a first touch gesture of the user.

The first touch gesture is a gesture used when the user performs the first touch operation on the touchscreen. The first touch gesture may be at least one of a pressure recognition gesture, a long-press gesture, an area change gesture, a multi-touch gesture, a sliding gesture, a double-press gesture, a double-tap gesture, a tangential gesture, and a specified area gesture. Specifically, when the first touch gesture is the pressure recognition gesture, that the processor of the mobile phone obtains the first touch gesture is specifically that the processor of the mobile phone obtains a press operation performed by the user on the touchscreen, and obtains a pressure value of pressing the touchscreen. When the first touch gesture is the long-press gesture, that the processor of the mobile phone obtains the first touch gesture is specifically that the processor of the mobile phone obtains a long-press operation performed by the user on the touchscreen, and obtains duration of touching the touchscreen. When the first touch gesture is the area change gesture, that the processor of the mobile phone obtains the first touch gesture is specifically that the processor of the mobile phone obtains a touch operation performed by the user on the touchscreen, and obtains a touch area of touching the touchscreen. When the first touch gesture is the multi-touch gesture, that the processor of the mobile phone obtains the first touch gesture is specifically that the processor of the mobile phone obtains a touch operation performed by the user on the touchscreen, and obtains a quantity of contacts. When the first touch gesture is the sliding gesture, that the processor of the mobile phone obtains the first touch gesture is specifically that the processor of the mobile phone obtains a sliding operation performed by the user on the touchscreen, and obtains a sliding distance. When the first touch gesture is the double-press gesture, that the processor of the mobile phone obtains the first touch gesture is specifically that the processor of the mobile phone obtains two press operations performed by the user on the touchscreen without leaving the touch object, and obtains pressure values of pressing the touchscreen twice. When the first touch gesture is the double-tap gesture, that the processor of the mobile phone obtains the first touch gesture is specifically that the processor of the mobile phone obtains a tap operation performed by the user on the touchscreen, and obtains a quantity of times of tapping a same touch object. When the first touch gesture is the tangential gesture, that the processor of the mobile phone obtains the first touch gesture is specifically that the processor of the mobile phone obtains a touch operation performed by the user on the touchscreen, and obtains at least one of the following trends of a finger of the user: upwards, downwards, towards the left, towards the right, and rotating. When the first touch gesture is the specified area gesture, that the processor of the mobile phone obtains the first touch gesture is specifically that the processor of the mobile phone obtains a dragging operation performed by the user on the touch object, and obtains a dragging distance or an area to which the touch object is dragged.

205. The processor of the mobile phone determines that the first touch gesture is an authentication gesture.

When the processor of the mobile phone determines that the touch object is included in the whitelist, it indicates that the touch object supports the fingerprint authentication, and in this case, the processor of the mobile phone may obtain the first touch gesture of the user. After obtaining the first touch gesture, the processor of the mobile phone may determine whether the first touch gesture is the authentication gesture. If it is determined that the first touch gesture is not the authentication gesture, the processor of the mobile phone may re-obtain a touch gesture of the user, and determine whether the re-obtained touch gesture is the authentication gesture until an object (such as the finger of the user) for performing a touch leaves the touchscreen. If it is determined that the first touch gesture is the authentication gesture, the following step 206 may be performed.

In this embodiment of the present invention, the authentication gesture is used to trigger a collection module of the touchscreen of the mobile phone to collect the fingerprint information of the user. In specific implementation, the authentication gesture may be at least one of a pressure recognition gesture, a long-press gesture, an area change gesture, a multi-touch gesture, a sliding gesture, a double-press gesture, a double-tap gesture, a tangential gesture, and a specified area gesture.

Figure 3A:
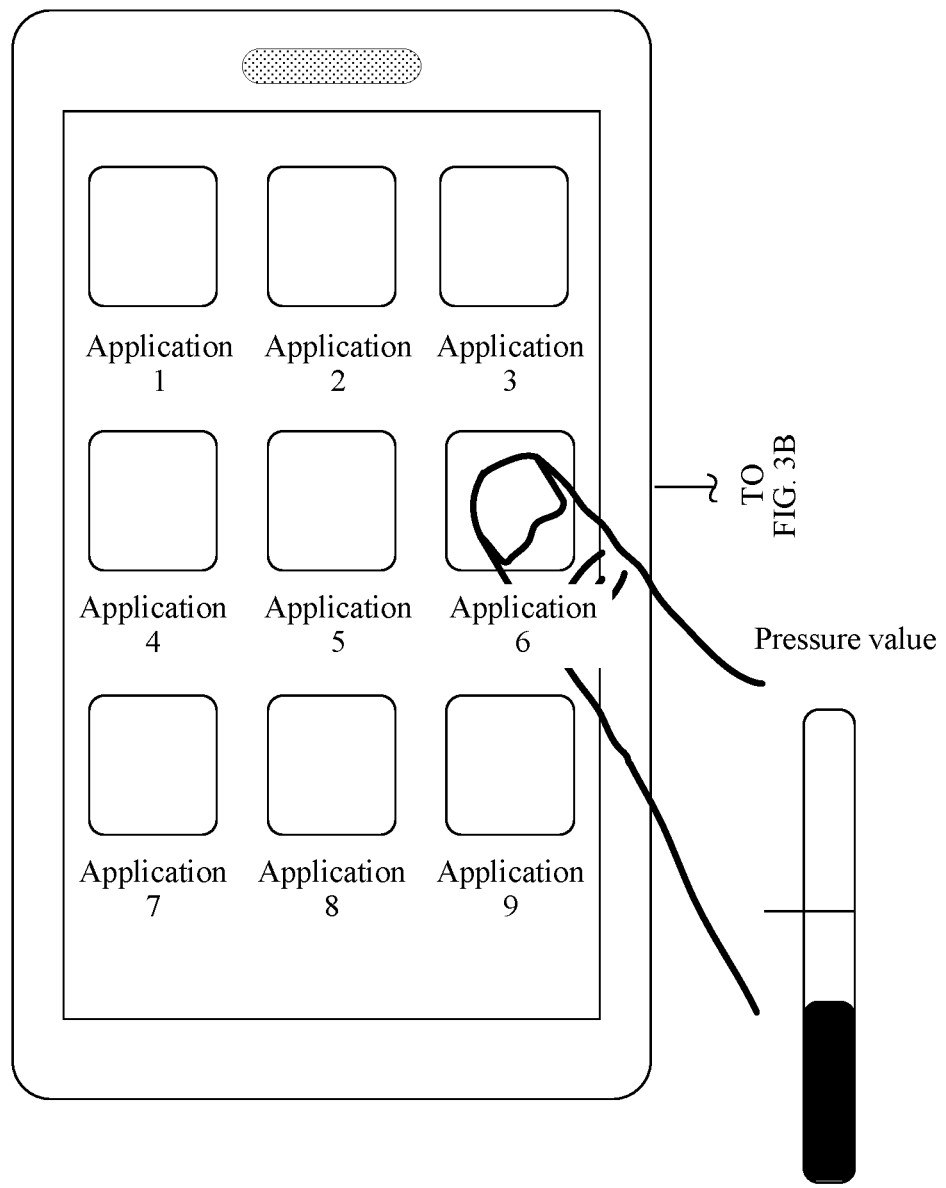
FIG. 3A and FIG. 3B are a schematic diagram of an authentication gesture according to an embodiment of the present invention.
Figure 3B:
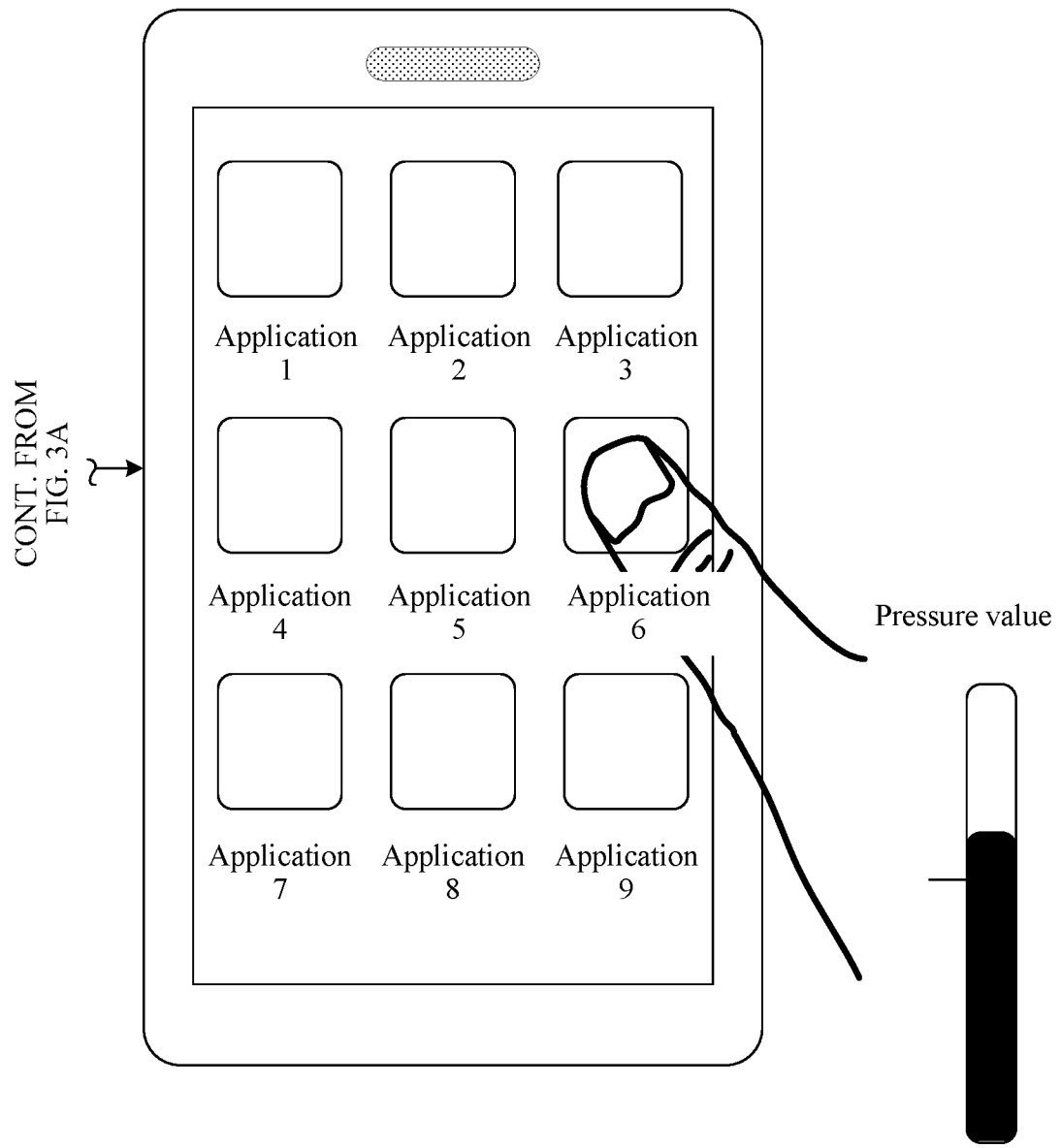
Figure 4A:
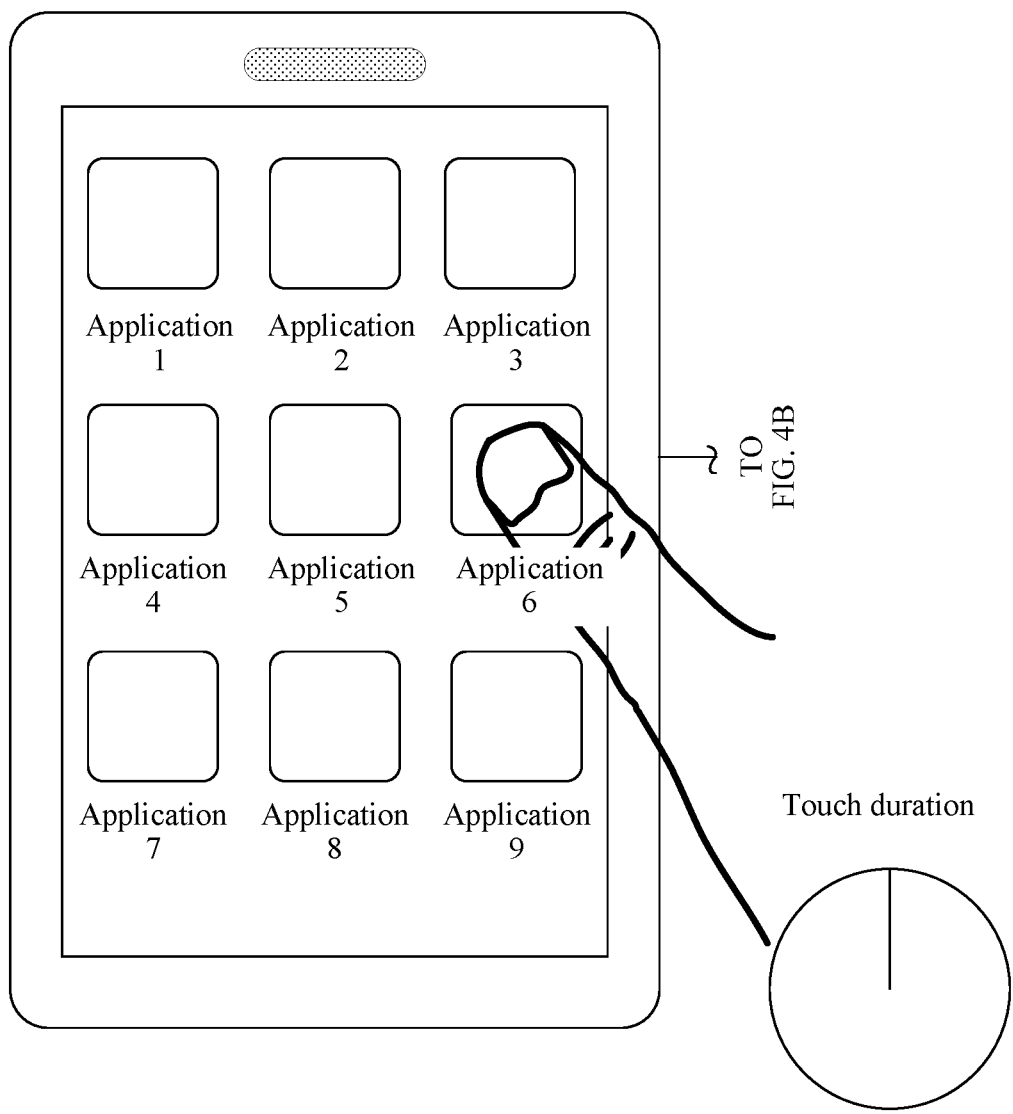
FIG. 4A and FIG. 4B are a schematic diagram of another authentication gesture according to an embodiment of the present invention.
Figure 4B:
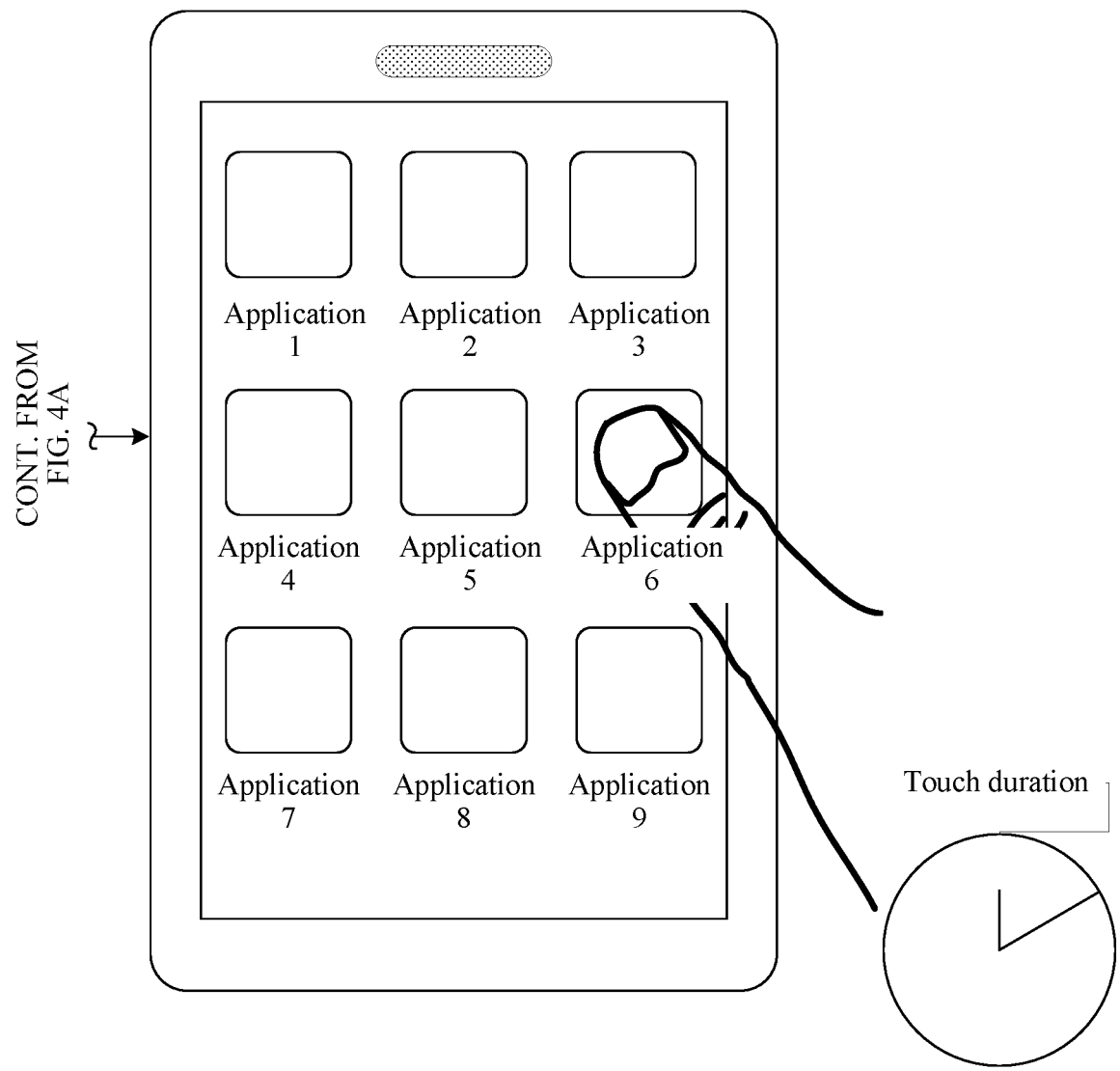
Figure 5A:
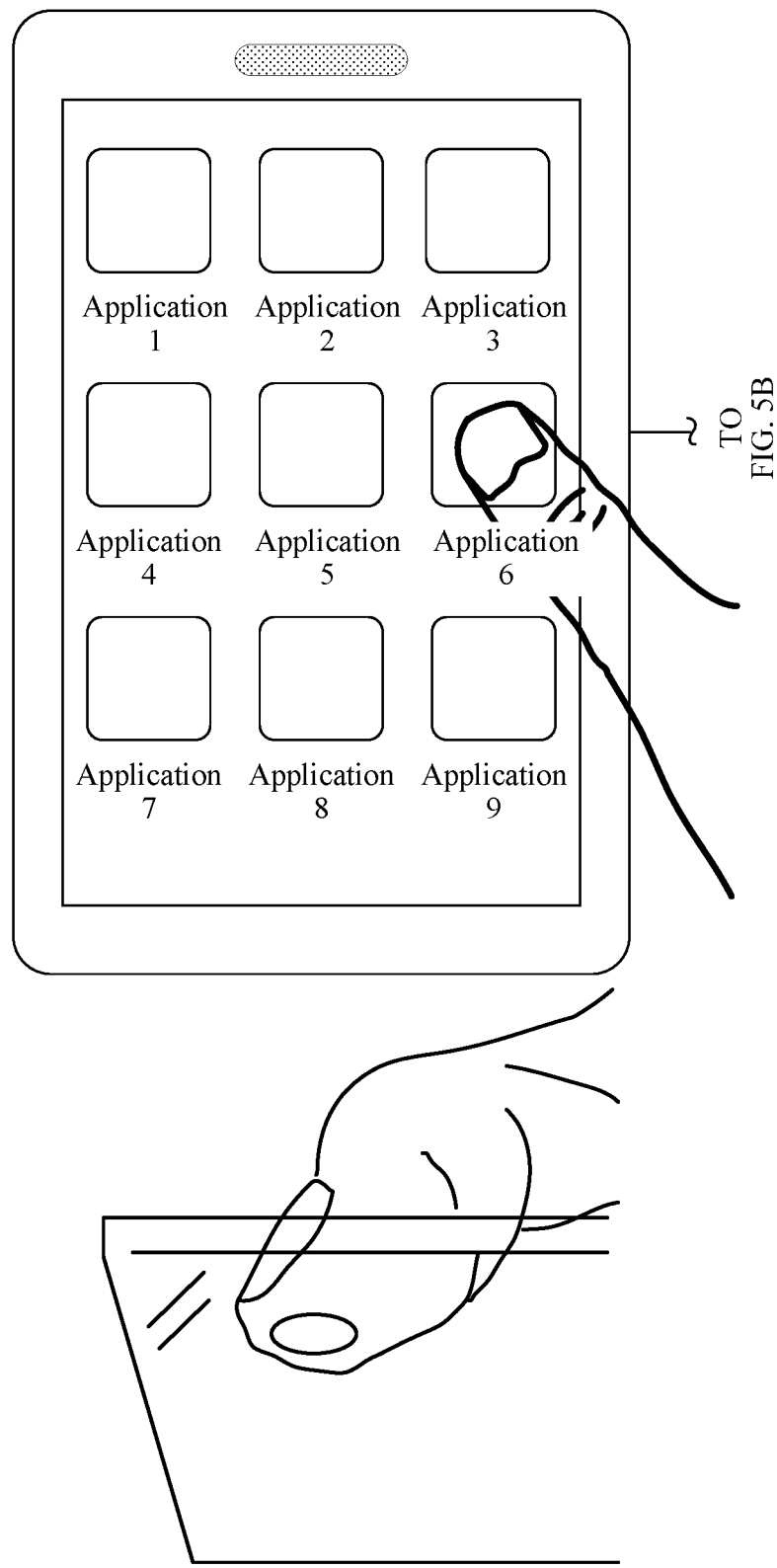
FIG. 5A and FIG. 5B are a schematic diagram of another authentication gesture according to an embodiment of the present invention.
Figure 5B:
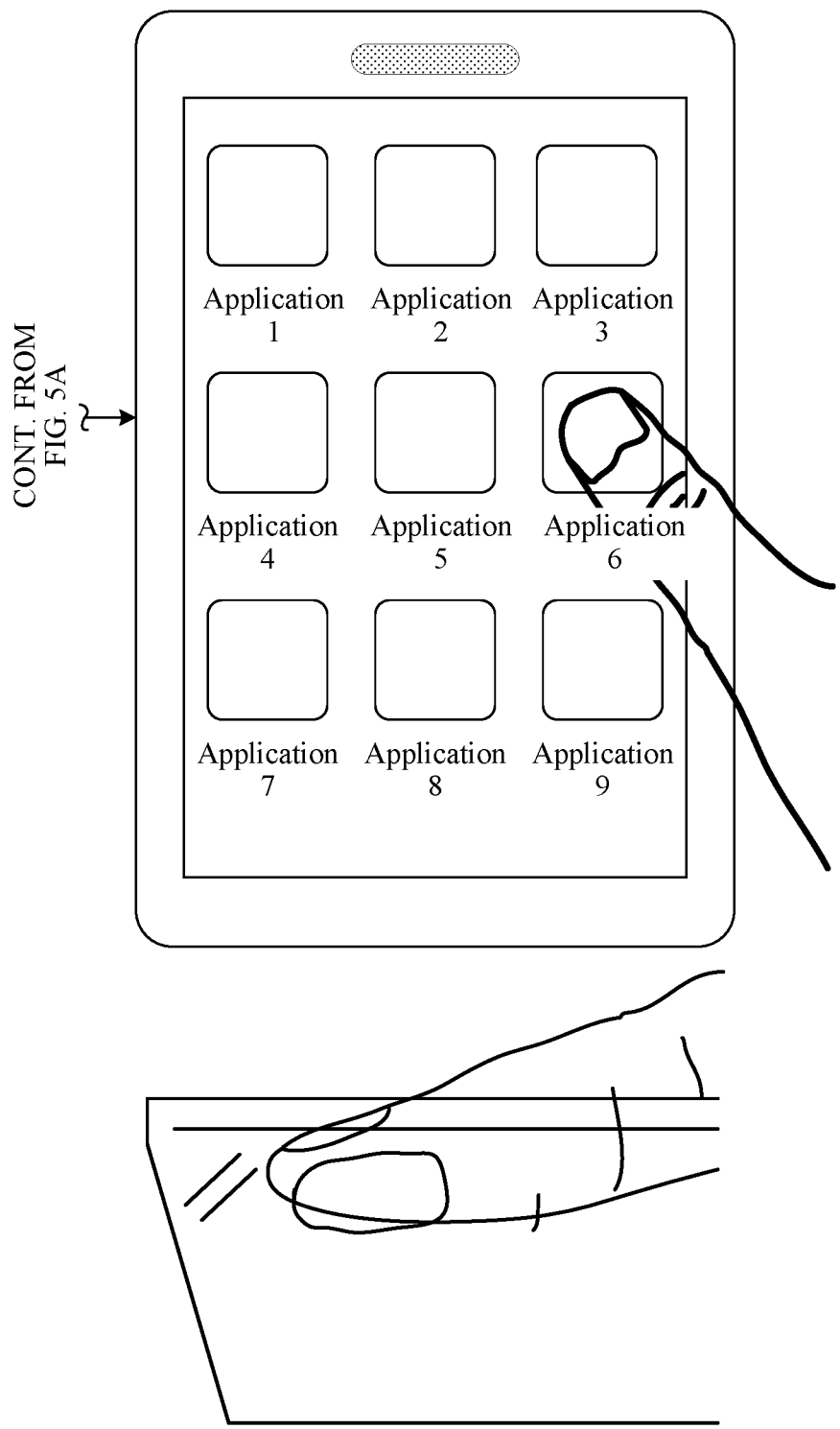
Figure 6A:
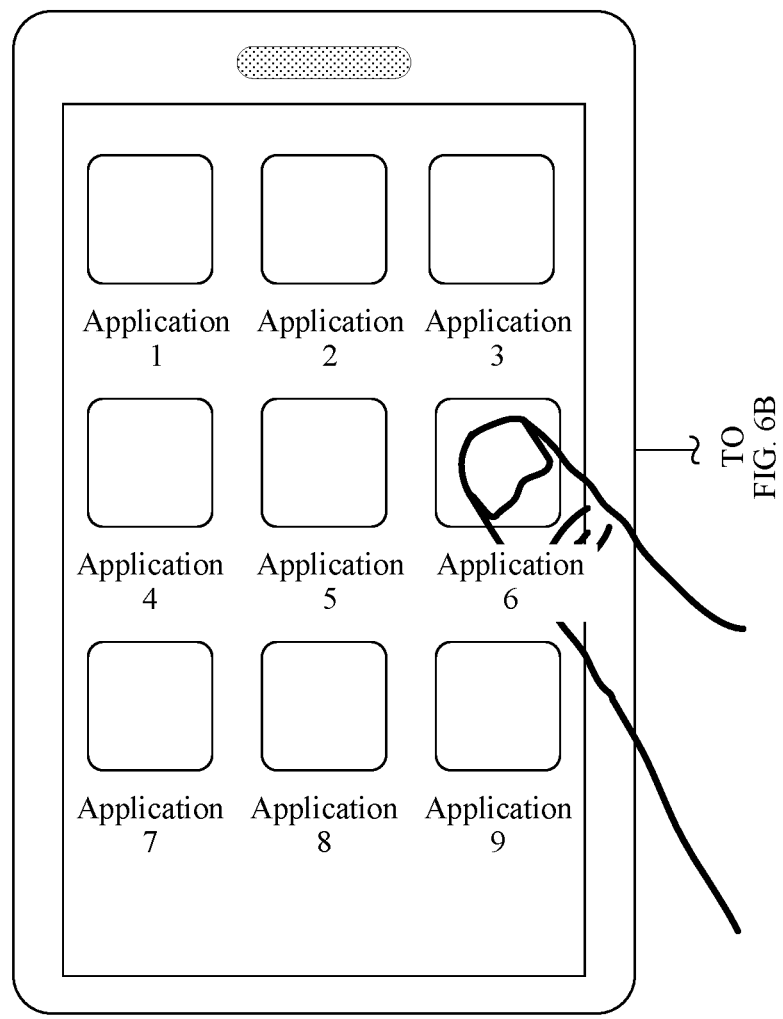
FIG. 6A and FIG. 6B are a schematic diagram of another authentication gesture according to an embodiment of the present invention.
Figure 6B:
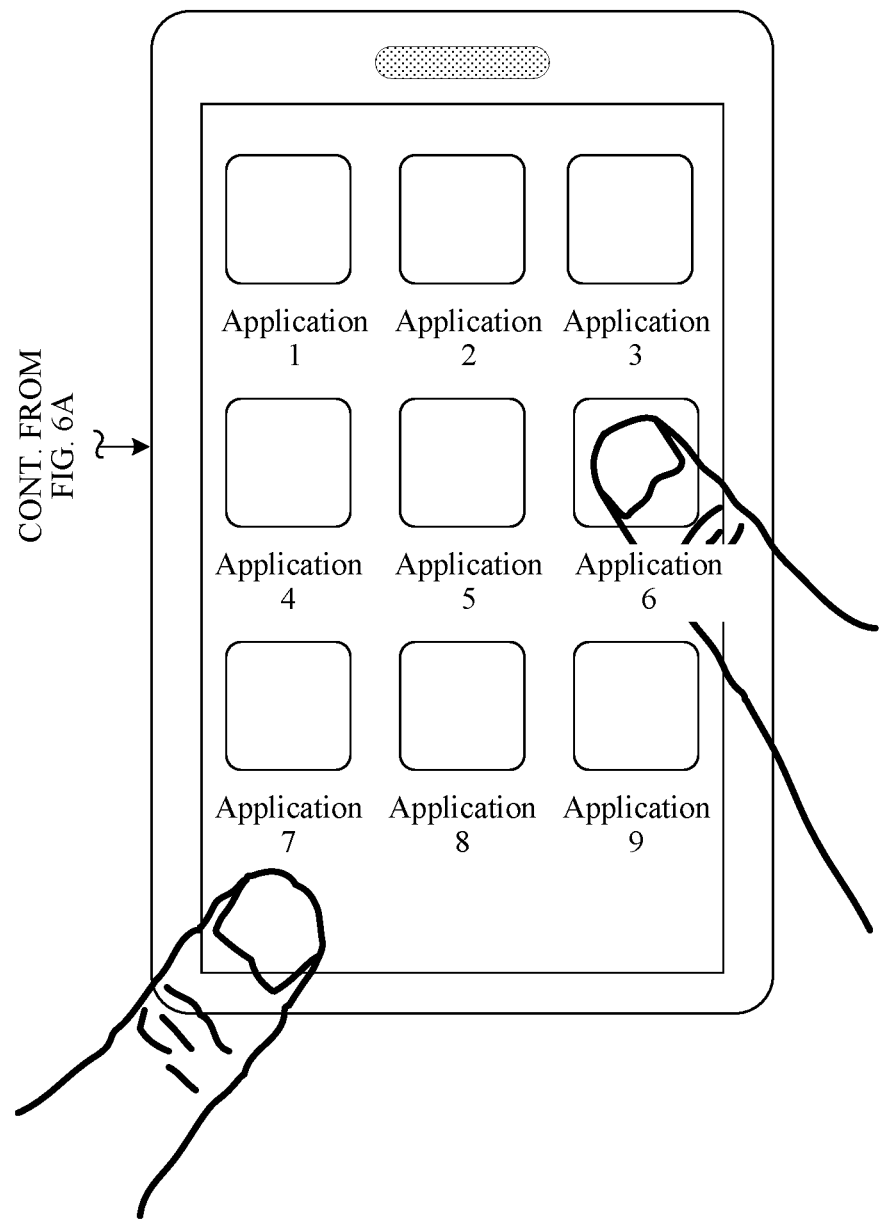
Figure 7A:
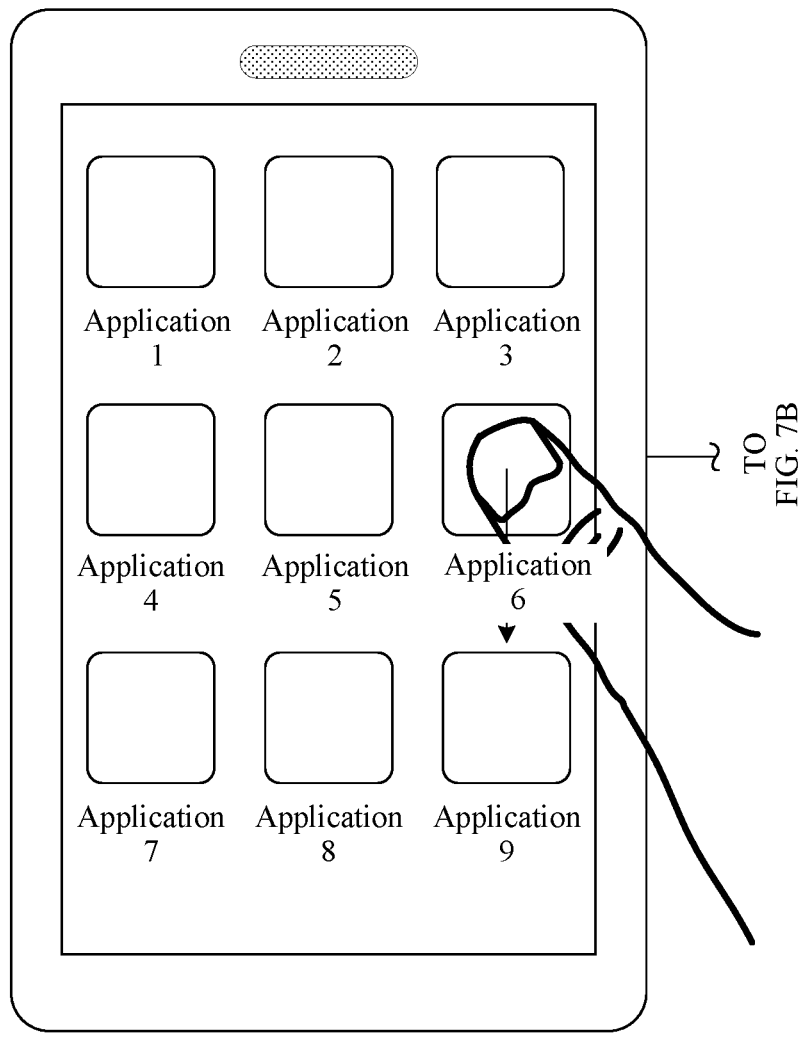
FIG. 7A and FIG. 7B are a schematic diagram of another authentication gesture according to an embodiment of the present invention.
Figure 7B:
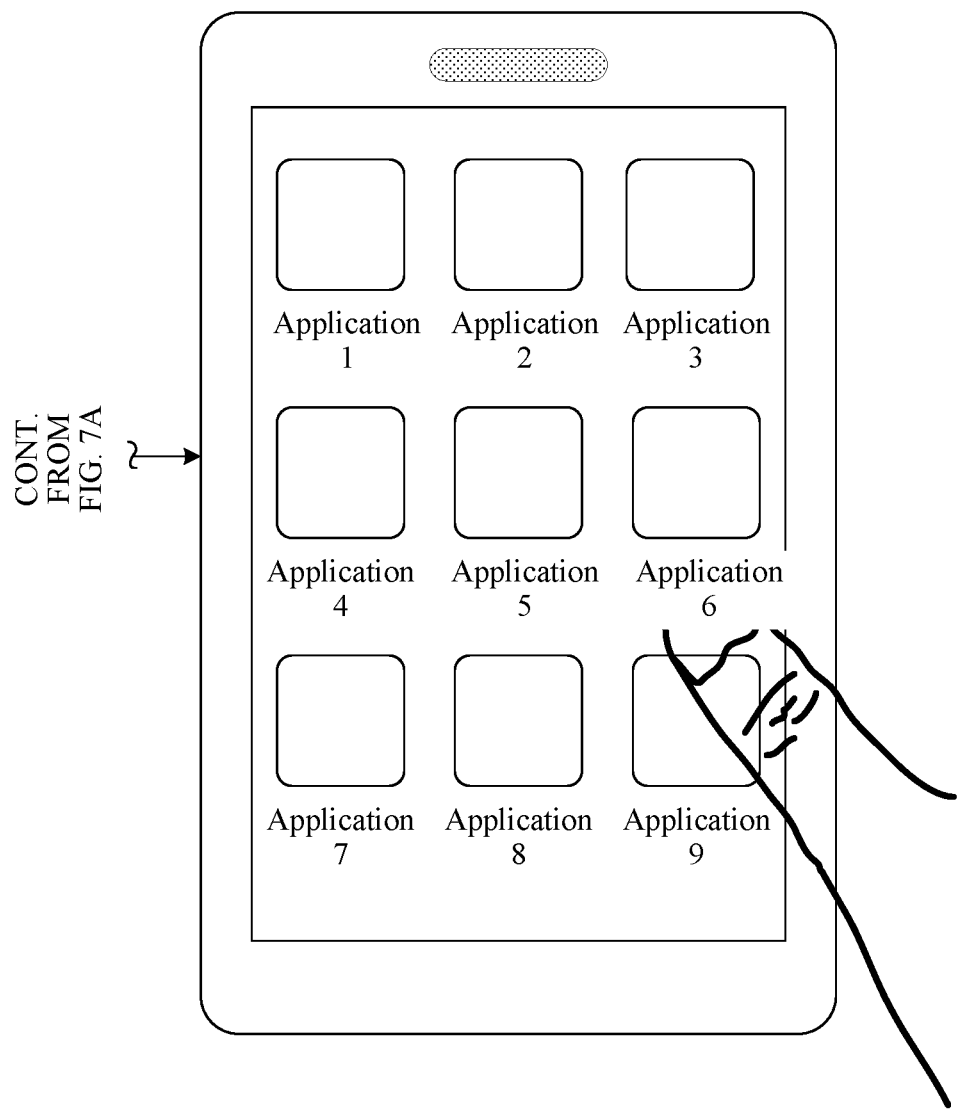
Figure 8A:
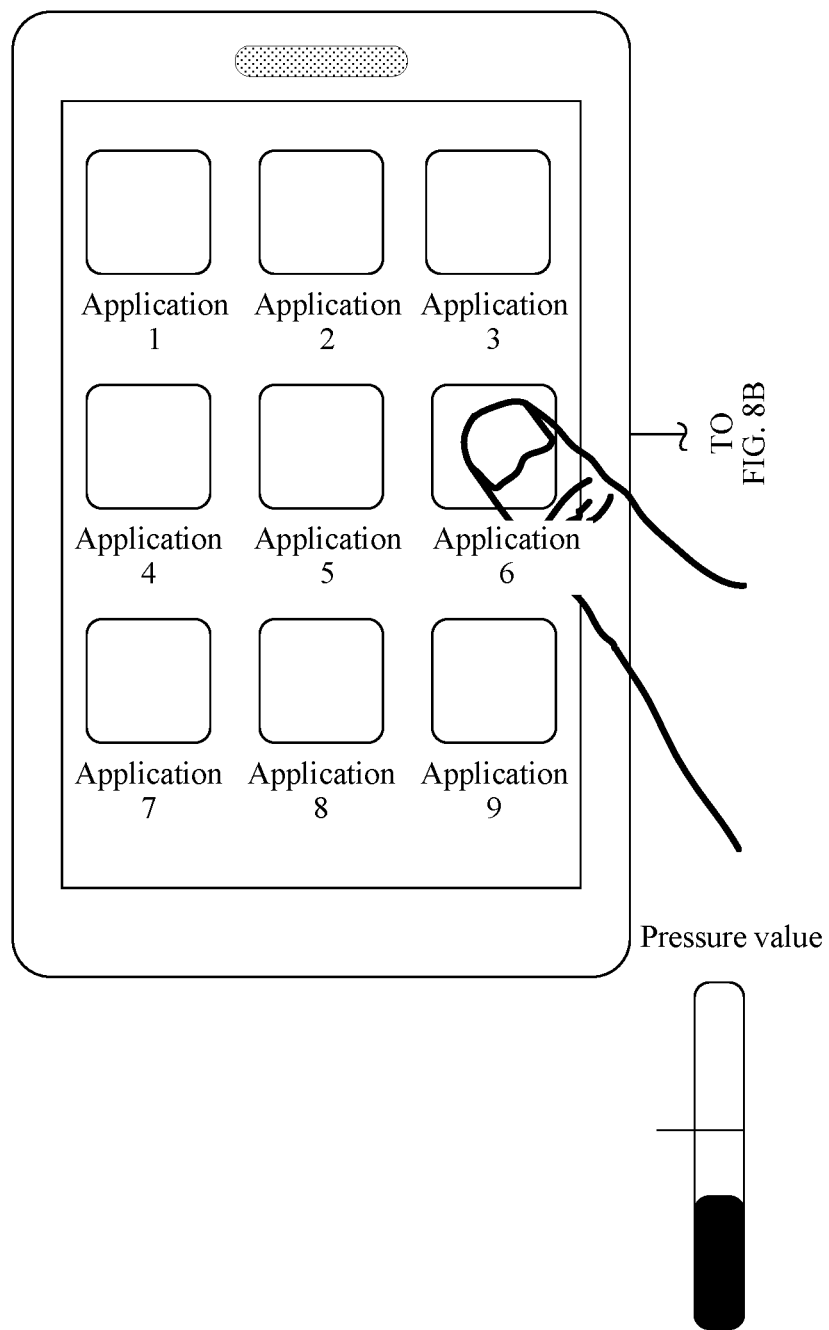
FIG. 8A, FIG. 8B, FIG. 8C, and FIG. 8D are a schematic diagram of another authentication gesture according to an embodiment of the present invention.
Figure 8B:
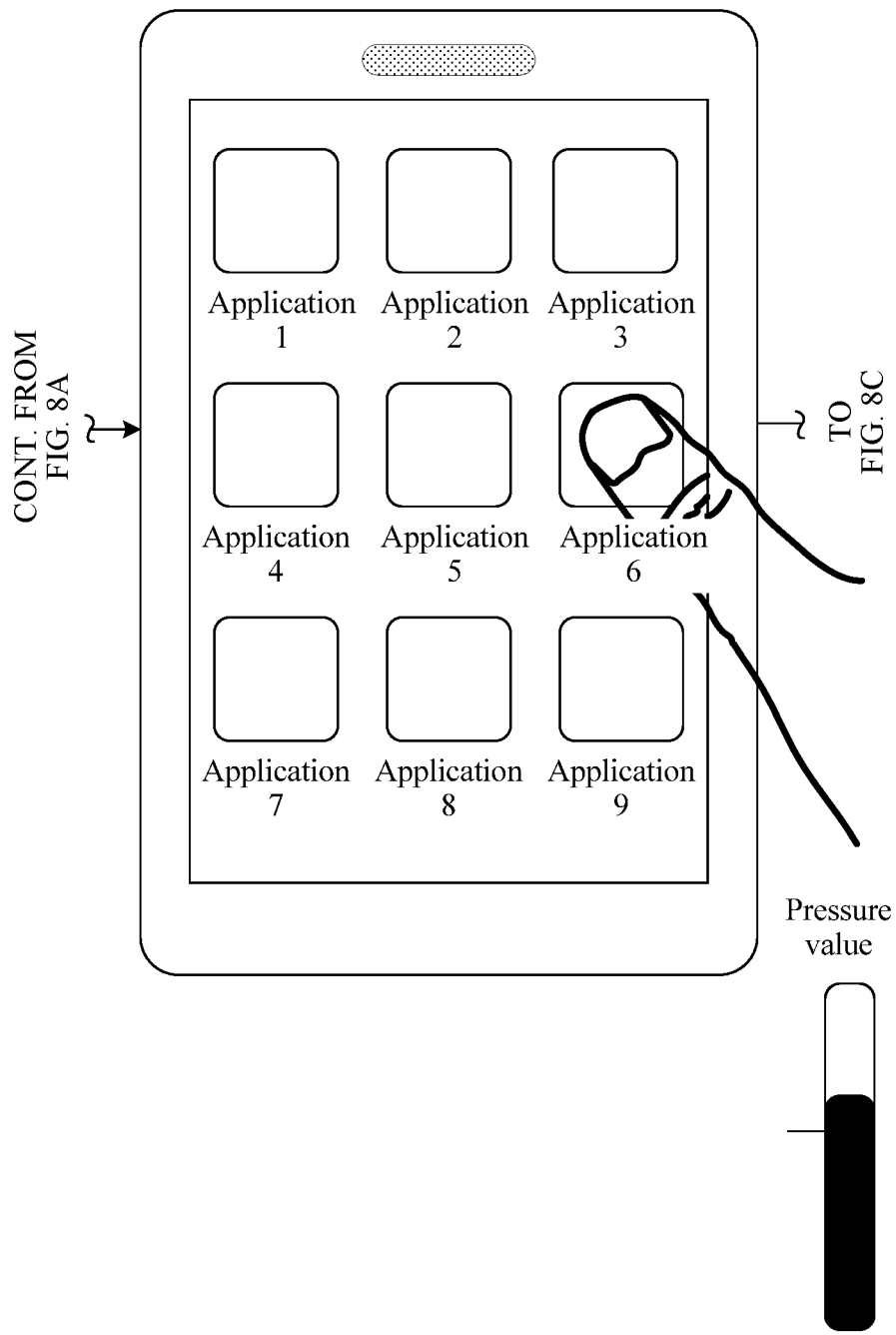
Figure 8C:
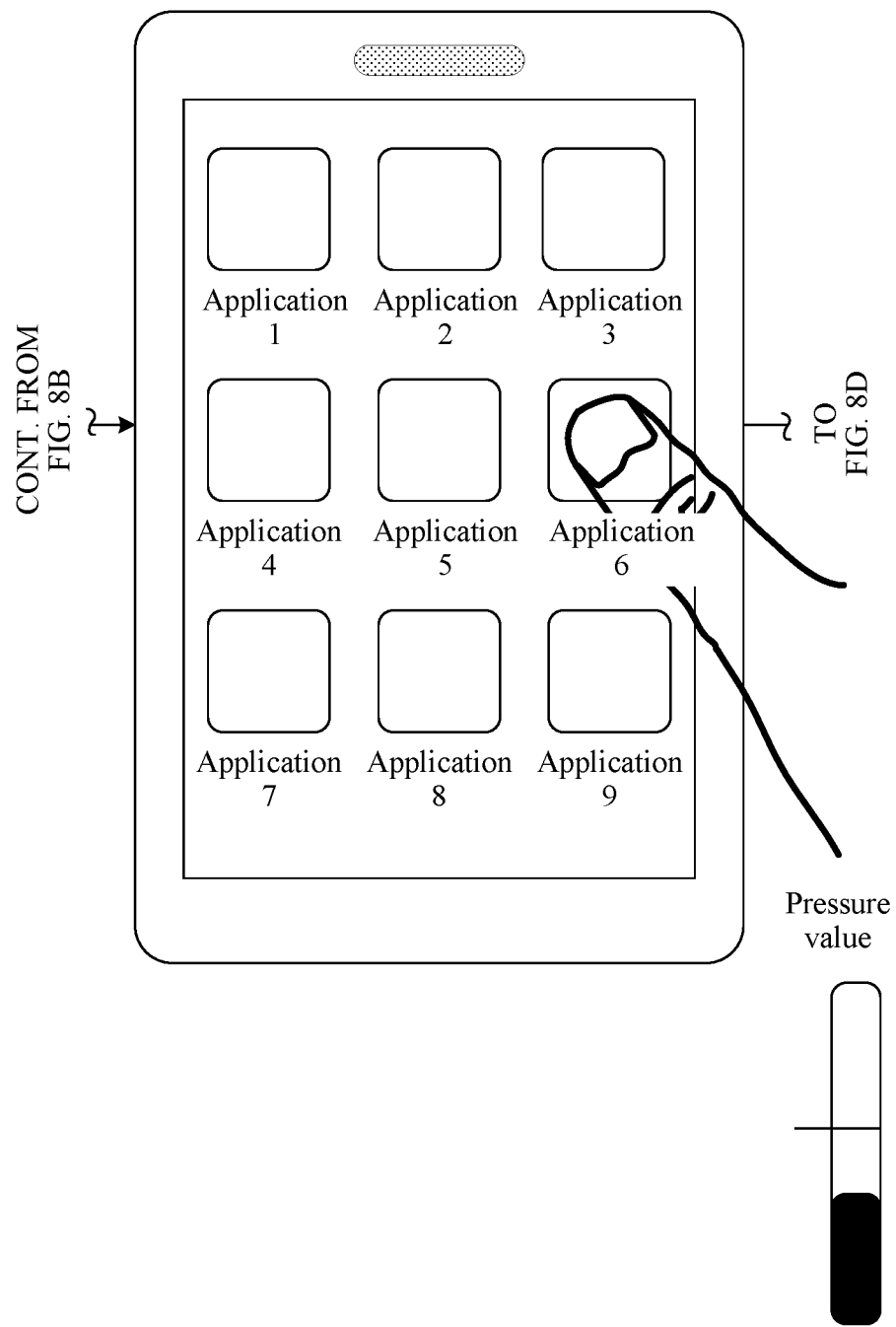
Figure 8D:
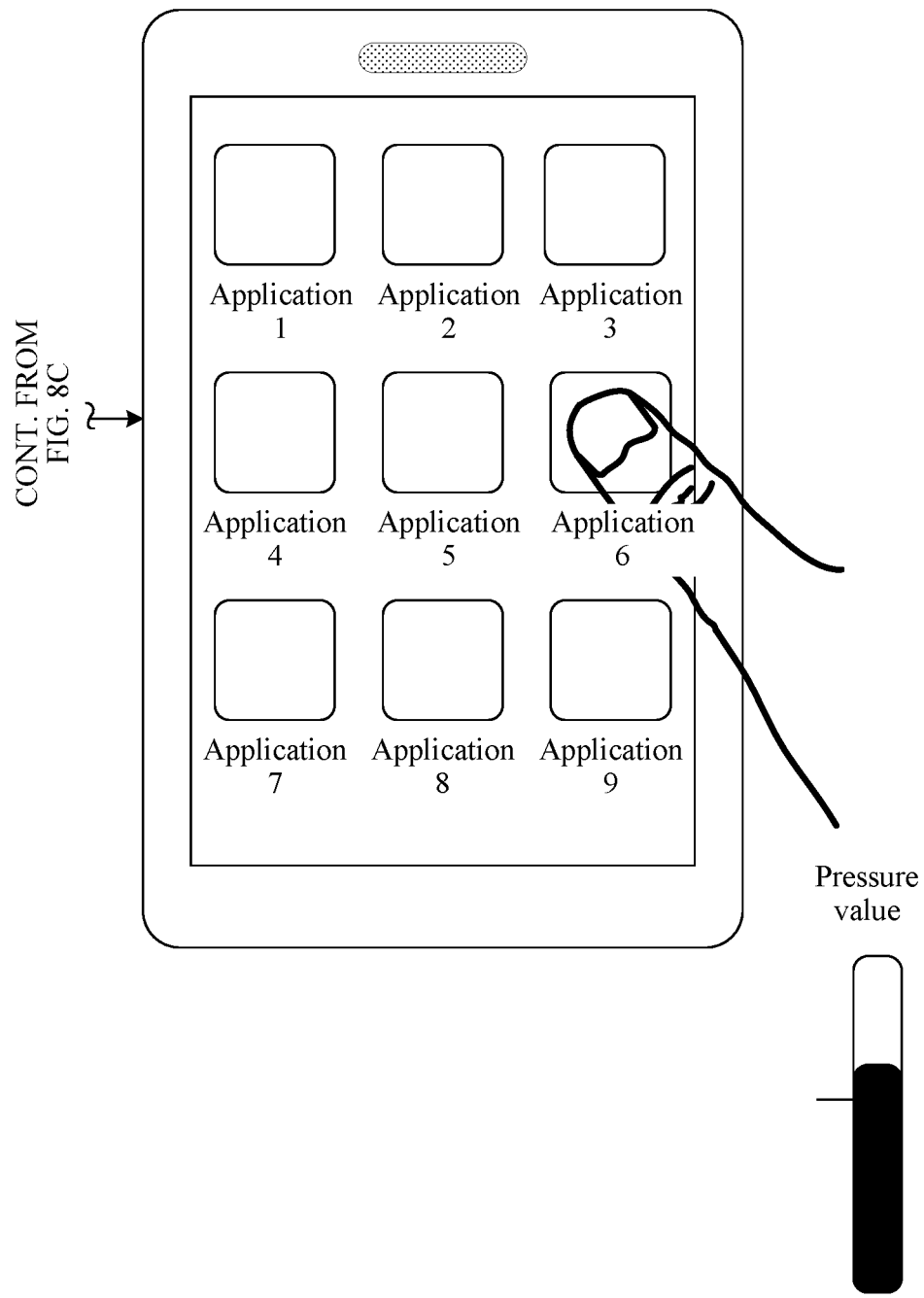
Figures 1, 9:
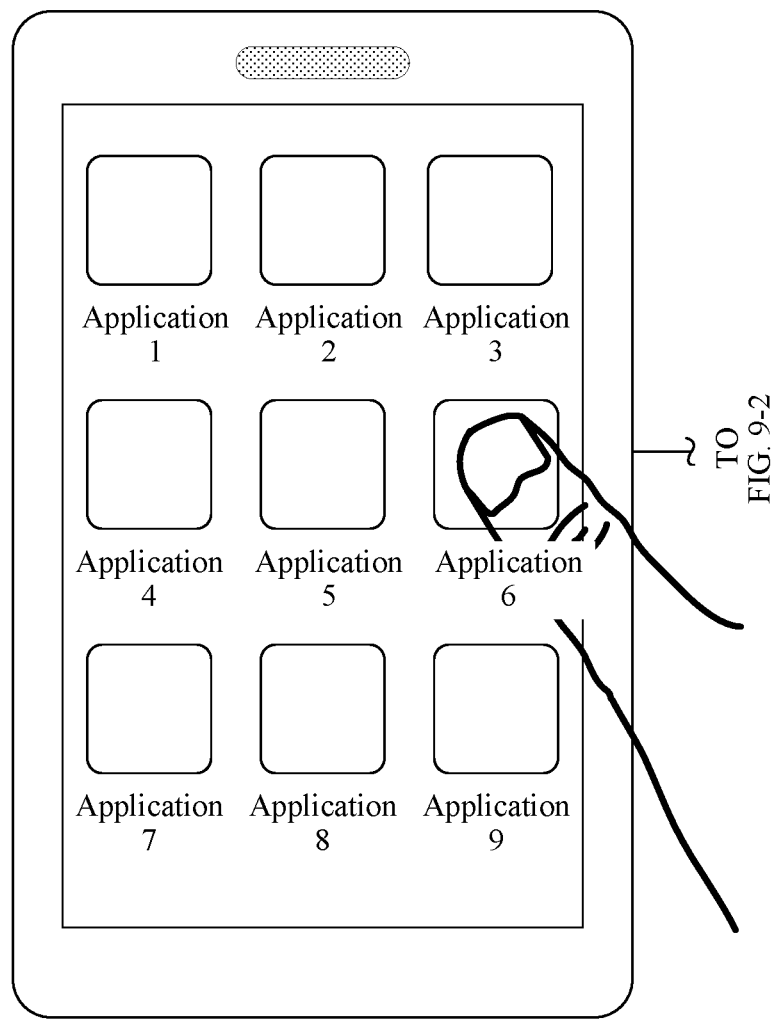
Figures 2, 9:
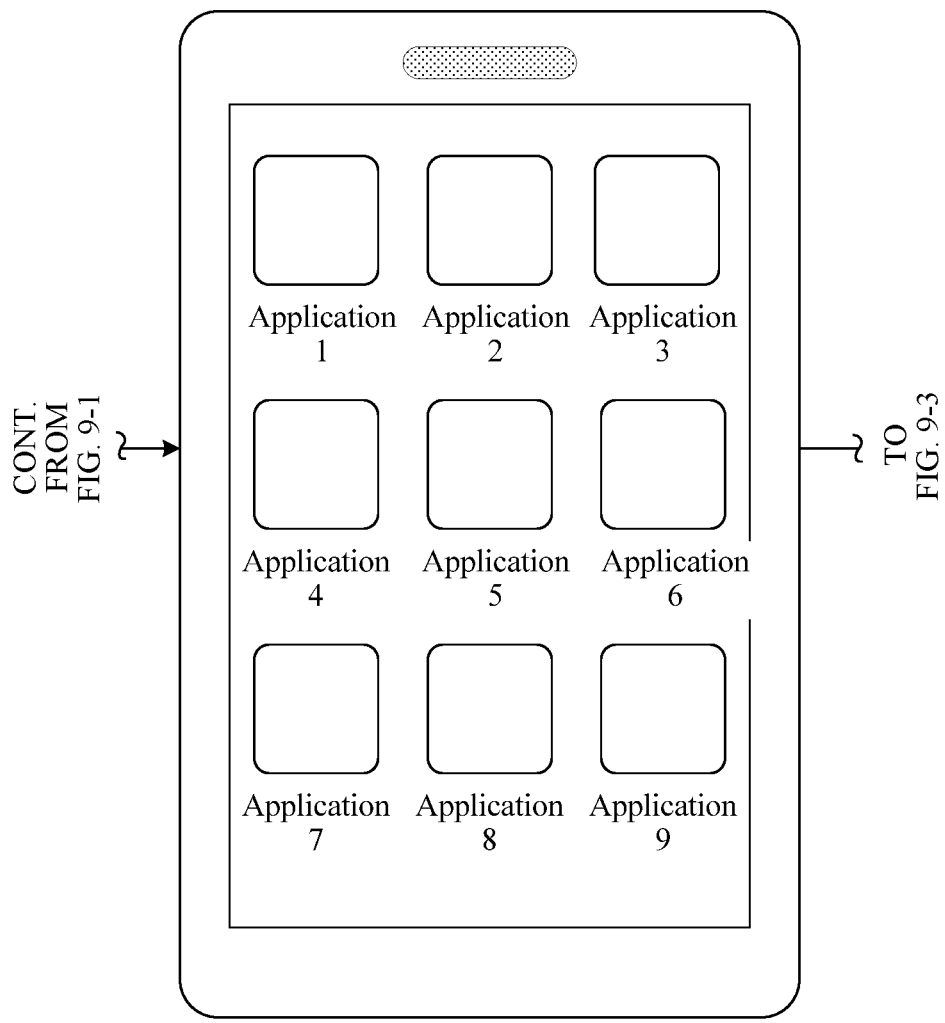
Figures 3, 9:
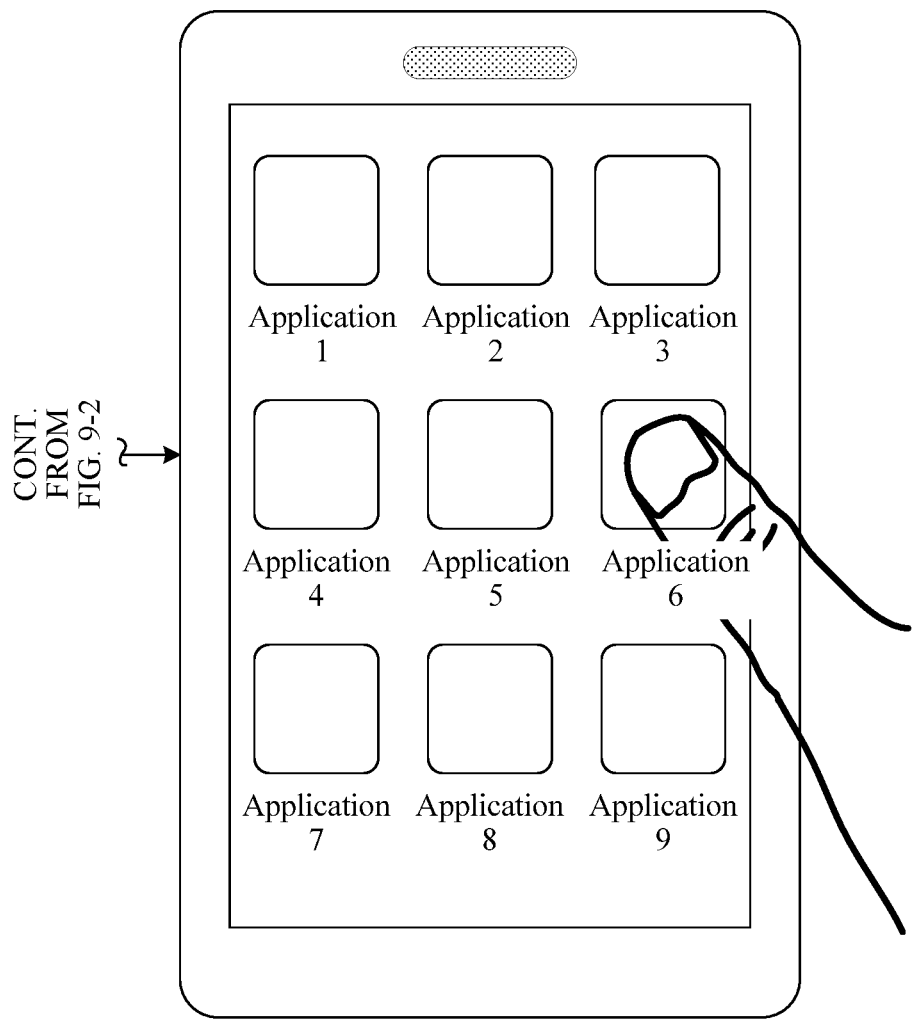
Figure 9A:
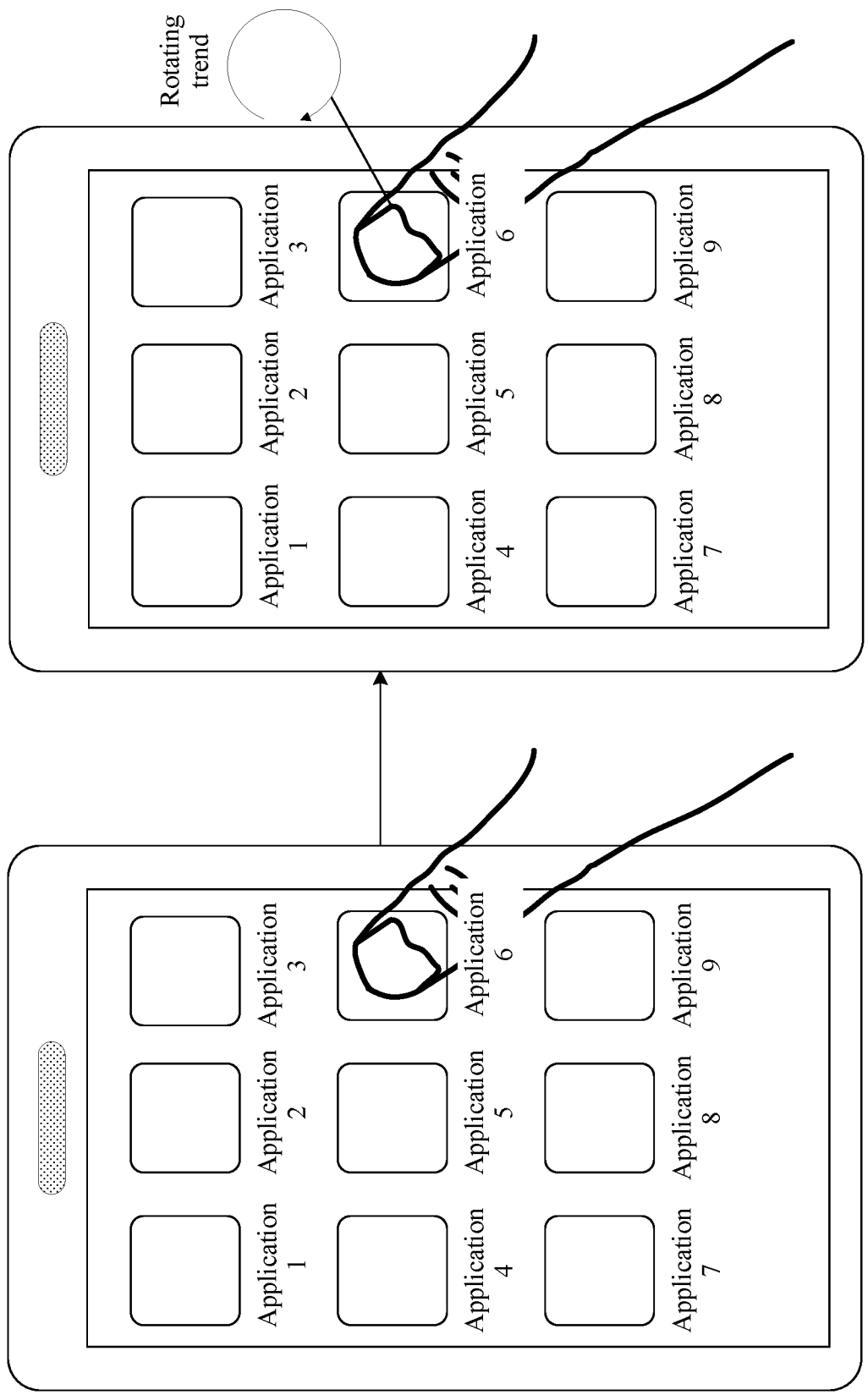
FIG. 9a is a schematic diagram of another authentication gesture according to an embodiment of the present invention.
Figure 9B:
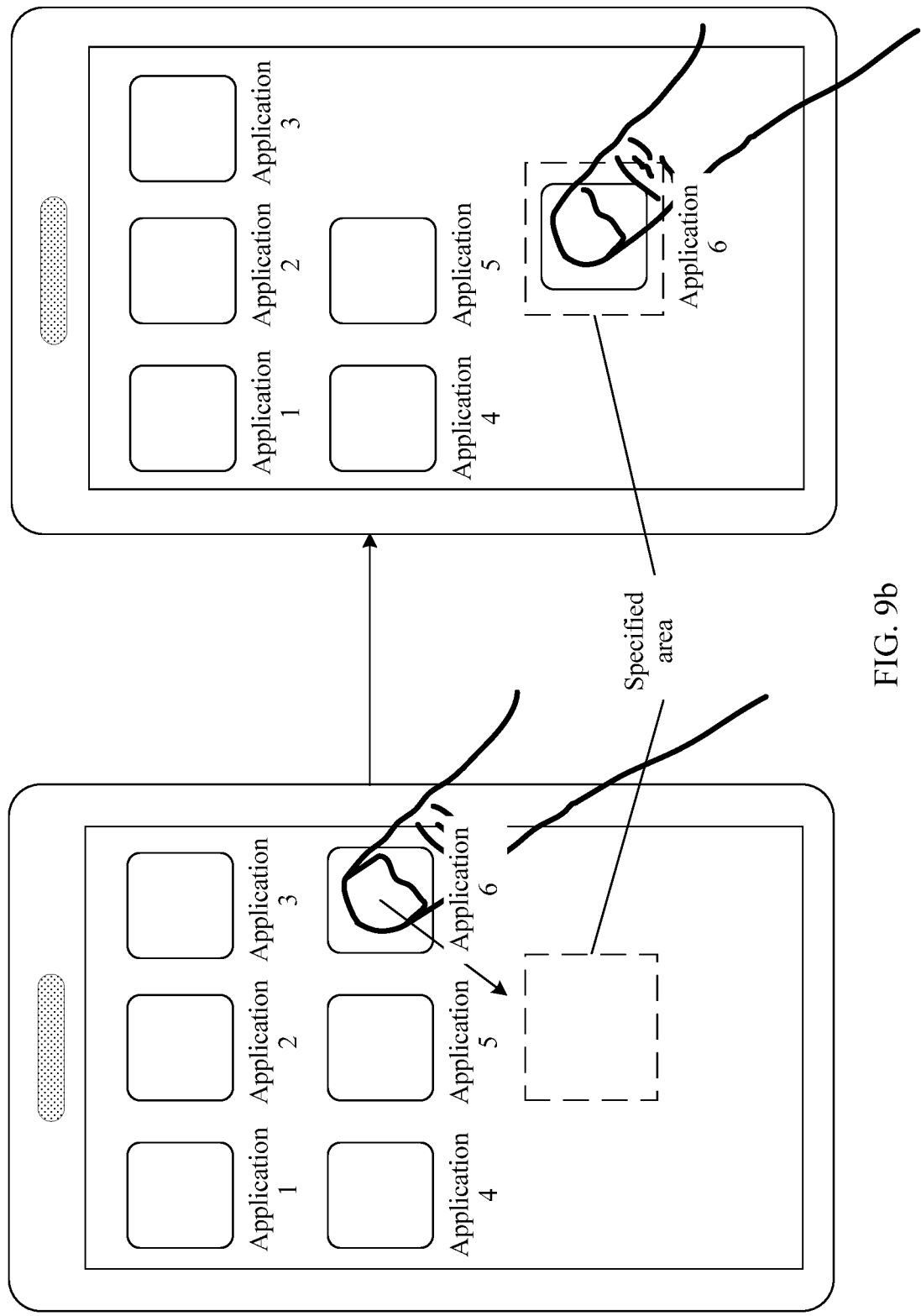
FIG. 9b is a schematic diagram of another authentication gesture according to an embodiment of the present invention.
Figure 9C:
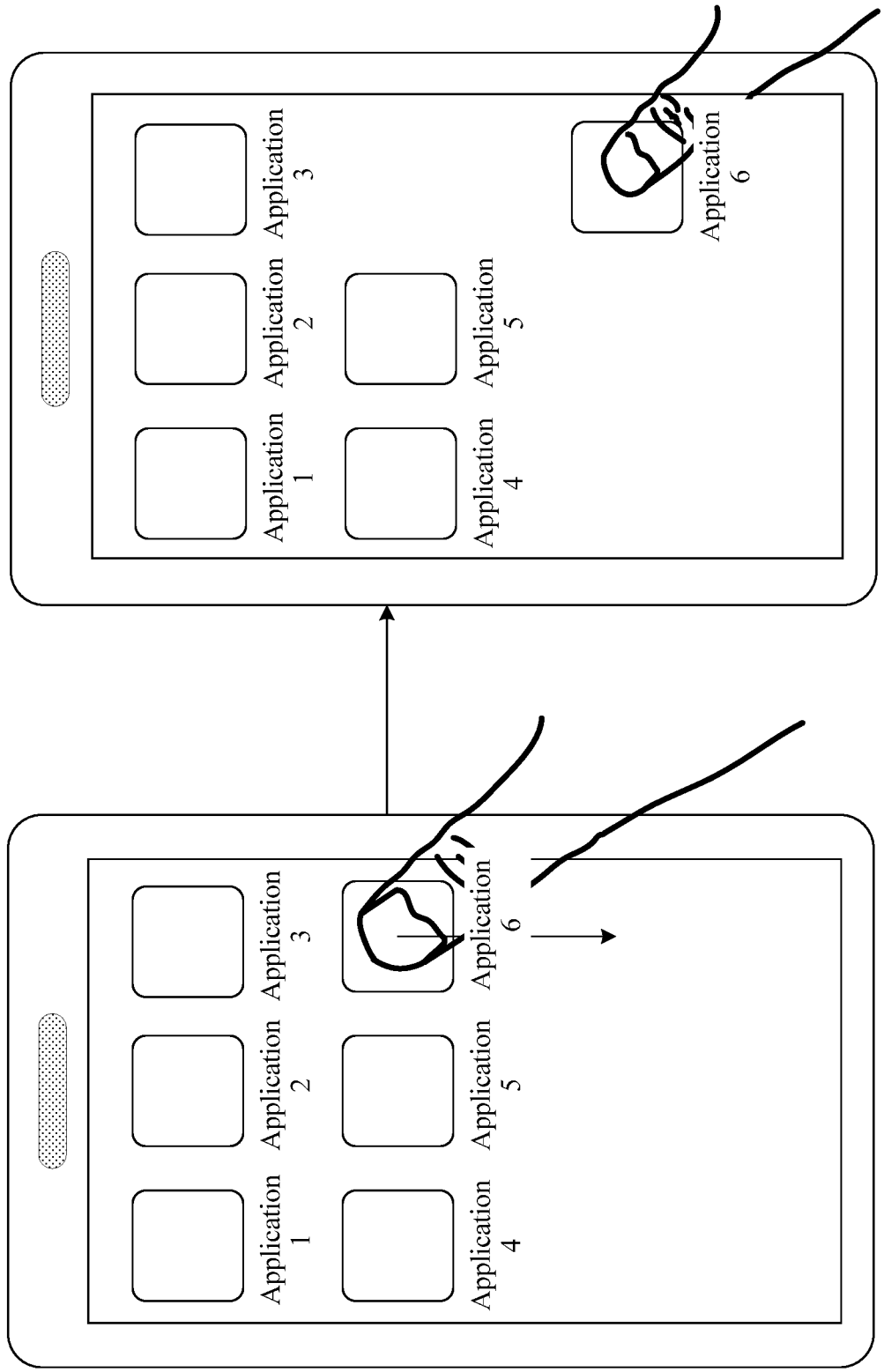
FIG. 9c is a schematic diagram of another authentication gesture according to an embodiment of the present invention.

For example, the pressure recognition gesture is shown in FIG. 3A and FIG. 3B. Specifically, when the user performs a press operation on the touchscreen, and a pressure value of pressing the touchscreen reaches a preset threshold, the authentication gesture is generated. The long-press gesture is shown in FIG. 4A and FIG. 4B. Specifically, when the user performs a long-press operation on the touchscreen, and duration of touching the touchscreen reaches a preset threshold, the authentication gesture is generated. The area change gesture is shown in FIG. 5A and FIG. 5B. Specifically, when the user performs a touch operation on the touchscreen, and a touch area reaches a preset threshold, the authentication gesture is generated. The multi-touch gesture is shown in FIG. 6A and FIG. 6B. Specifically, when the user performs a touch operation on the touchscreen, and a quantity of contacts is greater than or equal to two, the authentication gesture is generated. The sliding gesture is shown in FIG. 7A and FIG. 7B. Specifically, when the user performs a sliding operation on the touchscreen, and a sliding distance reaches a preset threshold, the authentication gesture is generated. The double-press gesture is shown in FIG. 8A, FIG. 8B, FIG. 8C, and FIG. 8D. Specifically, when the user performs two press operations on the touchscreen without leaving the touch object, and a pressure value of pressing the touchscreen for the second time reaches a preset threshold, the authentication gesture is generated. The double-tap gesture is shown in FIG. 9-1, FIG. 9-2, and FIG. 9-3. Specifically, when the user performs a tap operation on the touchscreen, and a quantity of times of tapping a same touch object is greater than or equal to two, the gesture is the authentication gesture. The tangential gesture is shown in FIG. 9a. Specifically, when the user does not perform an obvious movement on the touchscreen, and the finger of the user has at least one of the following trends: upwards, downwards, towards the left, towards the right, and rotating, the authentication gesture is generated. FIG. 9a shows the tangential gesture by using an example in which the finger of the user has the trend of rotating. The specified area gesture is shown in FIG. 9b or FIG. 9c. Specifically, when the user performs a dragging operation on the touch object, and an area to which the touch object is dragged is a specified area (the specified area may be a predefined area, or may be the authentication area), the authentication gesture is generated.

Alternatively, specifically, as shown in FIG. 9c, when the user performs a dragging operation on the touch object, and a dragging distance reaches a preset threshold, the authentication gesture is generated.

It should be noted that a specific form of the gesture used to trigger collection of the fingerprint information, that is, the authentication gesture, is not limited in this embodiment of the present invention. A specific gesture used to trigger the collection of the fingerprint information may be preconfigured in the mobile phone, or may be notified to the user in advance by using prompt information, so that when there is a need to collect the fingerprint information, the user can perform a corresponding touch operation on the touchscreen based on the configuration or the prompt information.

206. The touchscreen of the mobile phone collects fingerprint information of the user on the touchscreen.

If the processor of the mobile phone determines that the obtained first touch gesture is the authentication gesture, the processor of the mobile phone may send another indication to the collection module of the touchscreen of the mobile phone, to instruct to collect the fingerprint information of the user. After the collection module of the touchscreen of the mobile phone receives the indication, the collection module of the touchscreen of the mobile phone may collect the fingerprint information of the user on the touchscreen.

It should be noted that in this embodiment of the present invention, there is no sequence of performing step 206 and step 202 to step 205, that is, after step 201 is performed, step 202 to step 205 may be performed before step 206, or step 206 may be performed before step 202 to step 205. Herein, a sequence of performing step 206 and step 202 to step 205 is not specifically limited in this embodiment of the present invention. That is, after determining the touch object, the touchscreen of the mobile phone may first determine whether the touch object is included in the preset whitelist and determine whether the first touch gesture is the authentication gesture, and then collects the fingerprint information of the user on the touchscreen when determining that the touch object is included in the whitelist and the first touch gesture is the authentication gesture. Alternatively, the touchscreen of the mobile phone may first collect the fingerprint information of the user on the touchscreen, and then determines whether the touch object is included in the preset whitelist and determines whether the first touch gesture is the authentication gesture.

After collecting the fingerprint information of the user, the collection module of the touchscreen of the mobile phone may send the collected fingerprint information to the processor of the mobile phone. After receiving the fingerprint information, the processor of the mobile phone may perform fingerprint authentication by using the fingerprint information. Specifically, the following step 207 may be performed:

207. The processor of the mobile phone determines whether the fingerprint information matches pre-stored fingerprint information.

After receiving the fingerprint information of the user, the processor of the mobile phone may determine whether the collected fingerprint information matches the pre-stored fingerprint information. If it is determined that the collected fingerprint information does not match the pre-stored fingerprint information, it indicates that the collected fingerprint information fails to be authenticated by using a fingerprint. In this case, the following step 208 may be performed. If it is determined that the collected fingerprint information matches the pre-stored fingerprint information, it indicates that the collected fingerprint information is authenticated by using a fingerprint. In this case, the following step 209 may be performed.

208. The touchscreen of the mobile phone displays second prompt information.

The second prompt information is used to prompt the user that the fingerprint information is not matched. If the processor of the mobile phone determines that the collected fingerprint information does not match the pre-stored fingerprint information, the processor of the mobile phone may send still another indication to the display module of the touchscreen of the mobile phone, to instruct the display module of the touchscreen of the mobile phone to display the second prompt information. After receiving the indication, the display module of the touchscreen of the mobile phone may display the second prompt information used to prompt the user that the fingerprint information is not matched.

Certainly, the mobile phone may make no response to the first touch operation of the user, to indicate that the fingerprint information is not matched.

209. The processor of the mobile phone obtains, based on a pre-stored correspondence between fingerprint information and authentication information, authentication information corresponding to the collected fingerprint information.

The authentication information includes at least one of a login account and password, a payment password, an unlocking password, an encryption password, a decryption password, and a function instruction.

If determining that the collected fingerprint information matches the pre-stored fingerprint information, the processor of the mobile phone may obtain, based on the pre-stored correspondence between fingerprint information and the authentication information, the authentication information corresponding to the collected fingerprint information.

After obtaining the authentication information corresponding to the collected fingerprint information, the processor of the mobile phone may perform an operation corresponding to the authentication information. Specifically, the following step 210 to step 212 may be performed.

210. The processor of the mobile phone determines whether secondary authentication is performed on the touch object.

After obtaining the authentication information corresponding to the fingerprint information, the processor of the mobile phone may determine whether the secondary authentication needs to be performed on the touch object. If the secondary authentication does not need to be performed, the following step 212 may be directly performed. If the secondary authentication needs to be performed, step 211 needs to be performed before step 212.

For example, in a scenario in which the touch object is an application, a touch object on which the secondary authentication needs to be performed is usually an application having a payment function, for example, an application such as Alipay, PayPal, and WeChat; and a touch object on which the secondary authentication does not need to be performed is usually an application having only a login function, for example, an application such as Twitter and WhatsApp.

In this embodiment of the present invention, step 210 may be specifically implemented in the following three manners.

Manner 1: The processor of the mobile phone determines, based on an authentication level corresponding to the authentication information, whether the secondary authentication needs to be performed on the touch object.

The authentication level includes a first level and a second level. The first level is an authentication level at which the secondary authentication does not need to be performed, and the second level is an authentication level at which the secondary authentication needs to be performed. After obtaining the authentication information corresponding to the fingerprint information, the processor of the mobile phone may determine, based on a pre-stored correspondence between authentication information and authentication level, the authentication level corresponding to the authentication information, and determine, based on the authentication level corresponding to the authentication information, whether the secondary authentication needs to be performed. If the authentication level corresponding to the authentication information is the first level, it is determined that the secondary authentication does not need to be performed on the touch object. If the authentication level corresponding to the authentication information is the second level, it is determined that the secondary authentication needs to be performed on the touch object.

Manner 2: The processor of the mobile phone determines, based on an authentication area in which the touch object is located, whether the secondary authentication needs to be performed on the touch object.

For example, in specific implementation, the touchscreen of the mobile phone may be divided into a common area and an authentication area, and the authentication area includes a first area and a second area. In addition, the whitelist includes the first area and the second area. The first area is an authentication area in which the secondary authentication does not need to be performed, and the second area is an authentication area in which the secondary authentication needs to be performed. After obtaining the authentication information corresponding to the fingerprint information, the processor of the mobile phone may determine the authentication area in which the touch object is located, and determine, based on the authentication area in which the touch object is located, whether the secondary authentication needs to be performed. If the authentication area in which the touch object is located is the first area, it is determined that the secondary authentication does not need to be performed on the touch object. If the authentication area in which the touch object is located is the second area, it is determined that the secondary authentication needs to be performed on the touch object.

In addition, in a scenario in which the touch object is an application, when the application is installed, the mobile phone starts for the first time, or an application icon is arranged, the mobile phone may automatically display the application icon of the application in a corresponding area based on whether the application supports the fingerprint authentication and whether the secondary authentication needs to be performed. For example, an application icon of an application that does not support the fingerprint authentication may be displayed in the common area. In applications that support the fingerprint authentication, an application icon of an application on which the secondary authentication does not need to be performed may be displayed in the first area, and in the applications that support the fingerprint authentication, an application icon of an application on which the secondary authentication needs to be performed is displayed in the second area. For example, an application having both the login function and the payment function is displayed in the second area, an application having only the login function is displayed in the first area, and an application that does not need to be logged in and does not have the payment function is displayed in the common area.

In addition, the mobile phone may enable an area to follow an application, based on whether the application supports the fingerprint authentication and whether the secondary authentication needs to be performed. For example, if the application does not support the fingerprint authentication, an area near an application icon of the application is an area that does not support the fingerprint authentication. If primary authentication needs to be performed on the application, the area near the application icon of the application is an area in which the primary authentication needs to be performed. If the secondary authentication needs to be performed on the application, the area near the application icon of the application is the area in which the secondary authentication needs to be performed. In addition, when the application is installed, the mobile phone starts for the first time, or an application icon is arranged, the mobile phone may automatically classify an application icon of another application into a corresponding area based on whether the another application supports the fingerprint authentication and whether the secondary authentication needs to be performed. For example, if Alipay is an application on which the secondary authentication needs to be performed, an area near an application icon of Alipay is an area in which the secondary authentication needs to be performed. In addition, when WeChat is installed, the mobile phone may display an application icon of WeChat in the area near the application icon of Alipay.

Manner 3: The processor of the mobile phone determines, based on an area of the collected fingerprint information, whether the secondary authentication needs to be performed on the touch object.

For example, a threshold may be preset, and after obtaining the authentication information corresponding to the fingerprint information, the processor of the mobile phone may determine whether the collected fingerprint information is greater than the threshold. If the collected fingerprint information is not greater than the threshold, the processor of the mobile phone determines that the secondary authentication does not need to be performed on the touch object. If the collected fingerprint information is greater than the threshold, the processor of the mobile phone determines that the secondary authentication needs to be performed on the touch object. In this implementation, the user needs to adjust, based on whether the secondary authentication needs to be performed, a finger area in contact with the touchscreen when performing the touch operation on the touchscreen, so that the processor of the mobile phone can collect fingerprint information of different areas, and determine, based on the areas of the fingerprint information, whether the secondary authentication needs to be performed.

211. The processor of the mobile phone obtains an authentication operation of the user, and determines whether the authentication operation meets an authentication confirmation condition.

If determining that the secondary authentication needs to be performed on the touch object, the processor of the mobile phone may obtain the authentication operation of the user, and determine whether the obtained authentication operation meets the authentication confirmation condition. If the authentication operation meets the authentication confirmation condition, the following step 212 may be performed. If the authentication operation of the user does not meet the authentication confirmation condition, the following step 213 may be performed.

In this embodiment of the present invention, step 211 may be specifically implemented in the following two manners.

Manner 1: The processor of the mobile phone obtains a second touch gesture of the user, and determines whether the second touch gesture is an authentication confirmation gesture.

The second touch gesture is a gesture used when the user performs a second touch operation on the touchscreen. If determining that the secondary authentication needs to be performed on the touch object, the processor of the mobile phone may first obtain the second touch gesture of the user when the touchscreen of the mobile phone detects the second touch operation performed by the user on the touchscreen. Then, the processor of the mobile phone determines whether the second touch gesture is the authentication confirmation gesture. If the second touch gesture is the authentication confirmation gesture, it indicates that the authentication operation of the user meets the authentication confirmation condition. If the second touch gesture is not the authentication confirmation gesture, it indicates that the authentication operation of the user does not meet the authentication confirmation condition.

The second touch gesture may be at least one of a pressure recognition gesture, a long-press gesture, an area change gesture, a multi-touch gesture, a sliding gesture, a double-press gesture, a double-tap gesture, a tangential gesture, and a specified area gesture. Specific descriptions of the second touch gesture are similar to those of the first touch gesture. For the specific descriptions of the second touch gesture, refer to the specific descriptions of the first touch gesture in step 204. Details are not described in this embodiment of the present invention again.

It should be noted that in this embodiment of the present invention, the authentication confirmation gesture and the authentication gesture in step 205 may use a same gesture, or may use different gestures. For specific forms of the authentication confirmation gesture, refer to the specific forms of the authentication gesture in step 205. Details of the authentication confirmation gesture are not described in this embodiment of the present invention again.

Manner 2: The processor of the mobile phone determines whether a cancellation operation of the user is detected within a preset time period.

If determining that the secondary authentication needs to be performed on the touch object, the processor of the mobile phone may send still another indication to the display module of the touchscreen of the mobile phone, to instruct the display module to display a cancellation prompt, and determine whether the cancellation operation of the user for the cancellation prompt is detected within the preset time period. If the cancellation operation of the user is not detected within the preset time period, it indicates that the authentication operation of the user meets the authentication confirmation condition. If the cancellation operation of the user is detected within the preset time period, it indicates that the authentication operation of the user does not meet the authentication confirmation condition.

212. The processor of the mobile phone performs an operation corresponding to the authentication information.

213. The processor of the mobile phone does not perform the operation corresponding to the authentication information.

The touchscreen of the terminal device provided in this embodiment of the present invention has the fingerprint recognition function. Therefore, when the user performs the touch operation on the touchscreen, fingerprint recognition may be implemented on the screen of the terminal device. In addition, the terminal device may collect the fingerprint information of the user by using the touchscreen only when determining that the object in the area corresponding to the touch operation of the user is included in the preset whitelist. In this way, power consumption caused by performing fingerprint recognition on the screen is reduced.

In addition, if the touch object is not included in the whitelist, the terminal device may display the first prompt information, so that the user can learn that the object in the area corresponding to the touch operation does not support the fingerprint authentication, thereby improving user experience. After the terminal device determines that the object in the area corresponding to the touch operation of the user is included in the preset whitelist, further, the terminal device collects the fingerprint information of the user by using the touchscreen only when determining that the touch gesture of the user is the authentication gesture, so as to prevent the fingerprint information from being incorrectly collected. The terminal device may perform the corresponding operation by using the collected fingerprint information. Compared with a case in which the user implements a corresponding operation by entering tedious information, a user operation is simplified, and user experience is improved. Moreover, for a touch object on which the secondary authentication needs to be performed, the terminal device performs a function corresponding to the authentication information only when determining that the authentication operation of the user meets the authentication confirmation condition, so as to prevent a function instruction corresponding to the authentication information from being incorrectly executed. When the fingerprint information fails to be authenticated by using the fingerprint, the terminal device displays the second prompt information, so that the user can learn that the fingerprint information is not matched, thereby improving user experience.

To facilitate understanding of a person skilled in the art, in the embodiments of the present invention, the fingerprint recognition method provided in the embodiments of the present invention is described based on different application scenarios.

In each of the following scenarios, an example in which an authentication gesture is a pressure recognition gesture and a terminal device is a mobile phone is used. Certainly, the authentication gesture in each application scenario may alternatively be another authentication gesture, which is similar to the case in which the authentication gesture is the pressure recognition gesture. Authentication gestures are not described in detail one by one in this embodiment of the present invention.

Figure 10:
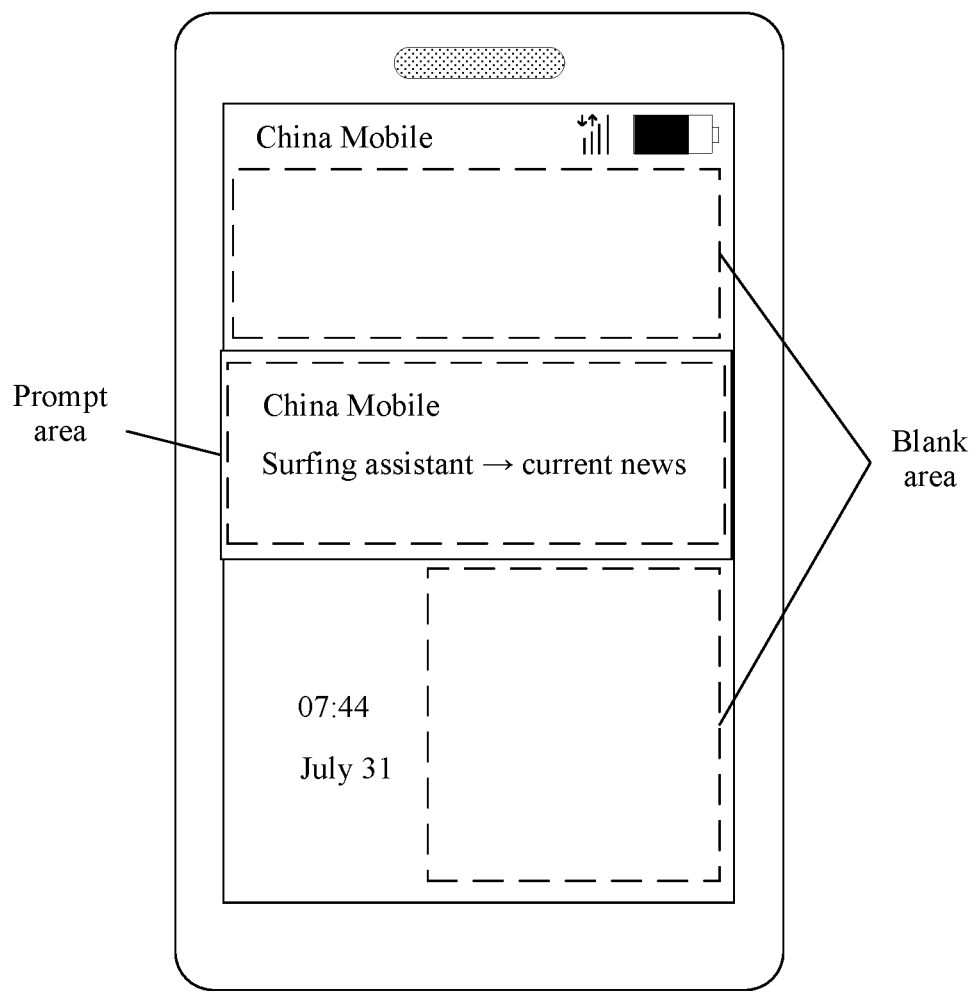
FIG. 10 is a schematic diagram of a scenario in which a fingerprint recognition method in an embodiment of the present invention is applied according to an embodiment of the present invention.

Scenario 1: A lock screen displayed on the mobile phone is shown in FIG. 10, and prompt information is displayed on the lock screen. The lock screen is a screen displayed when the mobile phone is in a lock screen state after the mobile phone is locked. In the lock screen state, a user can perform only some simple operations on the mobile phone, for example, photographing and making an emergency call.

It is assumed that in this scenario, a whitelist includes a blank area of the lock screen and a prompt area of the lock screen. For the blank area and the prompt area of the lock screen, refer to FIG. 10. Authentication information includes at least one of an unlocking password and a function instruction. The function instruction is used to instruct to display a content detail screen of the prompt information.

Figure 11A:
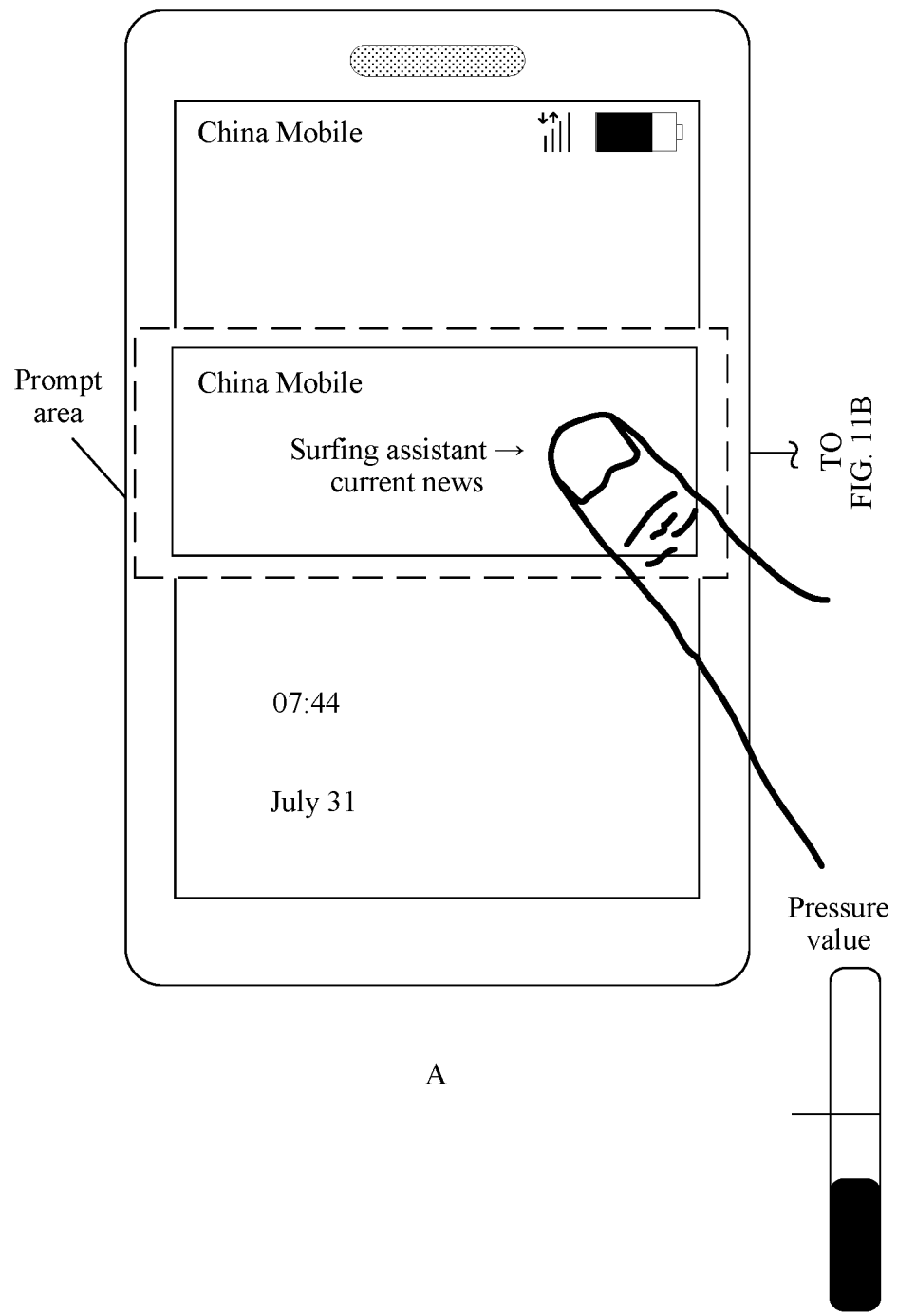
FIG. 11A, FIG. 11B, and FIG. 11C are a schematic diagram of another scenario in which a fingerprint recognition method in an embodiment of the present invention is applied according to an embodiment of the present invention.
Figure 11B:
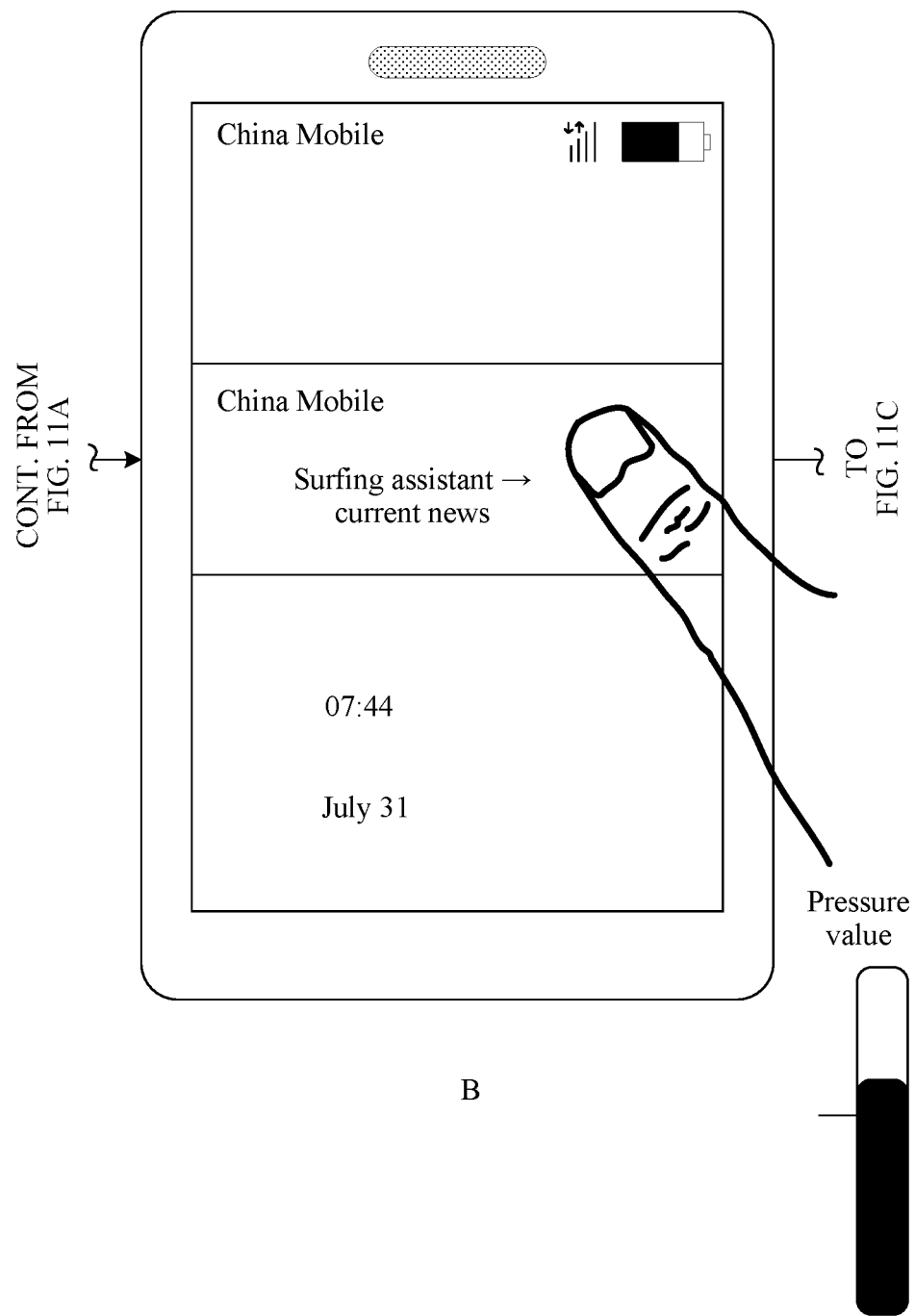
Figure 11C:
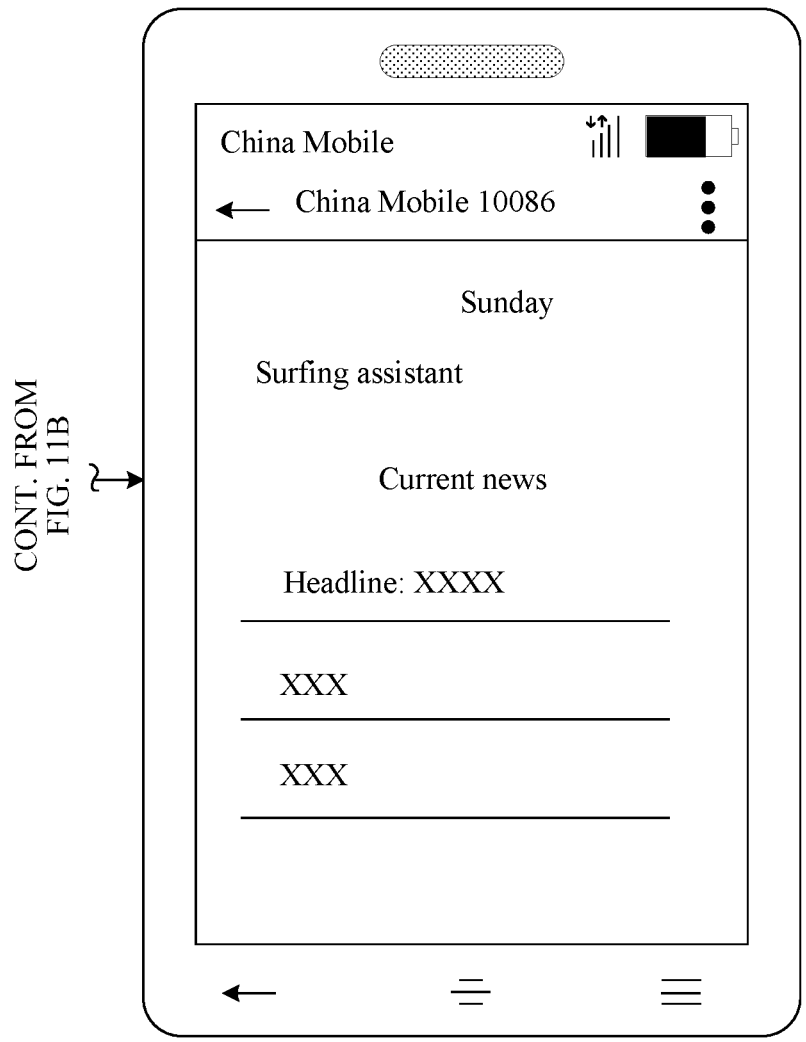

For example, as shown in A in FIG. 11, it is assumed that the user performs a press operation on the prompt information displayed on the screen. In this case, the terminal device may detect the press operation of the user, and determine that a touch object is the prompt area of the lock screen. As shown in B in FIG. 11, a pressure value of pressing the prompt information by the user reaches a preset threshold. Because the prompt area of the lock screen is included in the whitelist, the terminal device may collect fingerprint information of the user. As shown in C in FIG. 11, after the terminal device collects the fingerprint information, when the fingerprint information is authenticated by using a fingerprint, the mobile phone may be unlocked by using an obtained unlocking password and function instruction corresponding to the fingerprint information, and the content detail screen of the prompt information is displayed.

Figure 12A:
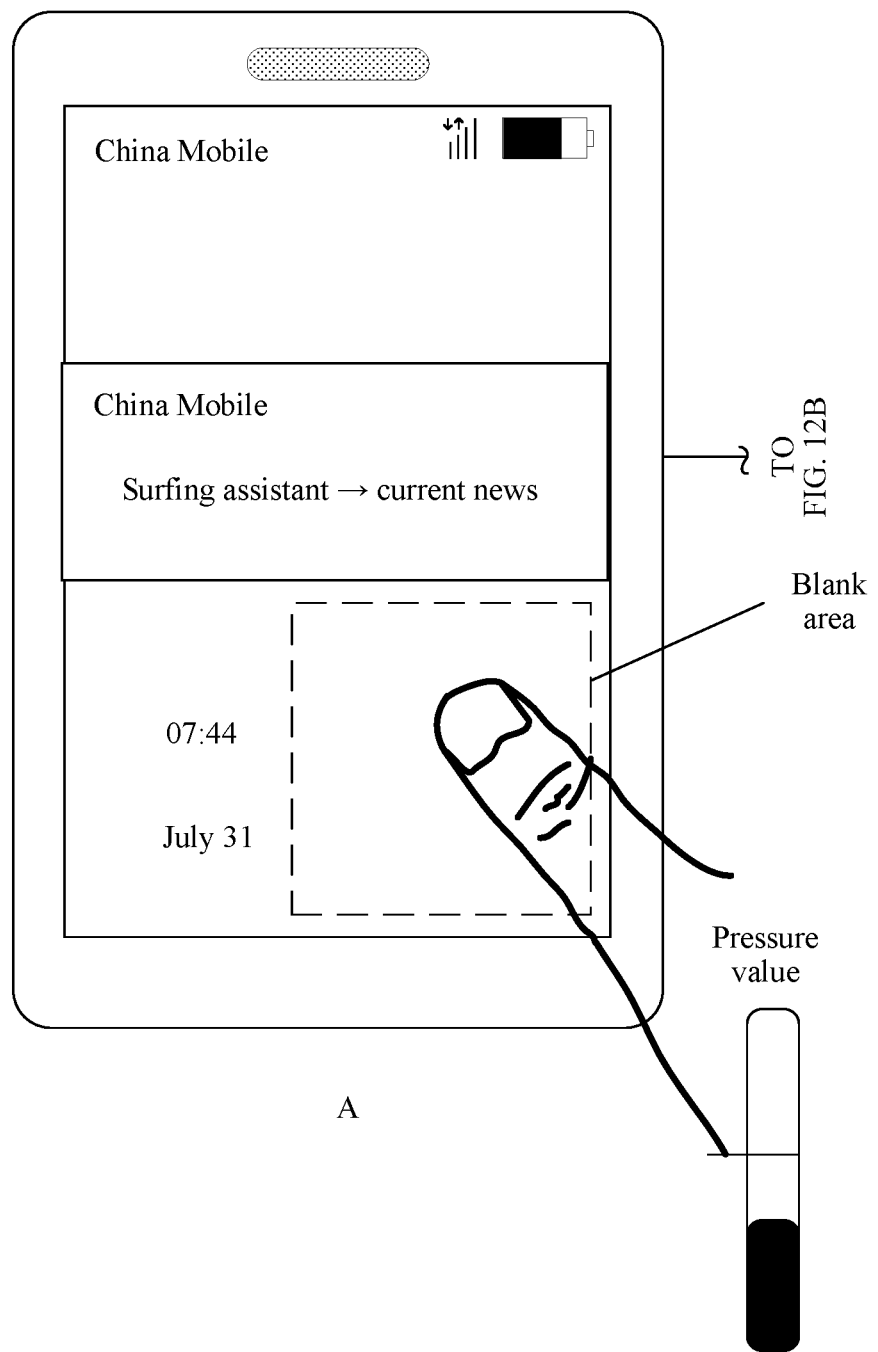
FIG. 12A, FIG. 12B, and FIG. 12C are a schematic diagram of another scenario in which a fingerprint recognition method in an embodiment of the present invention is applied according to an embodiment of the present invention.
Figure 12B:
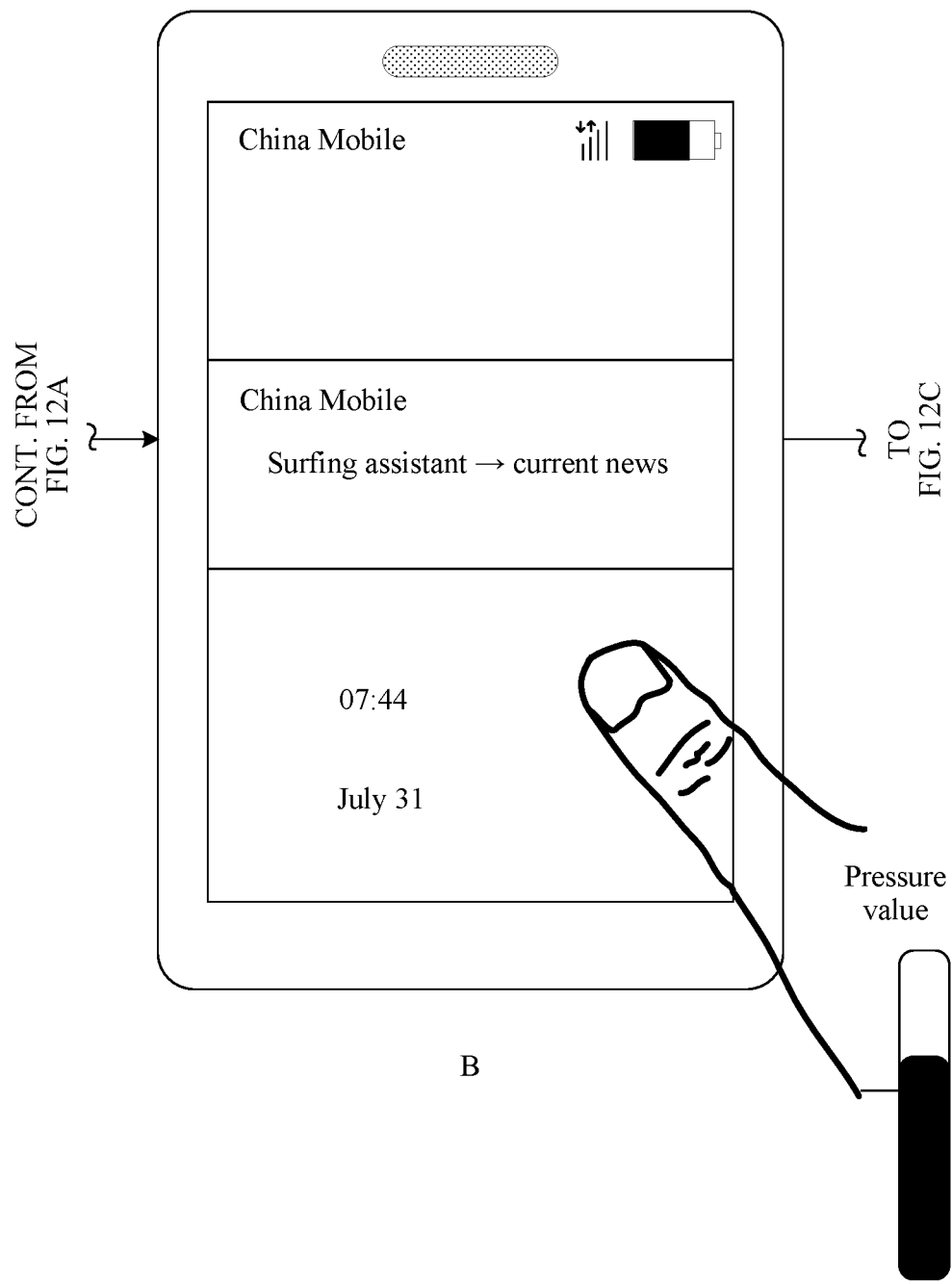
Figure 12C:
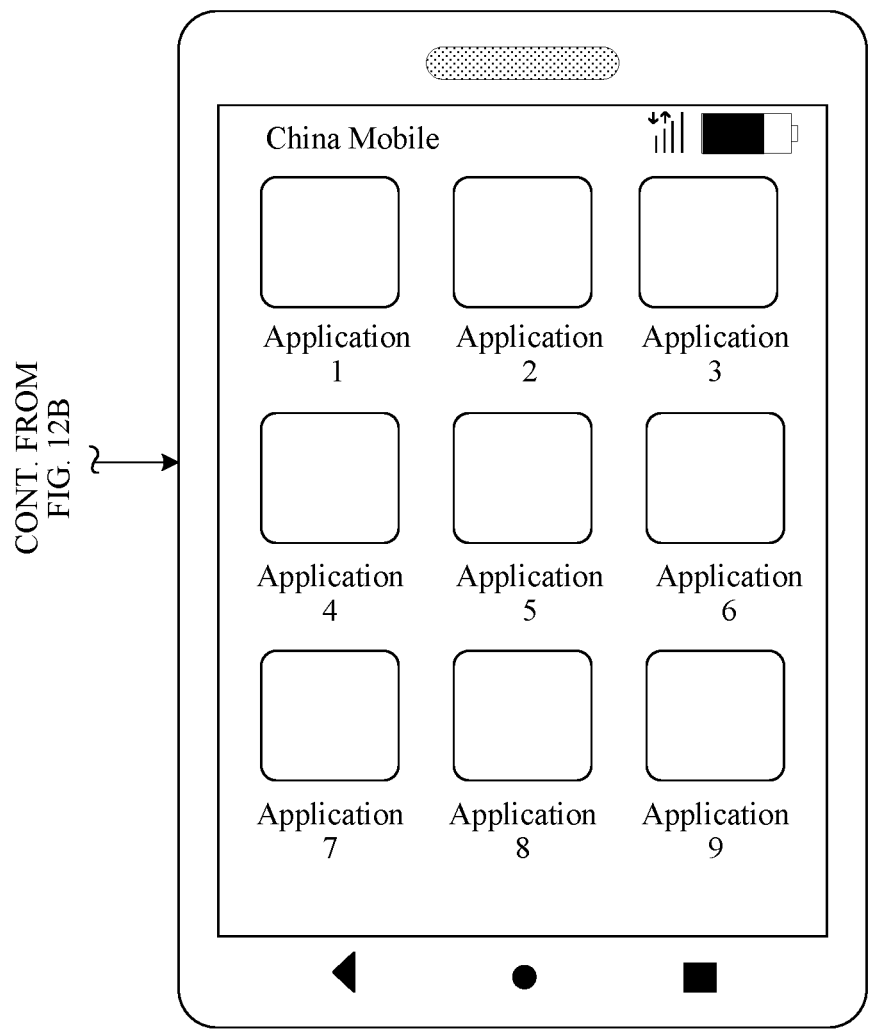

For another example, as shown in A in FIG. 12, it is assumed that the user performs a press operation on the blank area of the screen. In this case, the terminal device may detect the press operation of the user, and determine that the touch object is the blank area of the lock screen. As shown in B in FIG. 12, a pressure value of pressing the blank area by the user reaches a preset threshold. Because the blank area of the lock screen is included in the whitelist, the terminal device may collect the fingerprint information of the user. As shown in C in FIG. 12, after the terminal device collects the fingerprint information, when the fingerprint information is authenticated by using the fingerprint, the mobile phone may be unlocked by using an obtained unlocking password corresponding to the fingerprint information, and a home screen is displayed.

Figure 13:
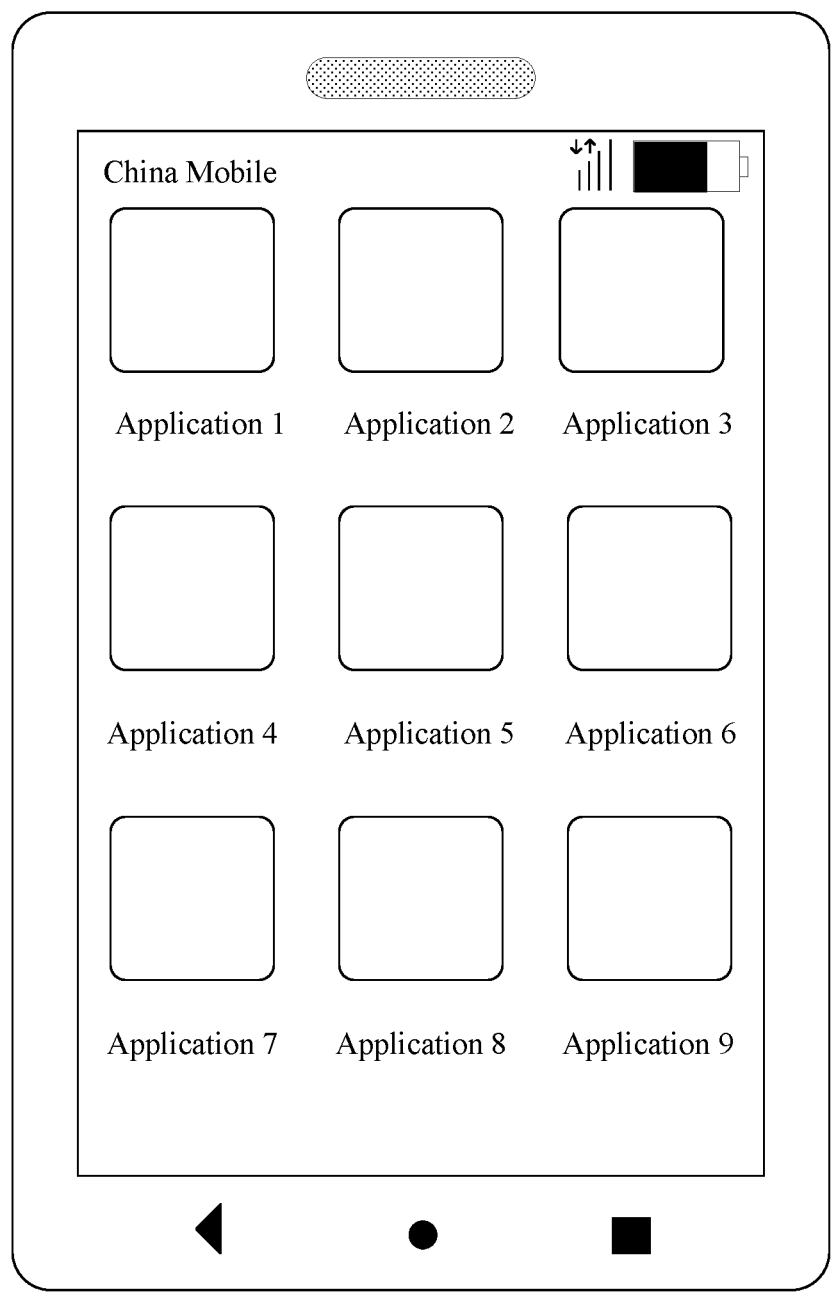
FIG. 13 is a schematic diagram of another scenario in which a fingerprint recognition method in an embodiment of the present invention is applied according to an embodiment of the present invention.

Scenario 2: An unlock screen displayed on the mobile phone is shown in FIG. 13, and the unlock screen is specifically the home screen. The home screen includes at least one application icon. The unlock screen is a screen displayed when the mobile phone is in an unlocked state after the mobile phone is unlocked. In the unlocked state, the user may perform any operation on the mobile phone, for example, enable an application and send an SMS message.

It is assumed that in this scenario, the whitelist includes an application 3, an application 4, an application 5, and an application 9. The authentication information includes at least one of a login account and password, and a function instruction. The login account and password are used to log in to an application, and the function instruction is used to instruct to enter a functional screen of the application.

For example, the functional screen may be specifically a payment screen, a photographing screen, an album screen, or the like. In this scenario, an example in which the function instruction is used to instruct to enter the payment screen of the application is used for description. In addition, in specific implementation, a correspondence between different fingerprint information and different authentication information may be pre-stored. For example, in this scenario, an example in which fingerprint information of a thumb is corresponding to the login account and password, and fingerprint information of an index finger is corresponding to the function instruction is used for description.

Figure 14A:
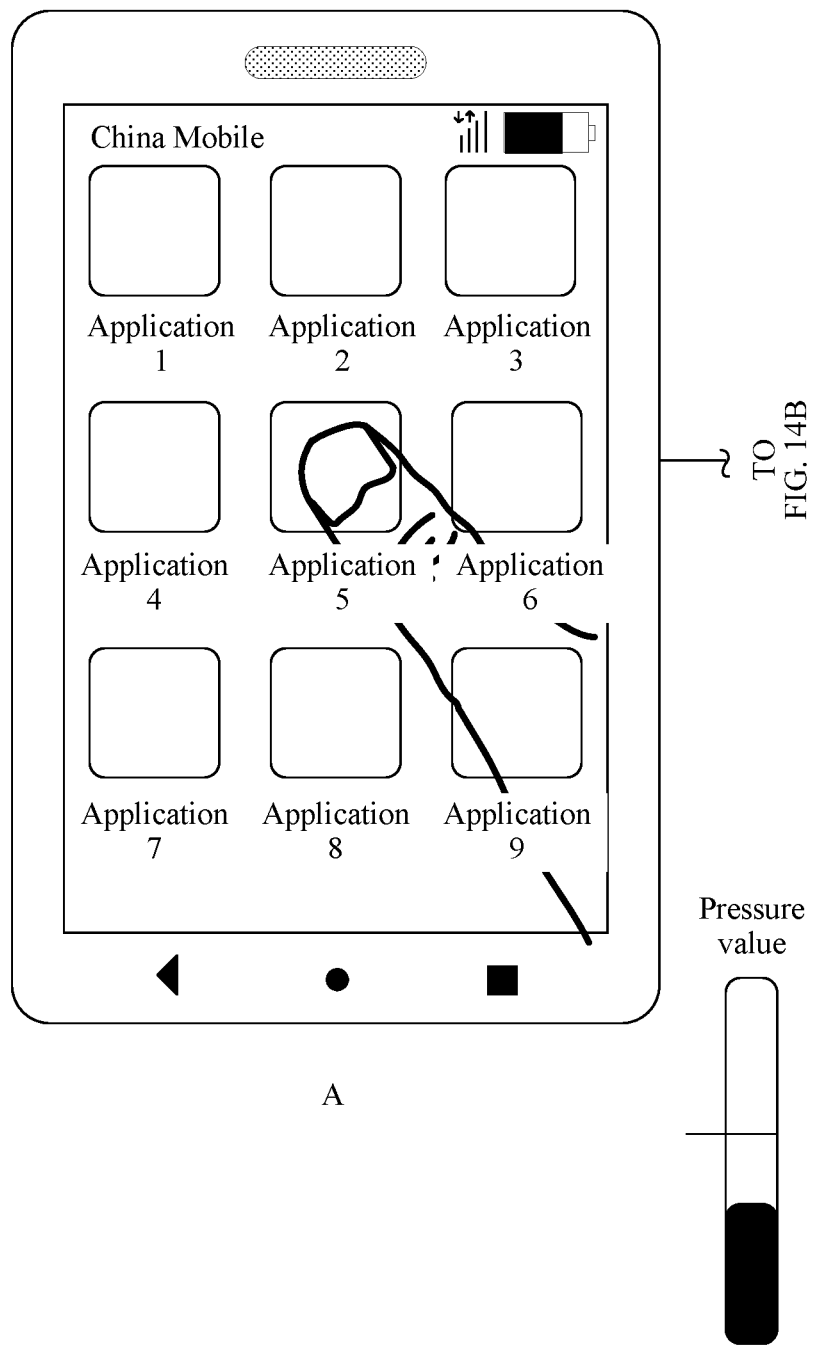
FIG. 14A, FIG. 14B, and FIG. 14C are a schematic diagram of another scenario in which a fingerprint recognition method in an embodiment of the present invention is applied according to an embodiment of the present invention.
Figure 14B:
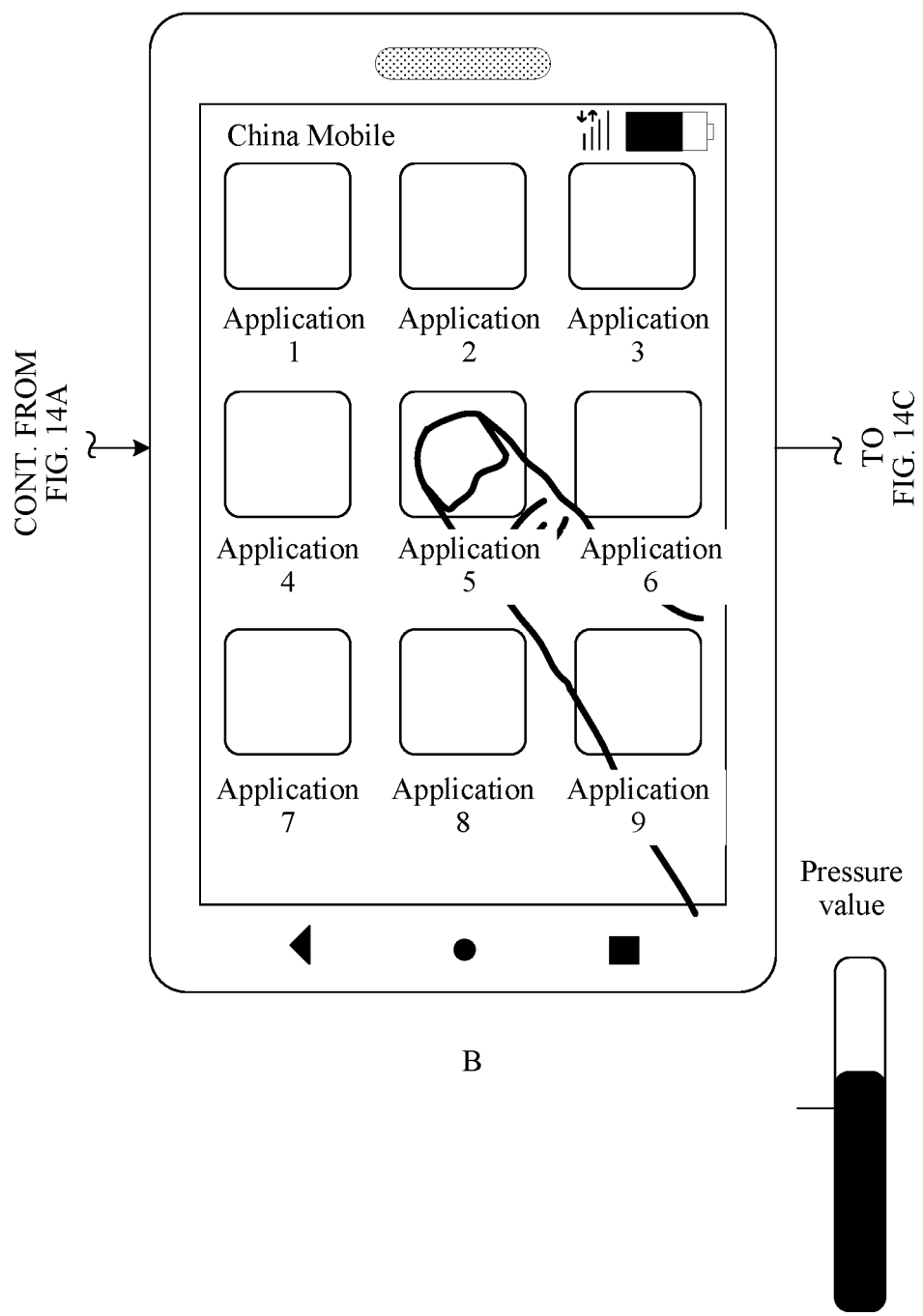
Figure 14C:
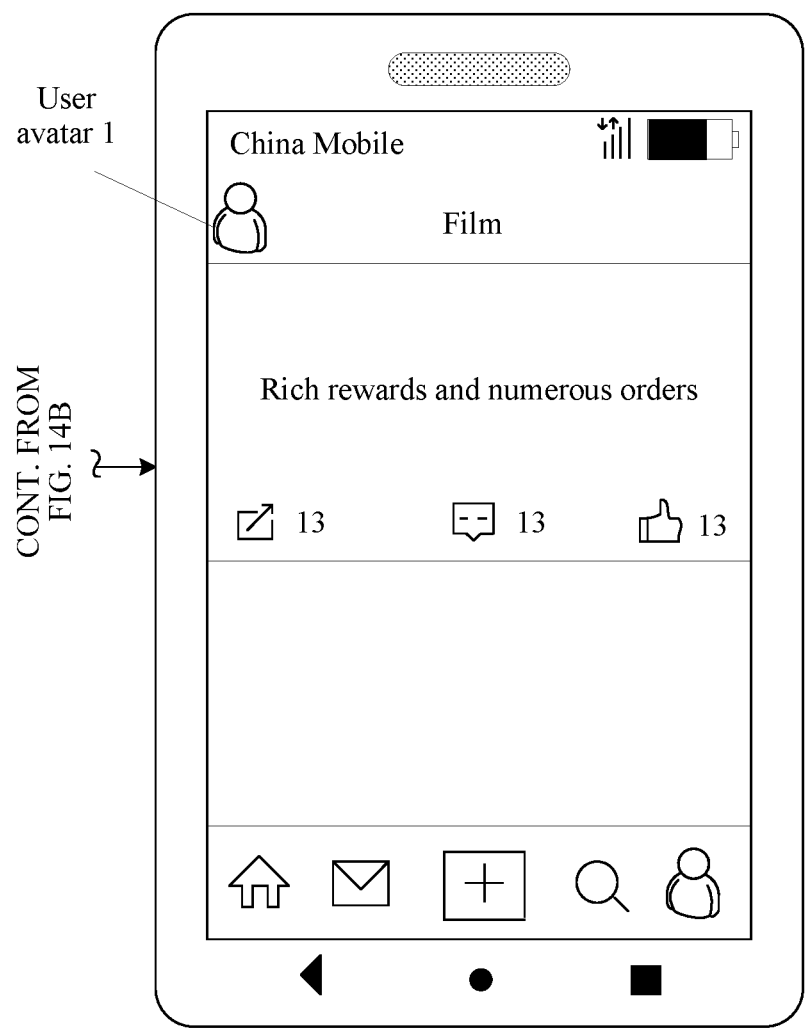

As shown in A in FIG. 14, it is assumed that the user performs a press operation on an icon of the application 5 on the screen by using the thumb. In this case, the terminal device may detect the press operation of the user, and determine that the touch object is the application 5. As shown in B in FIG. 14, a pressure value of pressing the icon of the application 5 by the user by using the thumb reaches a preset threshold. Because the application 5 is included in the whitelist, the terminal device may collect the fingerprint information of the thumb of the user. As shown in C in FIG. 14, after the terminal device collects the fingerprint information of the thumb, when the fingerprint information of the thumb is authenticated by using the fingerprint, the obtained login account and password corresponding to the fingerprint information of the thumb may be used to enable and display an application screen of the application 5 that is successfully logged in to. A user avatar 1 corresponding to a current login user name is displayed on the application screen.

Figure 15A:
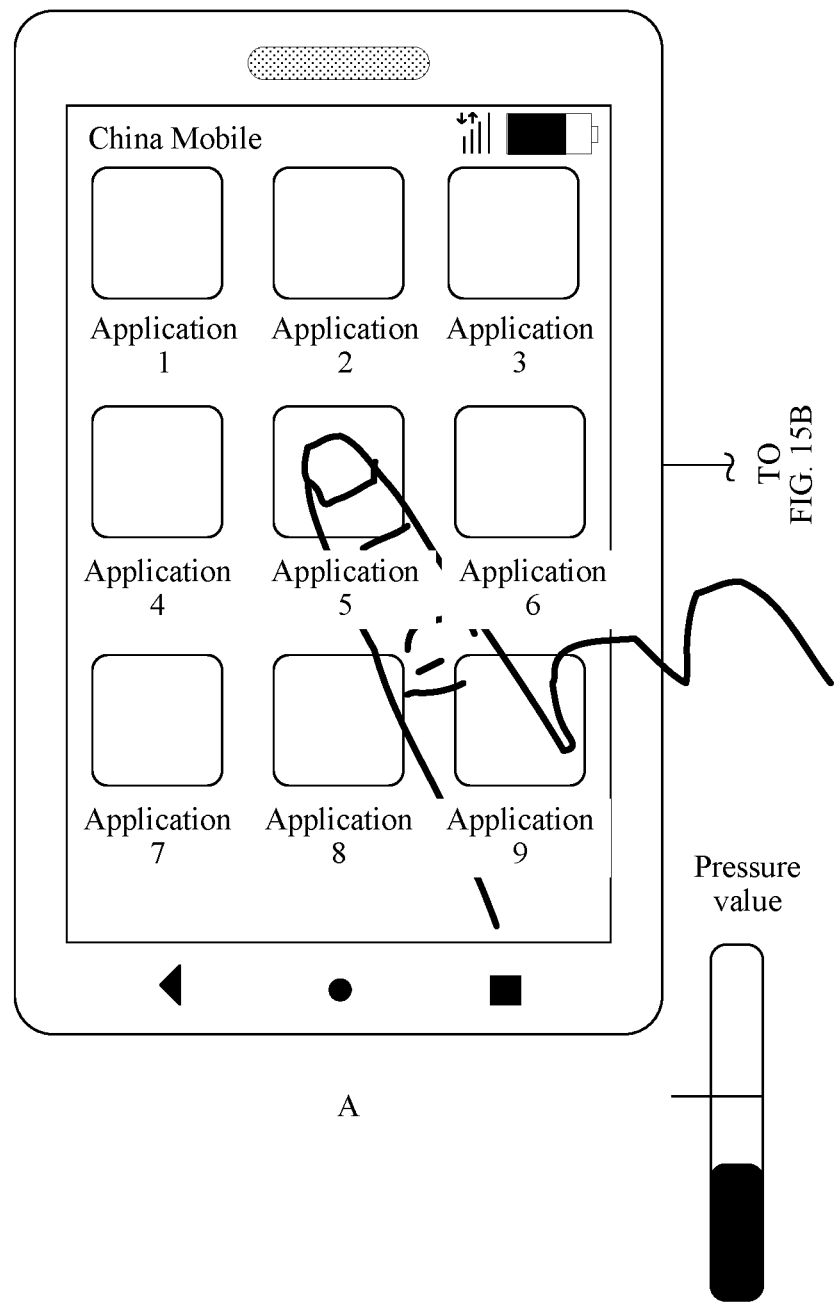
FIG. 15A, FIG. 15B, and FIG. 15C are a schematic diagram of another scenario in which a fingerprint recognition method in an embodiment of the present invention is applied according to an embodiment of the present invention.
Figure 15B:
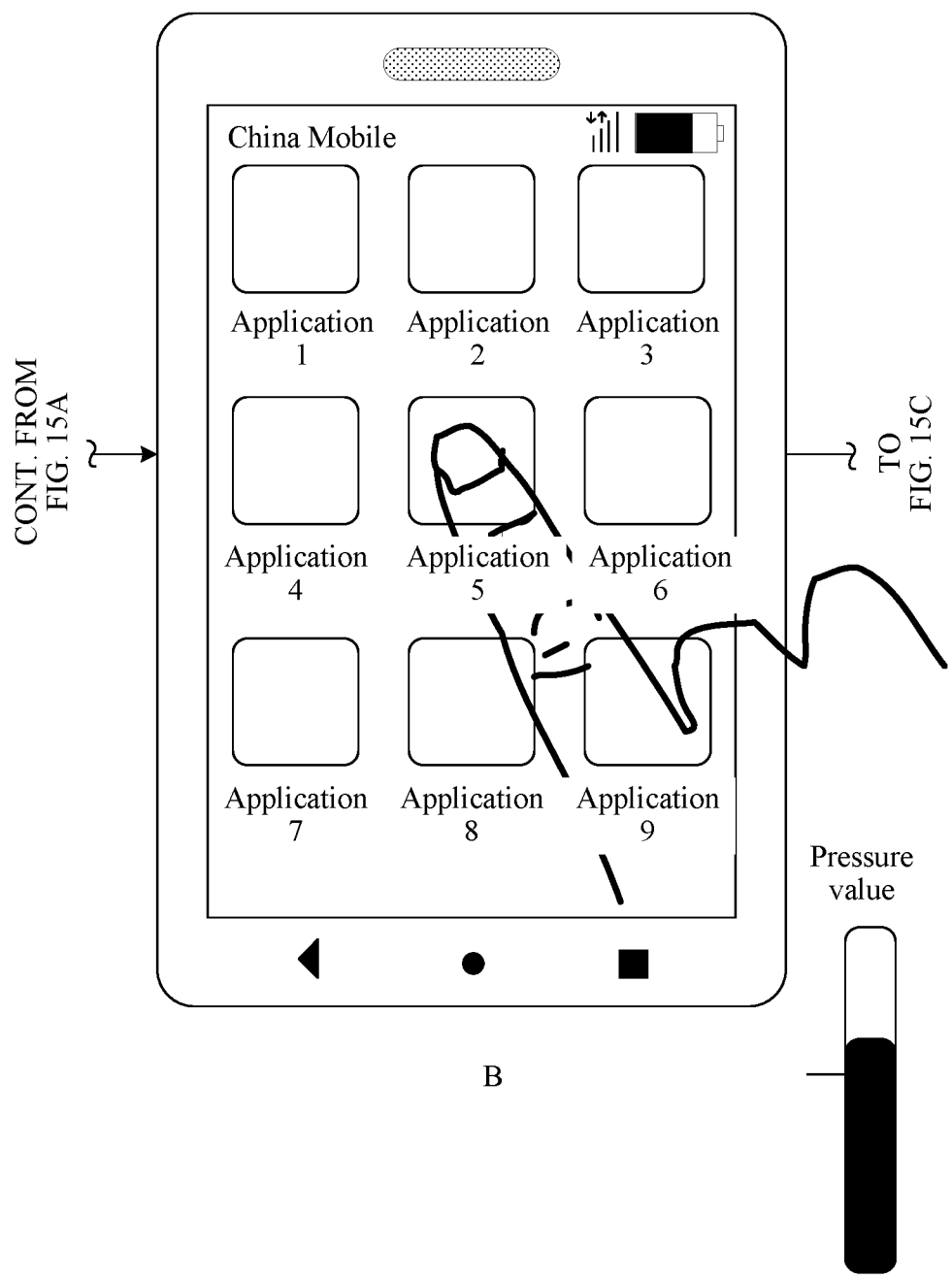
Figure 15C:
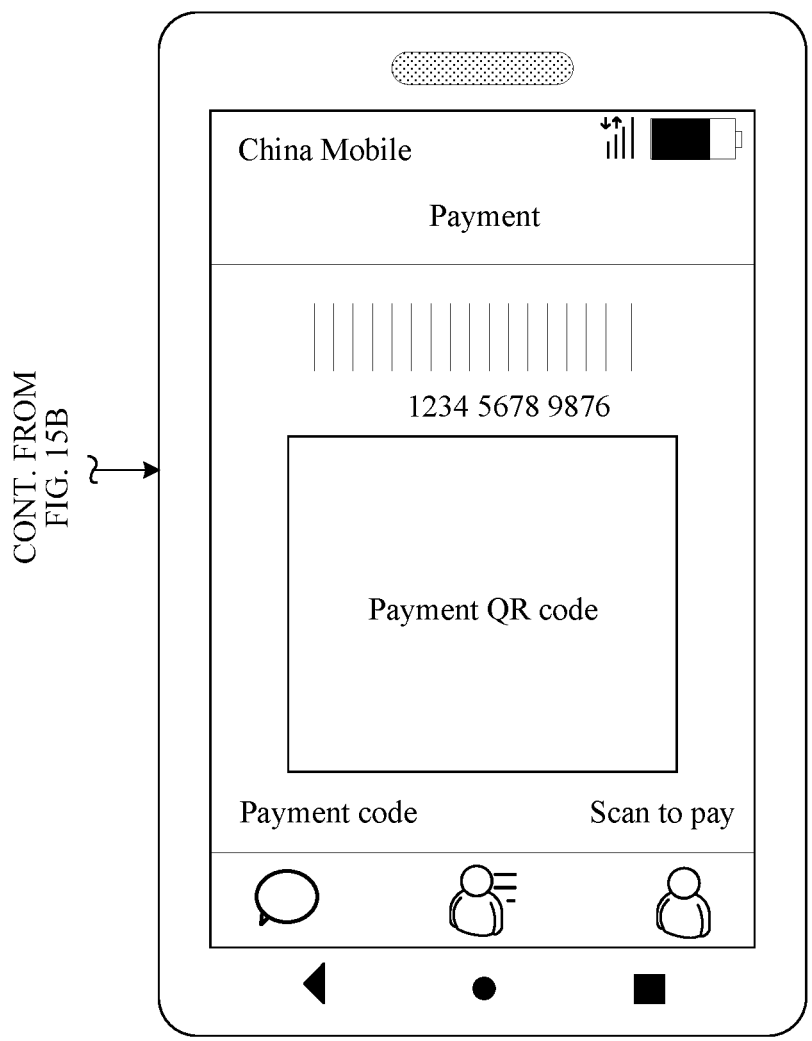

As shown in A in FIG. 15, it is assumed that the user performs a press operation on the icon of the application 5 on the screen by using the index finger. In this case, the terminal device may detect the press operation of the user, and determine that the touch object is the application 5. As shown in B in FIG. 15, a pressure value of pressing the icon of the application 5 by the user by using the index finger reaches a preset threshold. Because the application 5 is included in the whitelist, the terminal device may collect the fingerprint information of the index finger of the user. As shown in C in FIG. 15, after the terminal device collects the fingerprint information of the index finger, when the fingerprint information of the index finger is authenticated by using the fingerprint, a payment screen of the application 5 may be enabled and displayed by using the obtained function instruction corresponding to the fingerprint information of the index finger.

Figure 16:
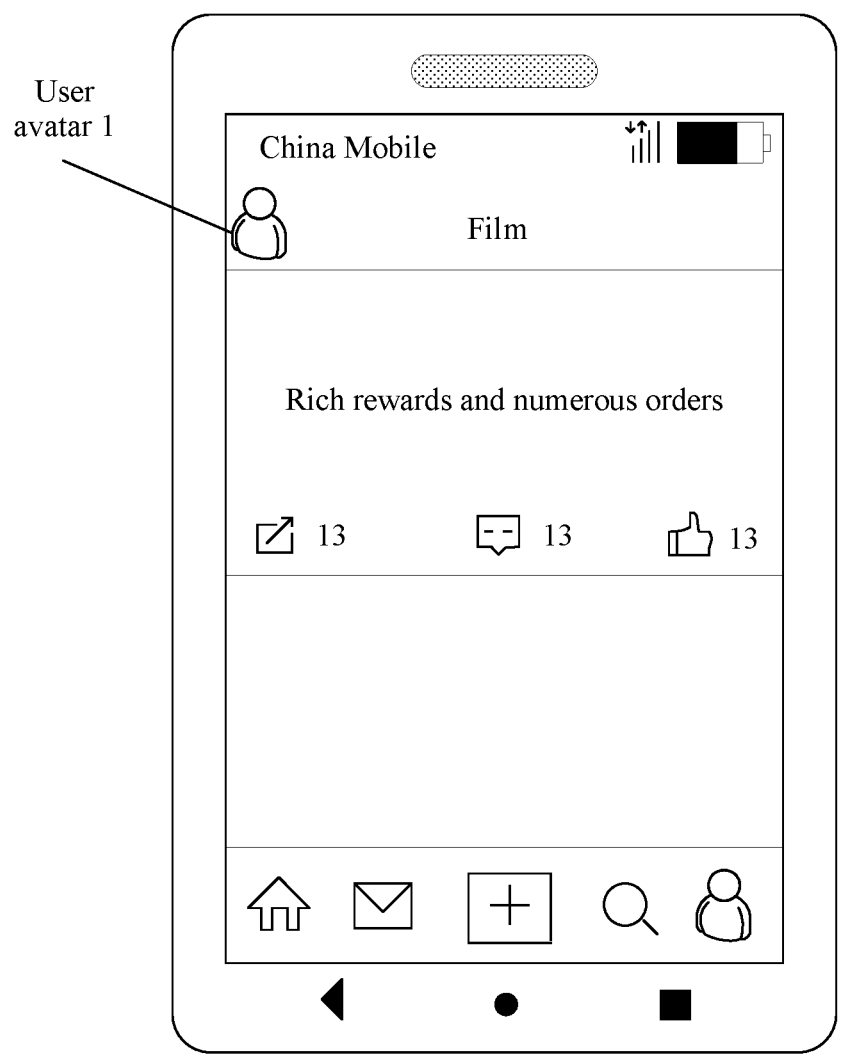
FIG. 16 is a schematic diagram of another scenario in which a fingerprint recognition method in an embodiment of the present invention is applied according to an embodiment of the present invention.

Scenario 3: As shown in FIG. 16, the application screen of the application 5 that is enabled and that is successfully logged in to is displayed on the mobile phone. In addition, the user avatar 1 is shown in the application screen.

It is assumed that in this scenario, the whitelist includes a user avatar, and the authentication information includes a switching account and password.

Figure 17A:
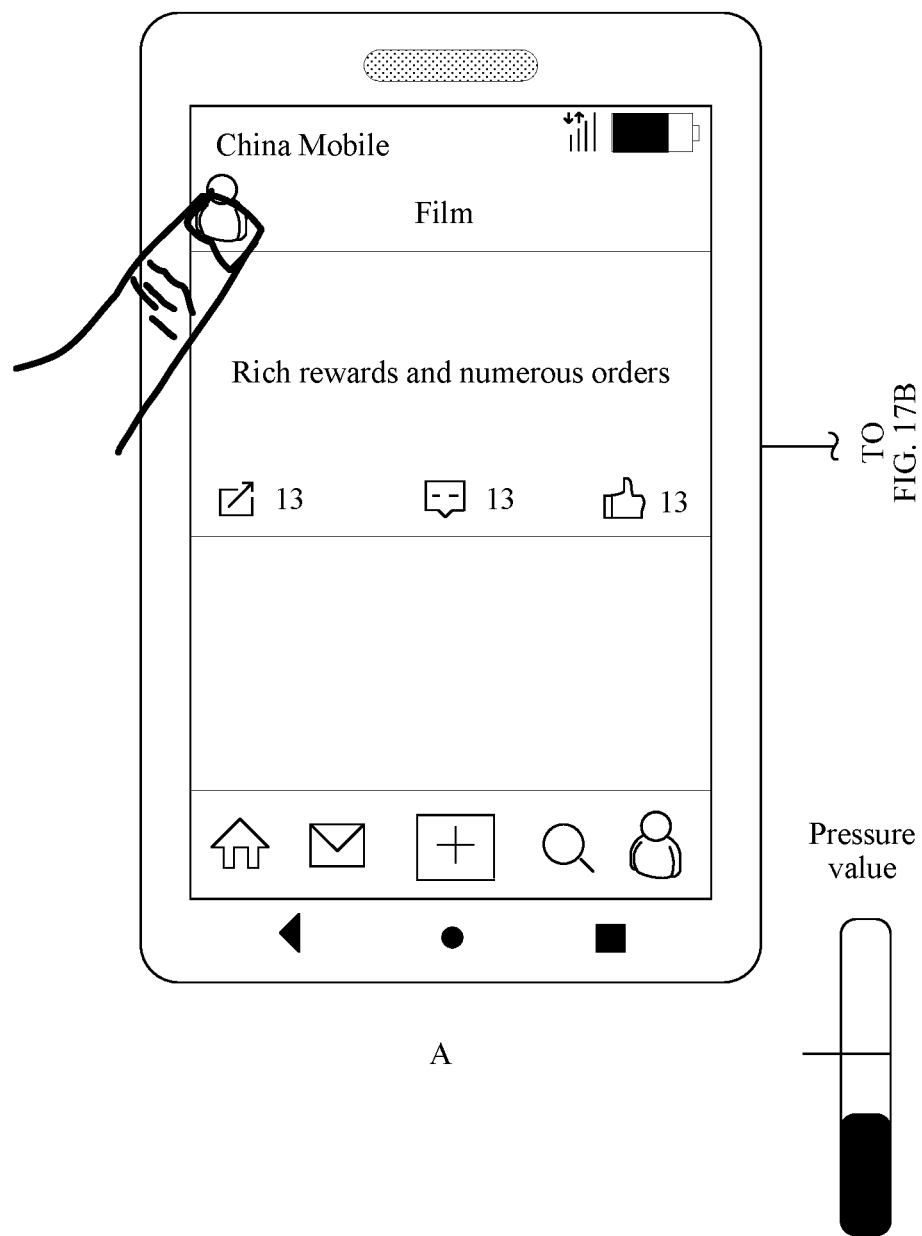
FIG. 17A, FIG. 17B, and FIG. 17C are a schematic diagram of another scenario in which a fingerprint recognition method in an embodiment of the present invention is applied according to an embodiment of the present invention.
Figure 17B:
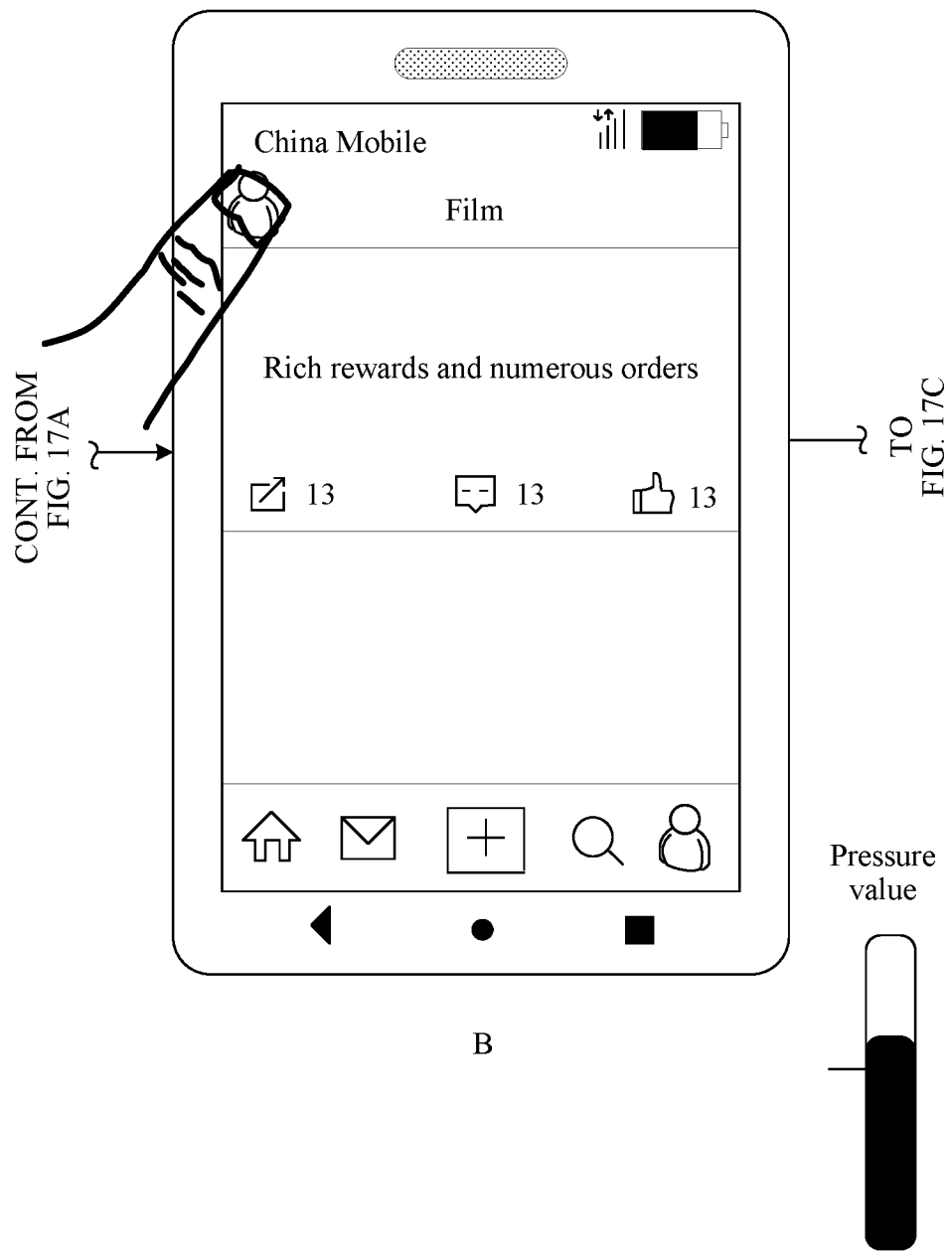
Figure 17C:
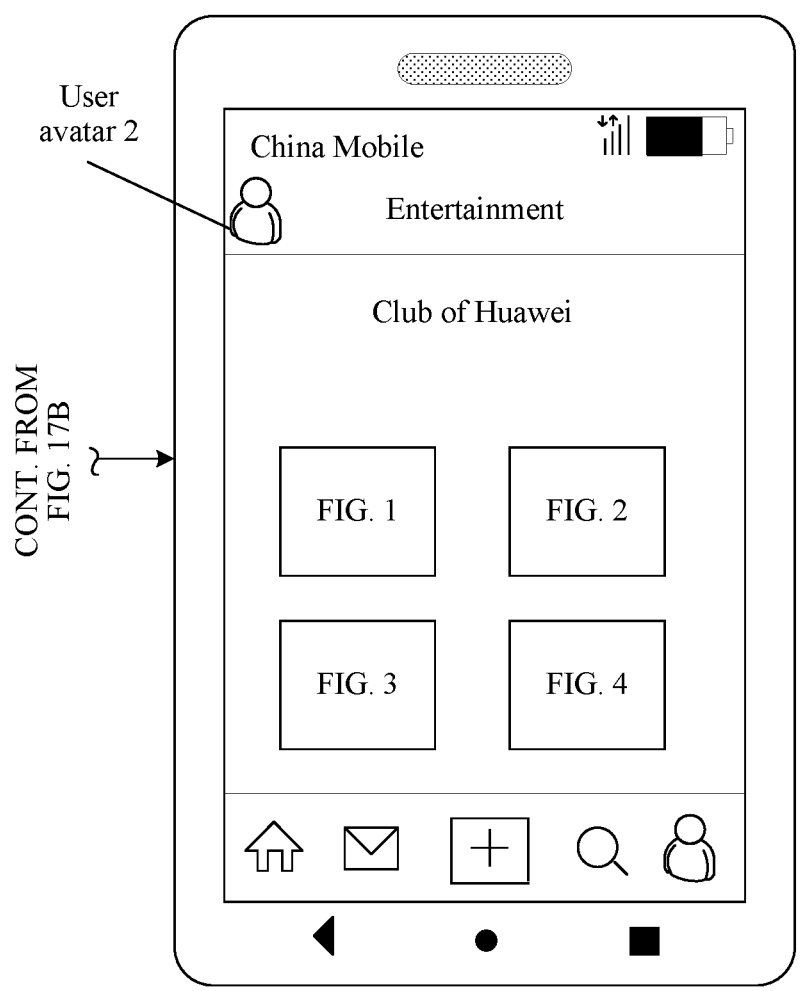

As shown in A in FIG. 17, it is assumed that the user performs a press operation on a user avatar displayed on the screen. In this case, the terminal device may detect the press operation of the user, and determine that the touch object is the user avatar. As shown in B in FIG. 17, a pressure value of pressing the user avatar by the user reaches a preset threshold. Because the user avatar is included in the whitelist, the terminal device may collect the fingerprint information of the user. As shown in C in FIG. 17, after the terminal device collects the fingerprint information, when the fingerprint information is authenticated by using the fingerprint, an account of the application 5 may be switched by using an obtained switching account and password corresponding to the fingerprint information, an application screen after the account is switched is displayed, and a user avatar 2 corresponding to a switched account is displayed on the application screen.

Figure 18:
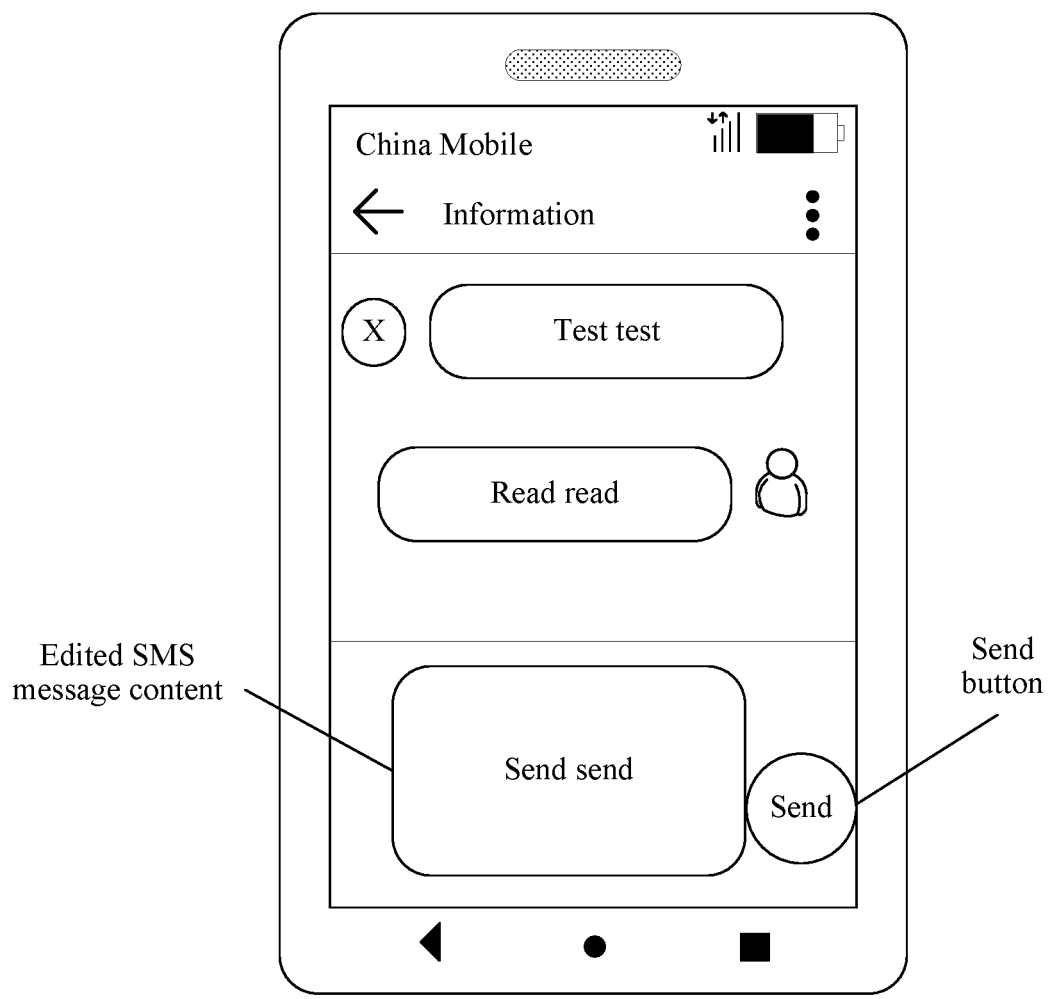
FIG. 18 is a schematic diagram of another scenario in which a fingerprint recognition method in an embodiment of the present invention is applied according to an embodiment of the present invention.

Scenario 4: An SMS message screen displayed on the mobile phone is shown in FIG. 18, and a send button and edited SMS message content are displayed in the SMS message screen.

It is assumed that in this scenario, the whitelist includes the send button, and the authentication information includes a function instruction. The function instruction is used to instruct to send an encrypted SMS message.

Figure 19A:
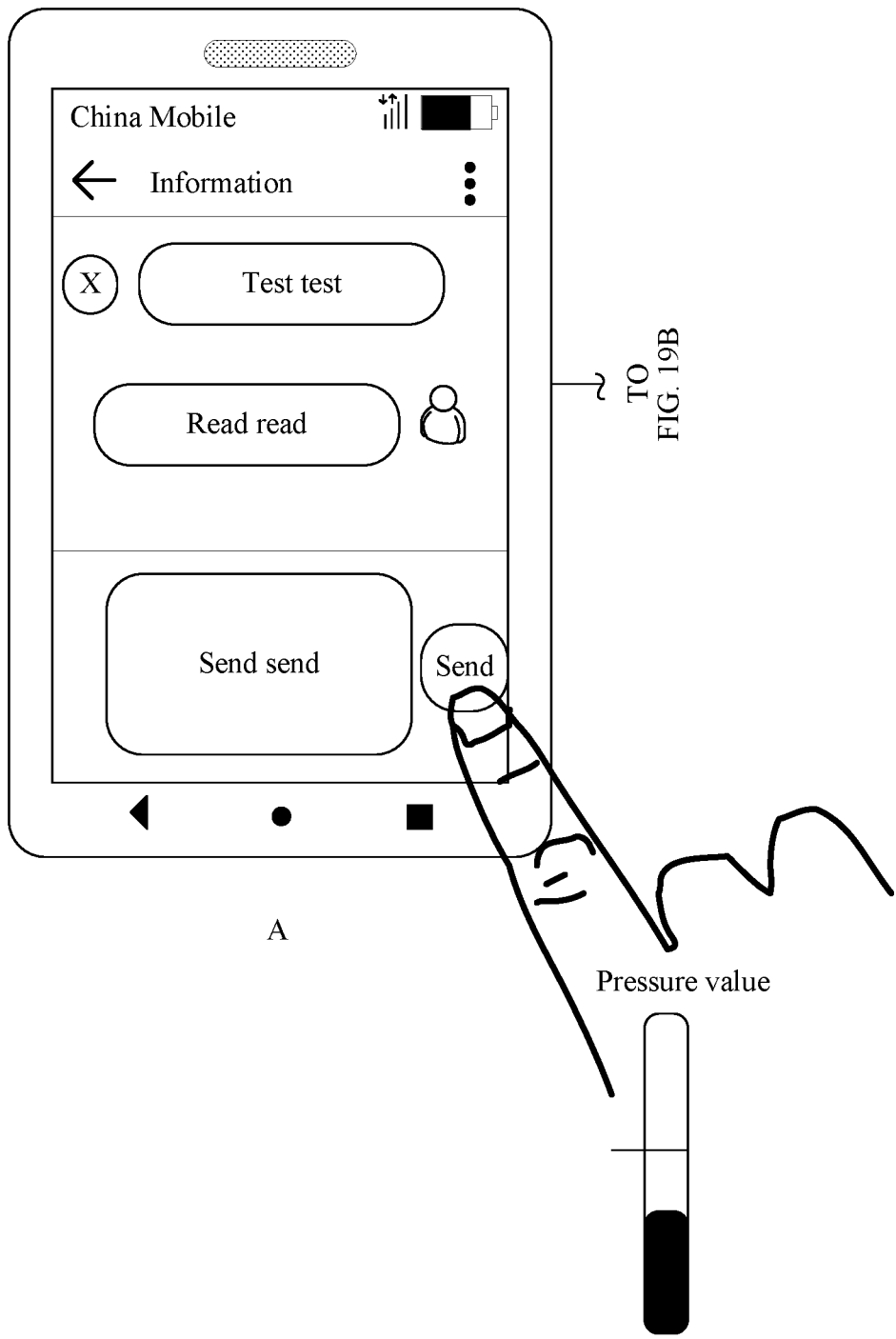
FIG. 19A, FIG. 19B, and FIG. 19C are a schematic diagram of another scenario in which a fingerprint recognition method in an embodiment of the present invention is applied according to an embodiment of the present invention.
Figure 19B:
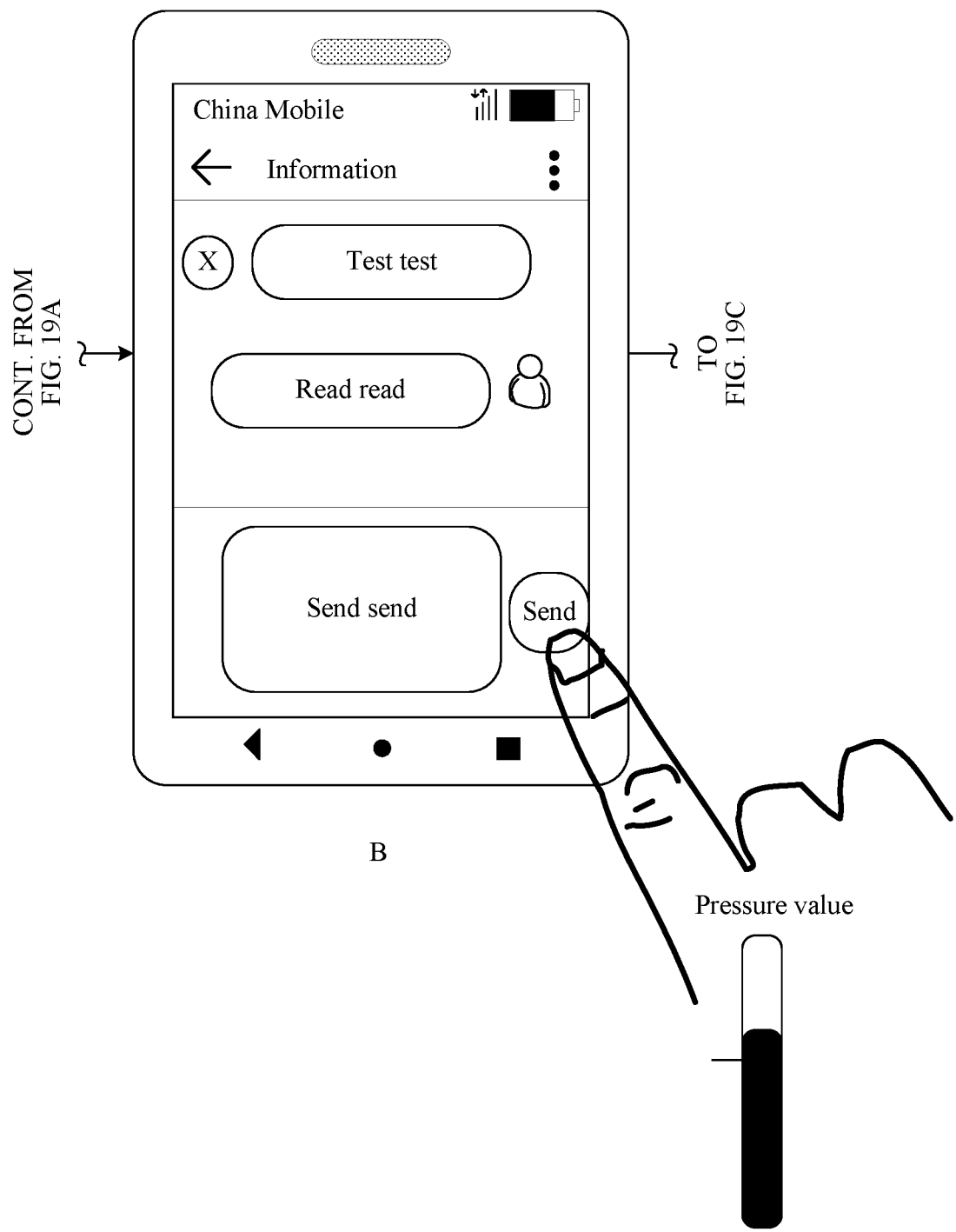
Figure 19C:
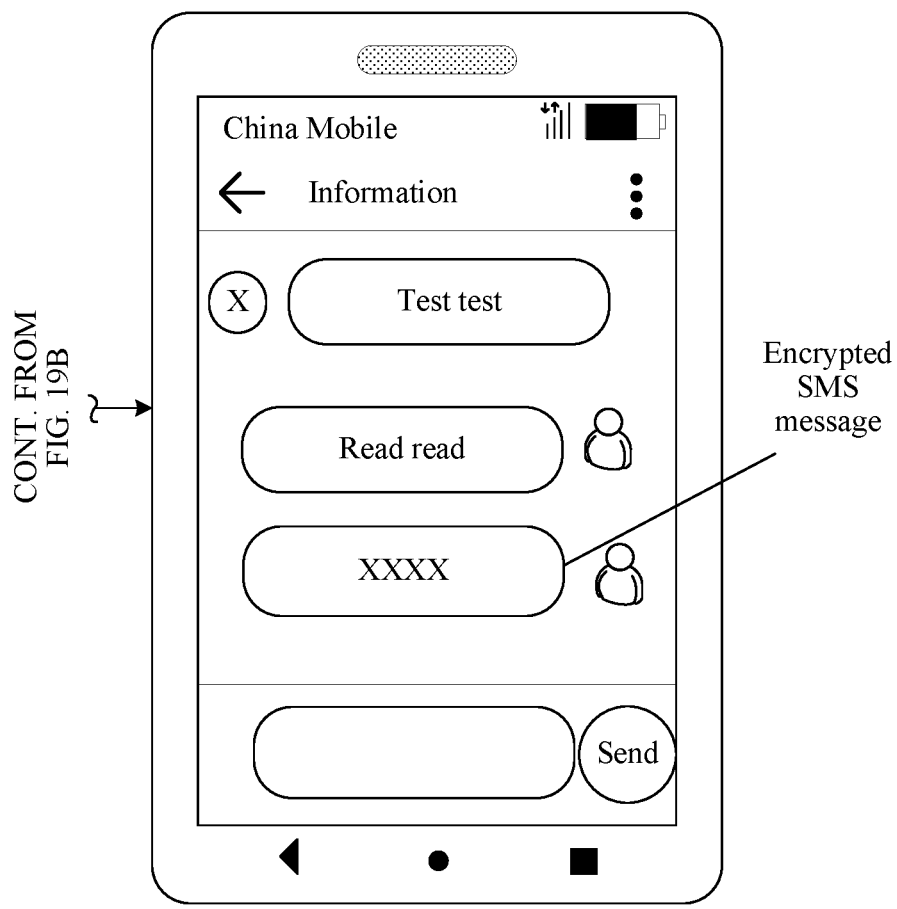

As shown in A in FIG. 19, it is assumed that the user performs a press operation on the send button displayed on the screen. In this case, the terminal device may detect the press operation of the user, and determine that the touch object is the send button. As shown in B in FIG. 19, a pressure value of pressing the send button by the user reaches a preset threshold. Because the send button is included in the whitelist, the terminal device may collect the fingerprint information of the user. As shown in C in FIG. 19, after the terminal device collects the fingerprint information, when the fingerprint information is authenticated by using the fingerprint, the edited SMS message content may be encrypted for sending by using an obtained function instruction corresponding to the fingerprint information, and the encrypted SMS message is displayed on the SMS message screen.

It should be noted that an email and another scenario supporting an encryption function are similar to the scenario 4. Details are not described in this embodiment of the present invention again.

Figure 20:
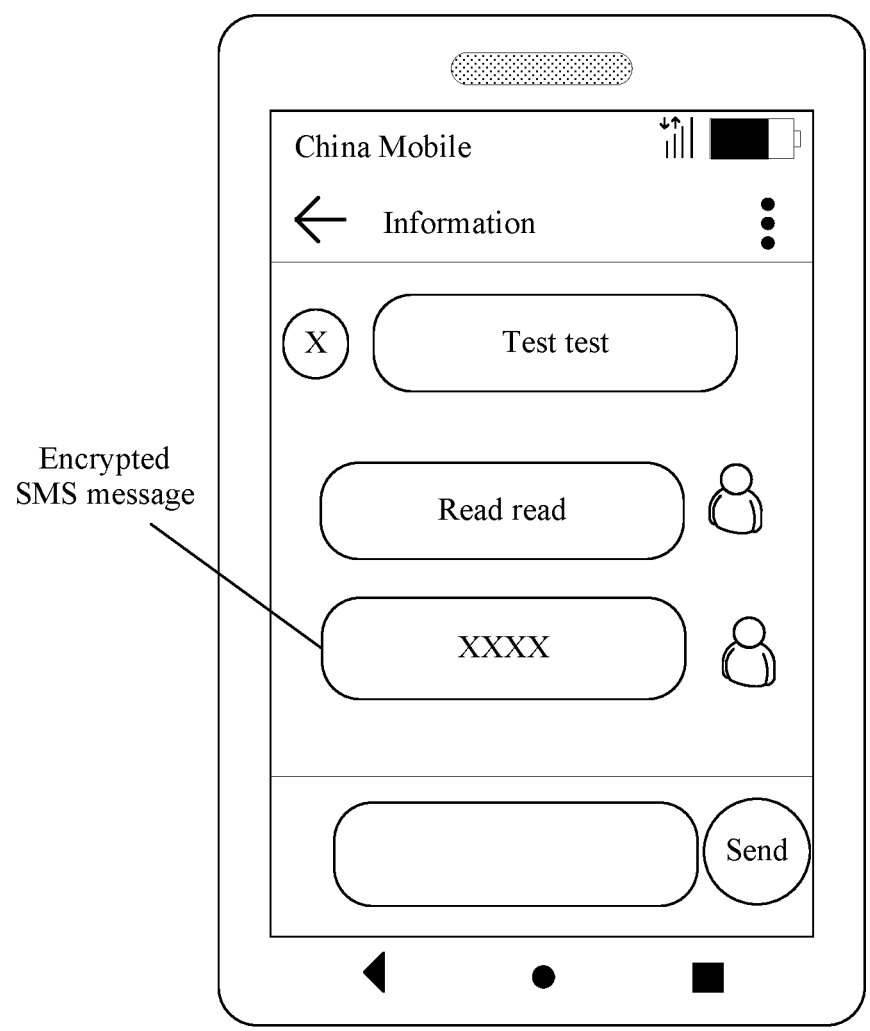
FIG. 20 is a schematic diagram of another scenario in which a fingerprint recognition method in an embodiment of the present invention is applied according to an embodiment of the present invention.

Scenario 5: An SMS message screen displayed on the mobile phone is shown in FIG. 20, and an encrypted SMS message is displayed on the SMS message screen.

It is assumed that in this scenario, the whitelist includes the encrypted SMS message, and the authentication information includes a function instruction. The function instruction is used to instruct to check the encrypted SMS message.

Figure 21A:
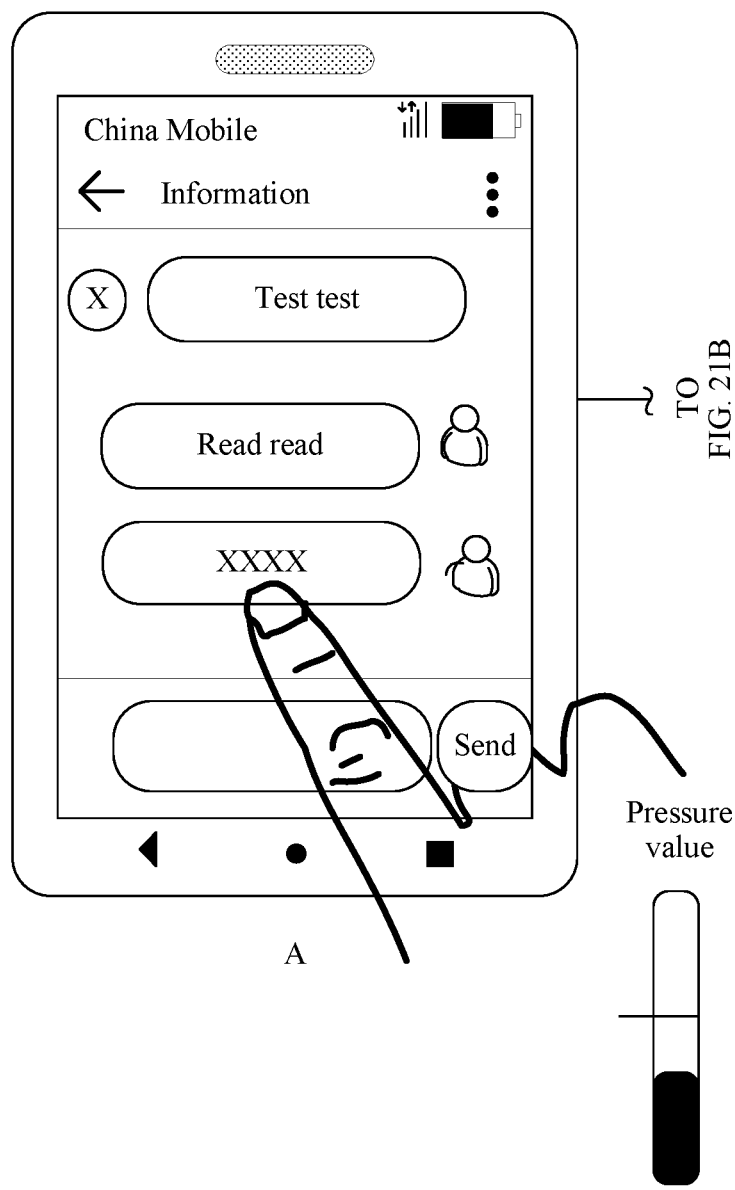
FIG. 21A, FIG. 21B, and FIG. 21C are a schematic diagram of another scenario in which a fingerprint recognition method in an embodiment of the present invention is applied according to an embodiment of the present invention.
Figure 21B:
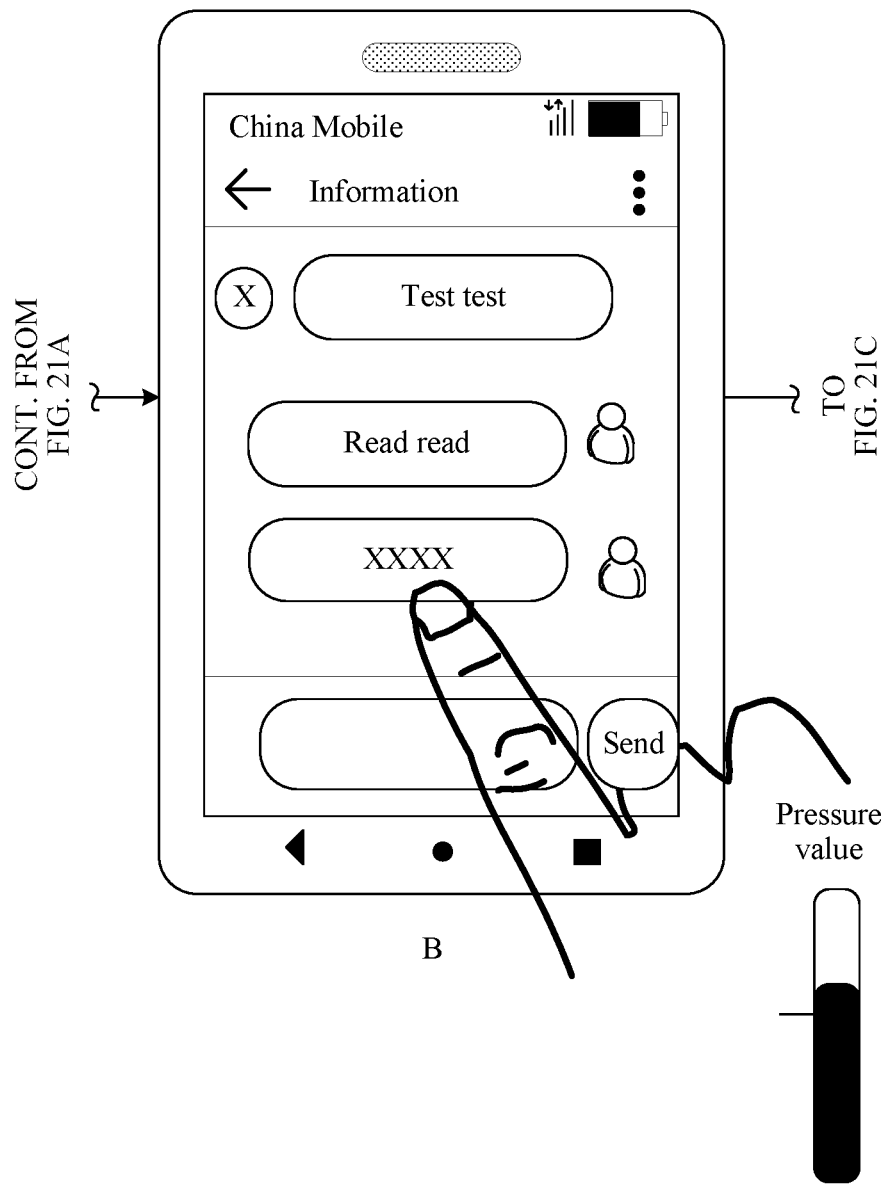
Figure 21C:
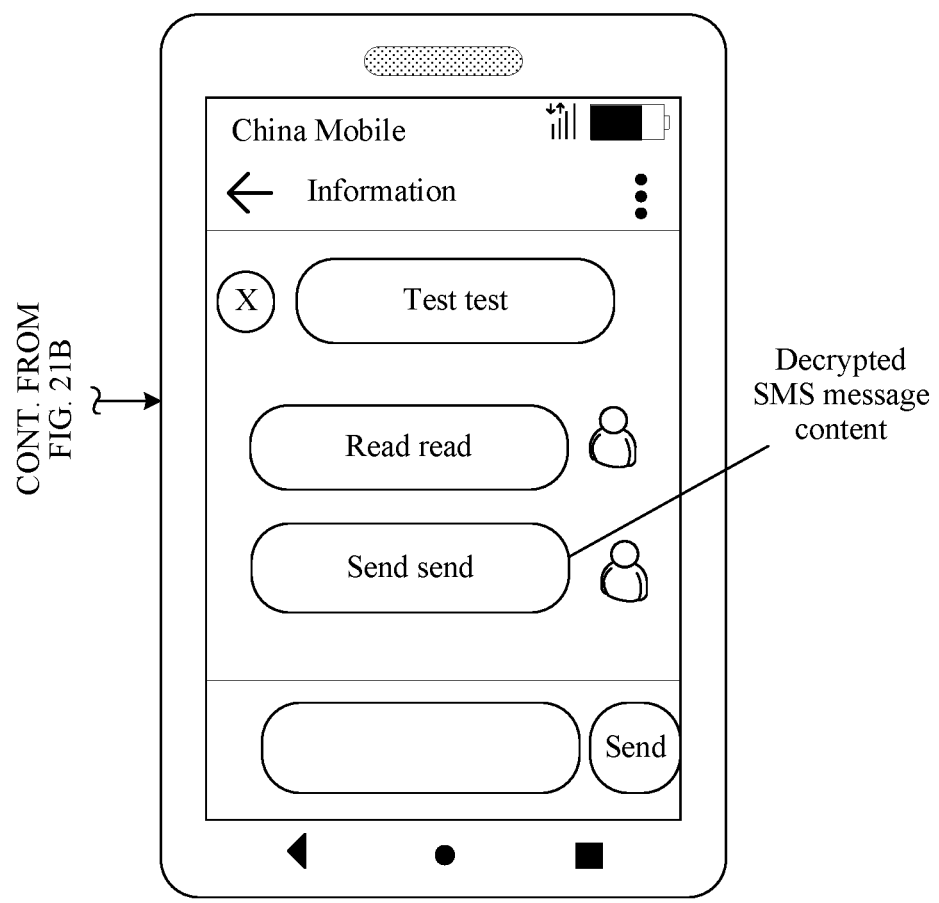

As shown in A in FIG. 21, it is assumed that the user performs a press operation on the encrypted SMS message displayed on the screen. In this case, the terminal device may detect the press operation of the user, and determine that the touch object is the encrypted SMS message. As shown in B in FIG. 21, a pressure value of pressing the encrypted SMS message by the user reaches a preset threshold. Because the encrypted SMS message is included in the whitelist, the terminal device may collect the fingerprint information of the user. As shown in C in FIG. 21, after the terminal device collects the fingerprint information, when the fingerprint information is authenticated by using the fingerprint, the encrypted SMS message may be decrypted by using an obtained function instruction corresponding to the fingerprint information, and decrypted SMS message content is displayed.

Figure 22:
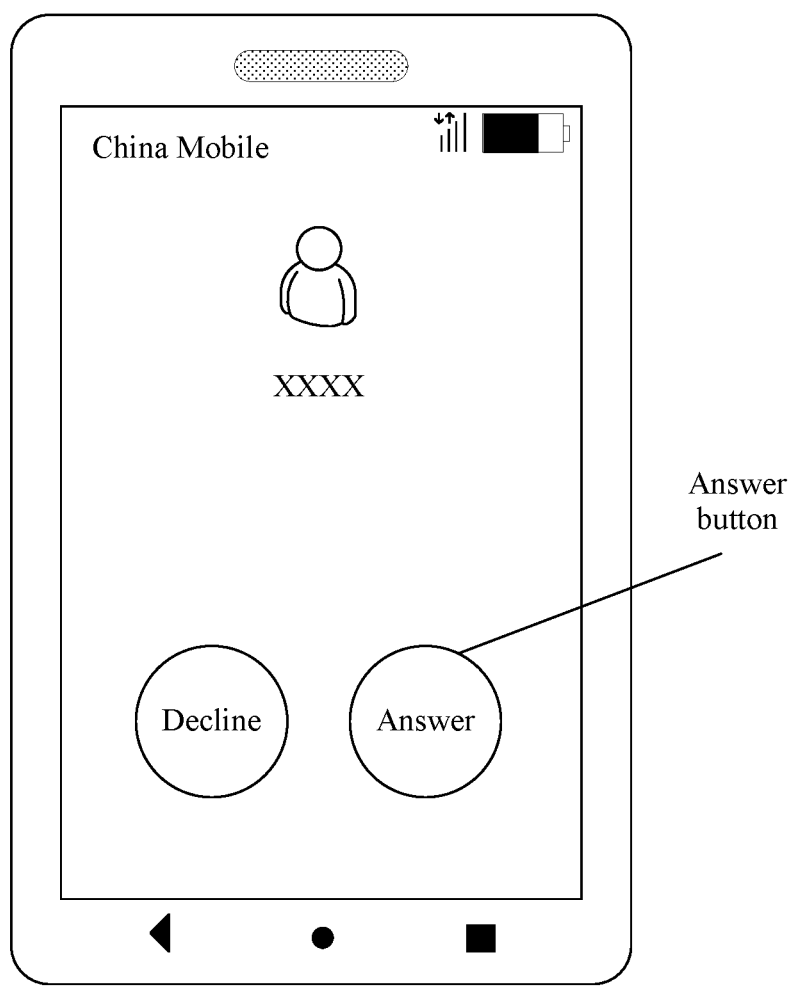
FIG. 22 is a schematic diagram of another scenario in which a fingerprint recognition method in an embodiment of the present invention is applied according to an embodiment of the present invention.

Scenario 6: A called screen displayed on the mobile phone is shown in FIG. 22, and an answer button is displayed on the called screen. The called screen is a screen appearing when a call needs to be answered.

It is assumed that in this scenario, the whitelist includes the answer button, and the authentication information includes a function instruction. The function instruction is used to instruct to answer an encrypted call.

Figure 23A:
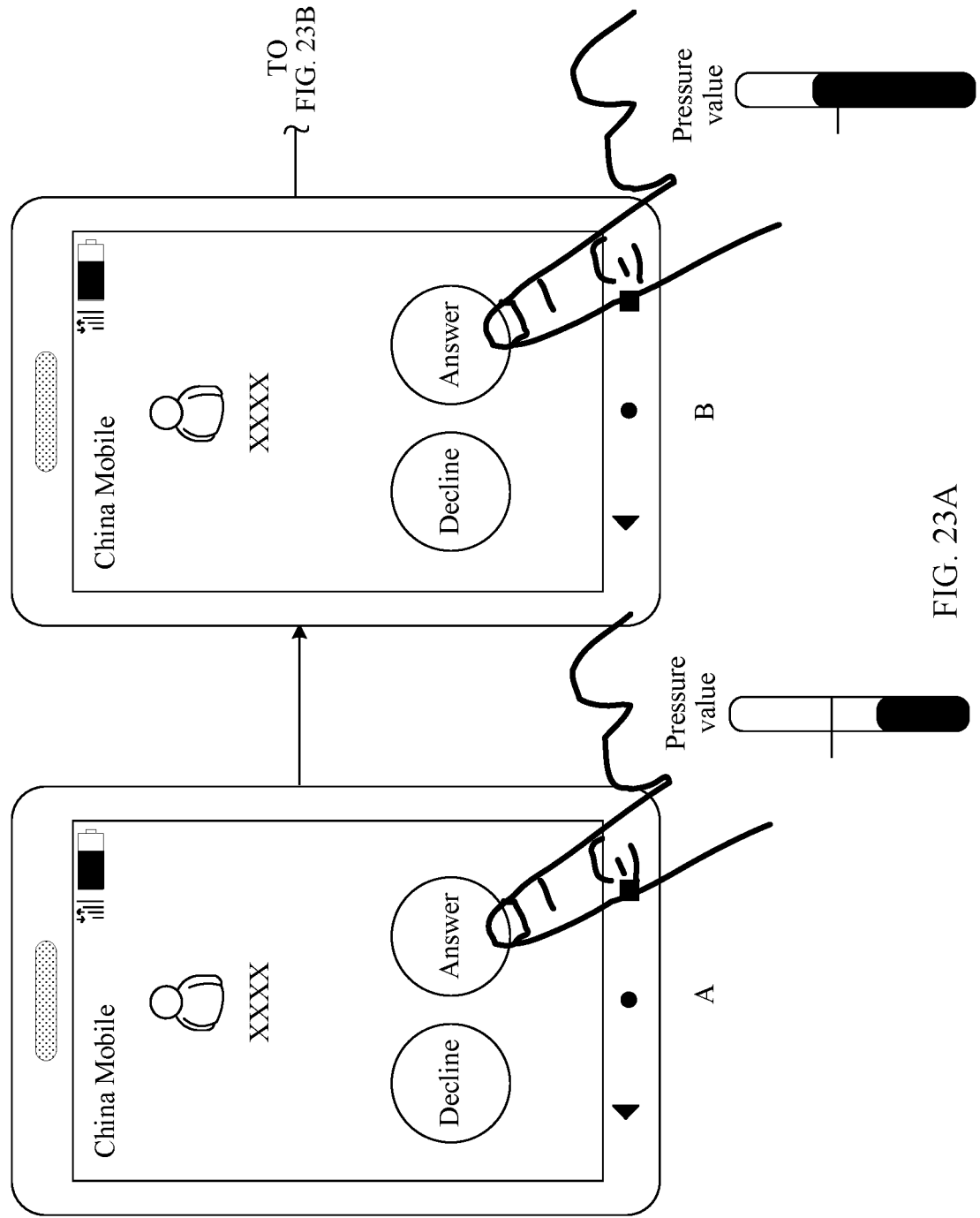

As shown in A in FIG. 23, it is assumed that the user performs a press operation on the answer button displayed on the screen. In this case, the terminal device may detect the press operation of the user, and determine that the touch object is the answer button. As shown in B in FIG. 23, a pressure value of pressing the answer button by the user reaches a preset threshold. Because the answer button is included in the whitelist, the terminal device may collect the fingerprint information of the user. As shown in C in FIG. 23, after the terminal device collects the fingerprint information, when the fingerprint information fails to be authenticated by using the fingerprint, the call may be declined, and prompt information is displayed on the called screen. For example, the prompt information is specifically that the call is declined, to prompt the user that the fingerprint information is not matched. In addition, as shown in D shown in FIG. 23, after displaying the prompt information, the terminal device may display the unlock screen.

Figure 24A:
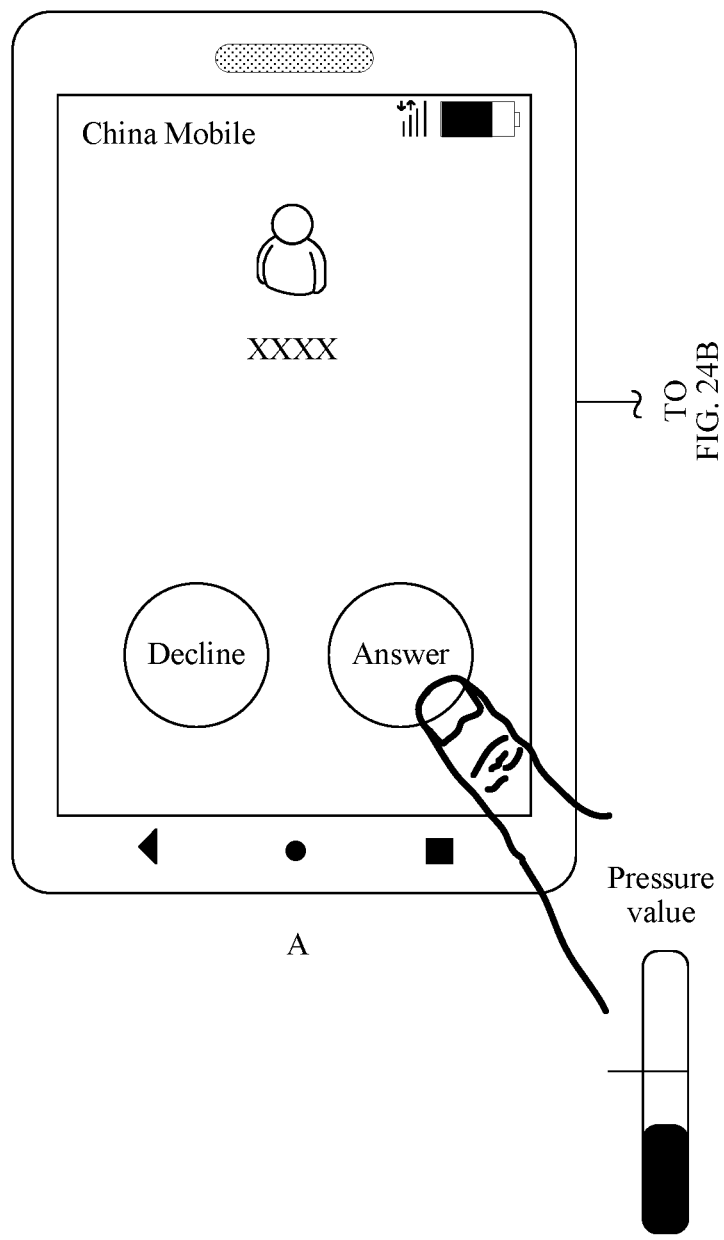
FIG. 24A, FIG. 24B, and FIG. 24C are a schematic diagram of another scenario in which a fingerprint recognition method in an embodiment of the present invention is applied according to an embodiment of the present invention.
Figure 24B:
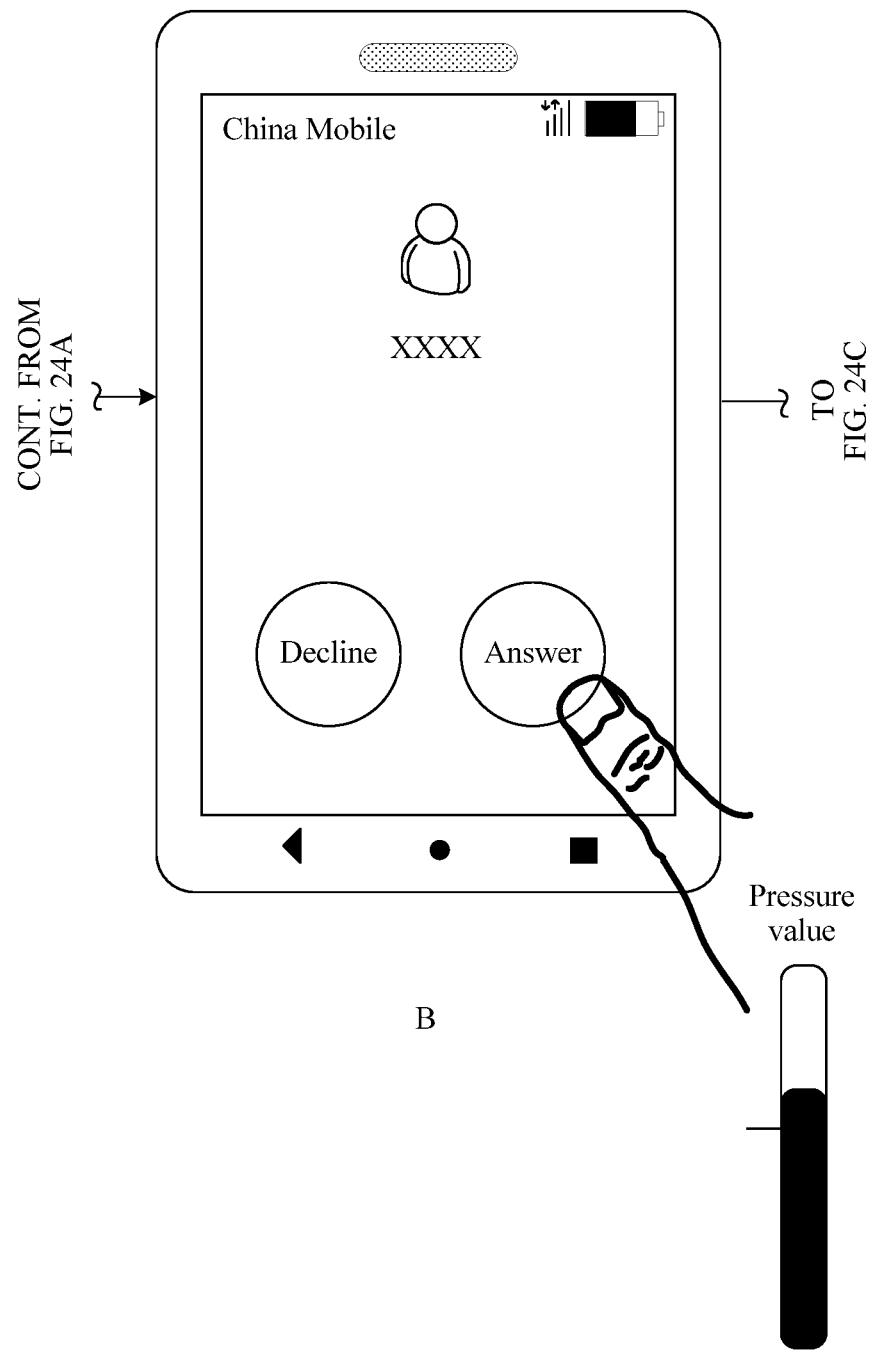
Figure 24C:
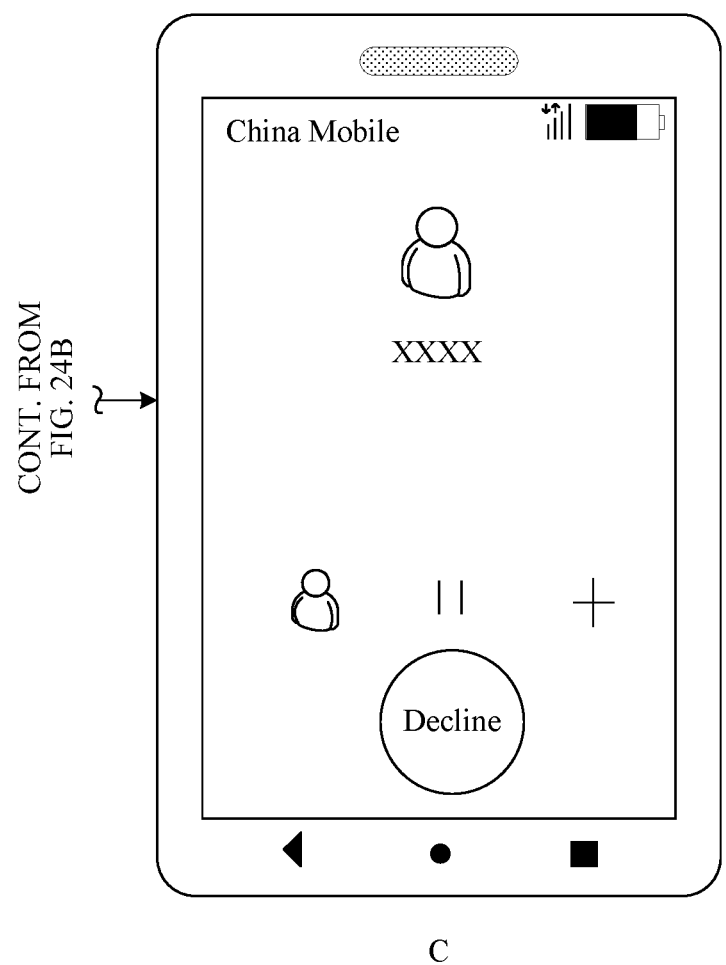

As shown in A in FIG. 24, it is assumed that the user performs a press operation on the answer button displayed on the screen. In this case, the terminal device may detect the press operation of the user, and determine that the touch object is the answer button. As shown in B in FIG. 24, a pressure value of pressing the answer button by the user reaches a preset threshold. Because the answer button is included in the whitelist, the terminal device may collect the fingerprint information of the user. As shown in C in FIG. 24, after the terminal device collects the fingerprint information, when the fingerprint information is authenticated by using the fingerprint, the call may be answered by using an obtained function instruction corresponding to the fingerprint information, call content is decrypted, and an answer screen is displayed.

Figure 25:
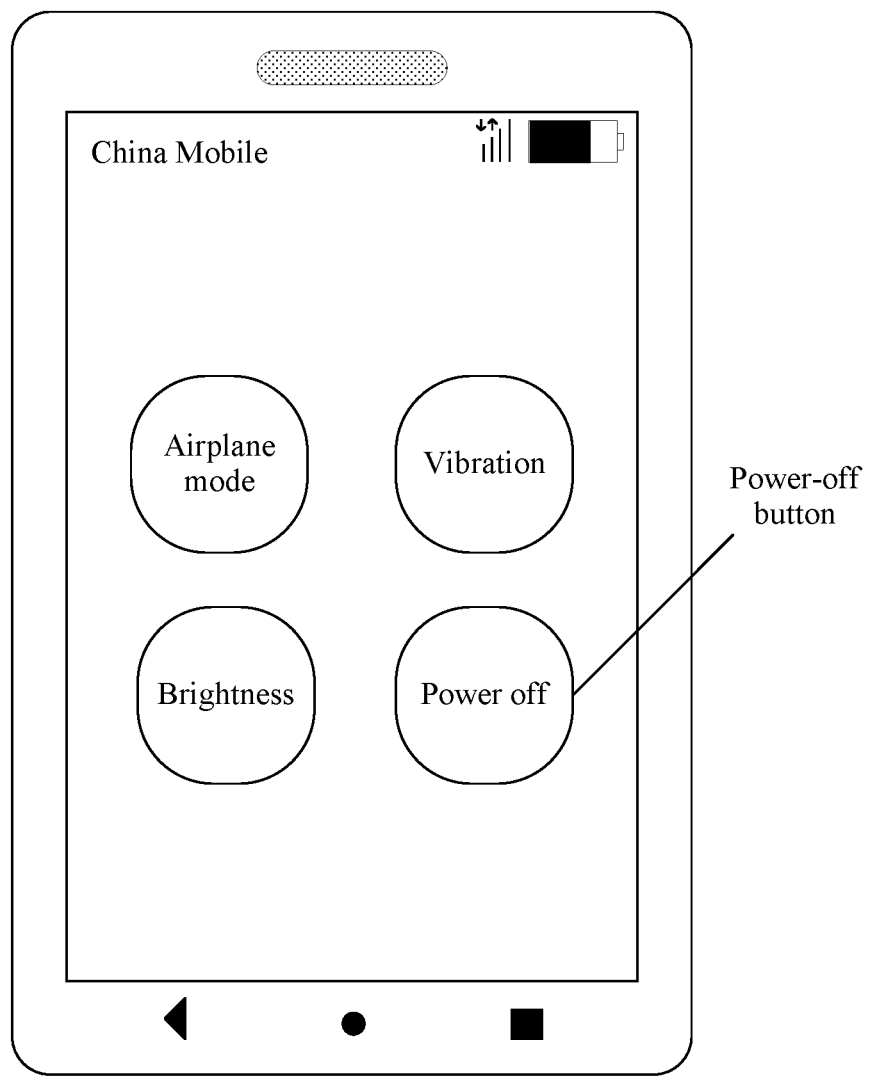
FIG. 25 is a schematic diagram of another scenario in which a fingerprint recognition method in an embodiment of the present invention is applied according to an embodiment of the present invention.

Scenario 7: A power-off screen displayed on the mobile phone is shown in FIG. 25, and a power-off button is displayed on the power-off screen.

It is assumed that in this scenario, the whitelist includes the power-off button.

Figure 26A:
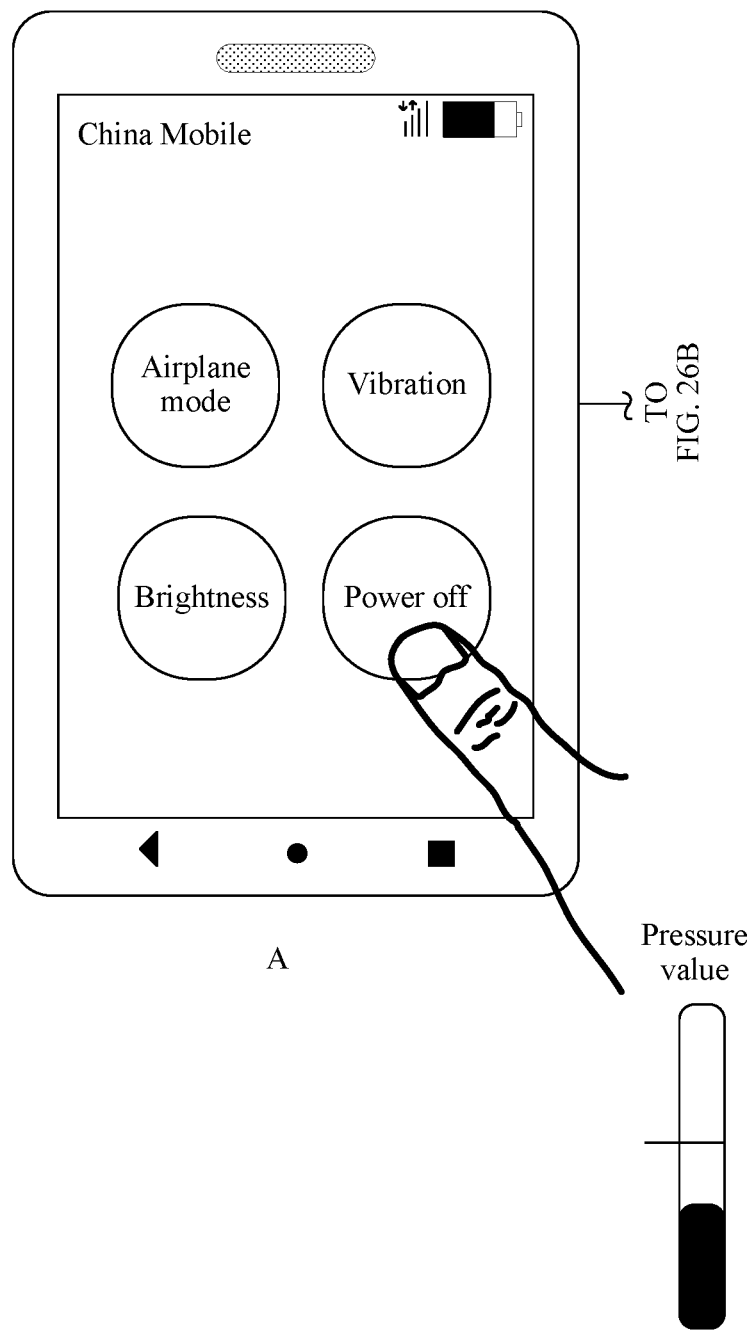
FIG. 26A.
Figure 26B:
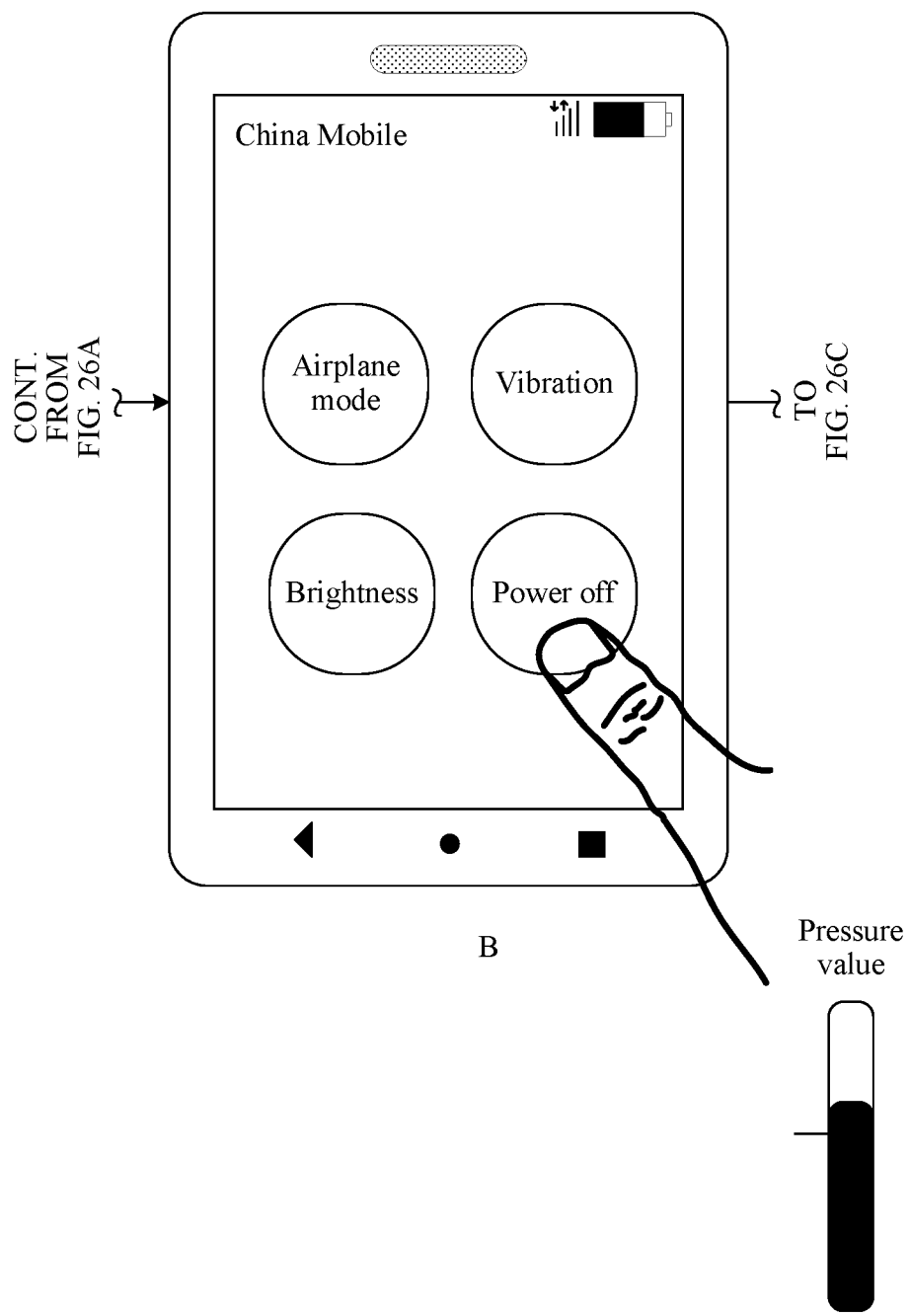
FIG. 26B, and FIG. 26C are a schematic diagram of another scenario in which a fingerprint recognition method in an embodiment of the present invention is applied according to an embodiment of the present invention.
Figure 26C:
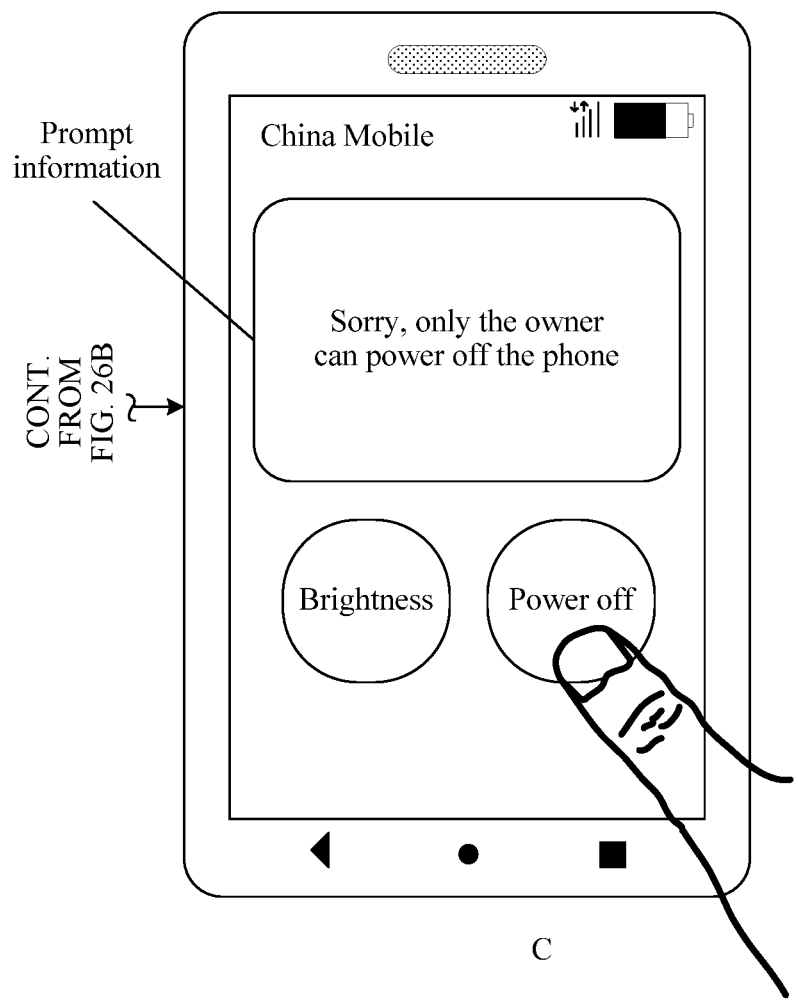

As shown in A in FIG. 26, it is assumed that the user performs a press operation on the power-off button displayed on the screen. In this case, the terminal device may detect the press operation of the user, and determine that the touch object is the power-off button. As shown in B in FIG. 26, a pressure value of pressing the power-off button by the user reaches a preset threshold. Because the power-off button is included in the whitelist, the terminal device may collect the fingerprint information of the user. As shown in C in FIG. 26, after the terminal device collects the fingerprint information, when the fingerprint information fails to be authenticated by using the fingerprint, prompt information may be displayed on the power-off screen. For example, the prompt information is specifically "Sorry, only the owner can power off the phone", to prompt the user that the fingerprint information is not matched.

Figure 27:
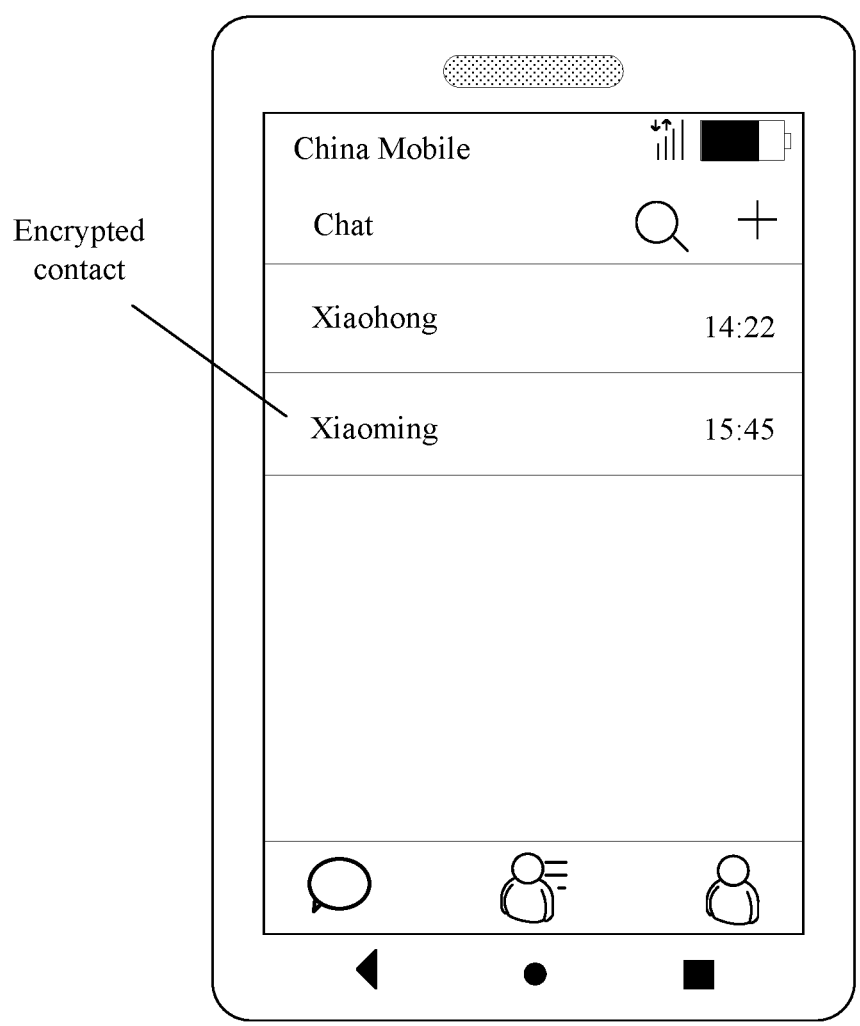
FIG. 27 is a schematic diagram of another scenario in which a fingerprint recognition method in an embodiment of the present invention is applied according to an embodiment of the present invention.

Scenario 8: A contact screen of the application 4 displayed on the mobile phone is shown in FIG. 27, and at least one contact is displayed on the contact screen. For example, an example in which displayed contacts are Xiaohong and Xiaoming is used.

In this scenario, the whitelist includes an encrypted contact. For example, it is assumed that the whitelist includes Xiaoming, and the authentication information includes a function instruction. The function instruction is used to instruct to display a historical chat record with Xiaoming.

Figure 28A:
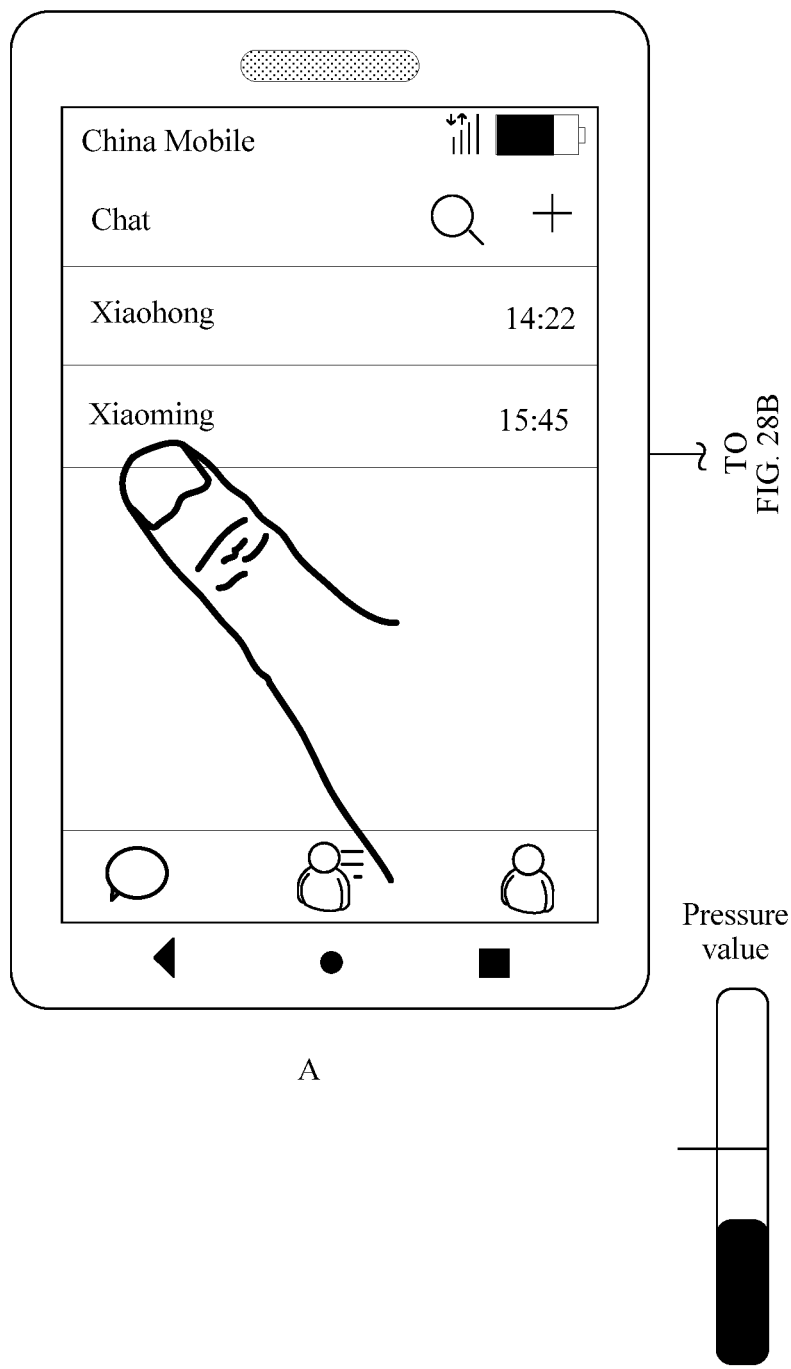
FIG. 28A.
Figure 28B:
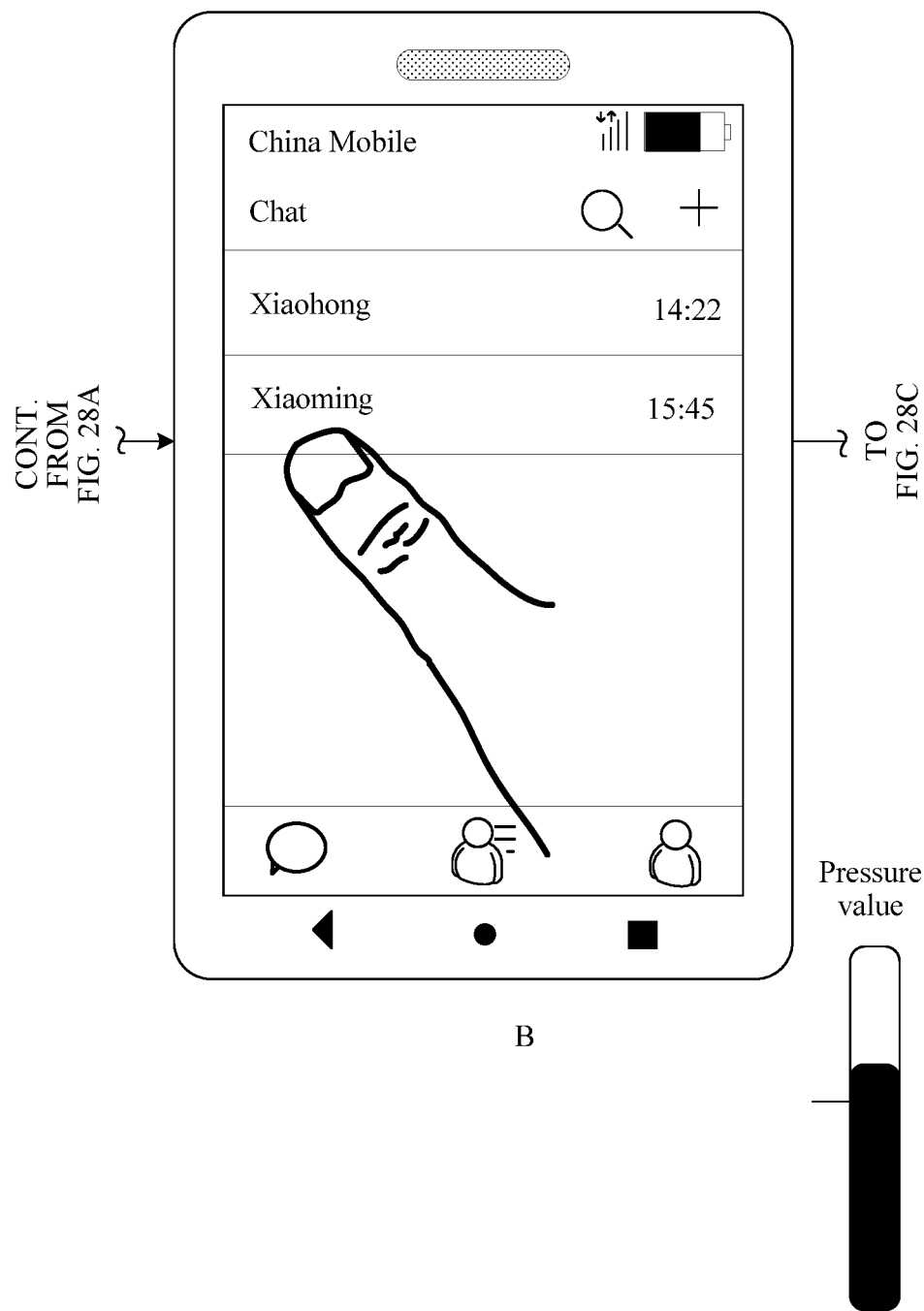
FIG. 28B, and FIG. 28C are a schematic diagram of another scenario in which a fingerprint recognition method in an embodiment of the present invention is applied according to an embodiment of the present invention.
Figure 28C:
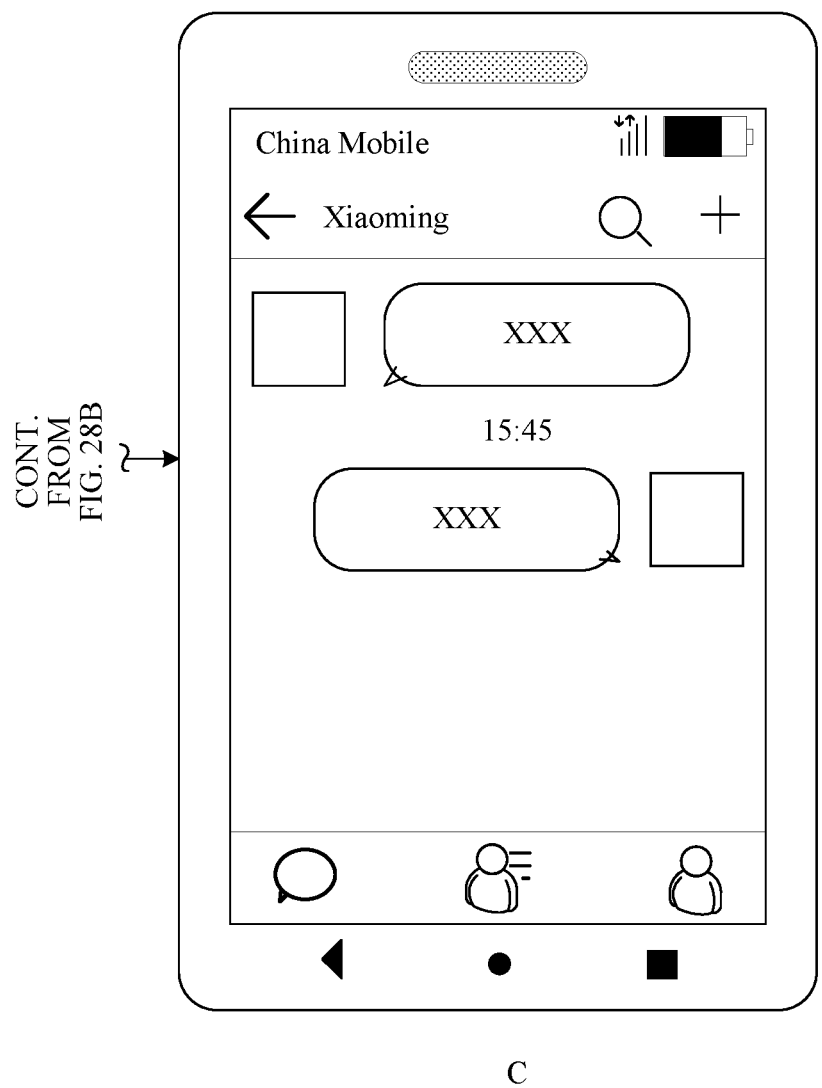

As shown in A in FIG. 28, it is assumed that the user performs a press operation on a text of Xiaoming displayed on the screen. In this case, the terminal device may detect the press operation of the user, and determine that the touch object is Xiaoming. As shown in B in FIG. 28, a pressure value of pressing the text of Xiaoming by the user reaches a preset threshold. Because Xiaoming is included in the whitelist, the terminal device may collect the fingerprint information of the user. As shown in C in FIG. 28, after the terminal device collects the fingerprint information, when the fingerprint information is authenticated by using the fingerprint, a screen of the historical chat record with Xiaoming may be enabled and displayed by using an obtained function instruction corresponding to the fingerprint information.

Figure 29A:
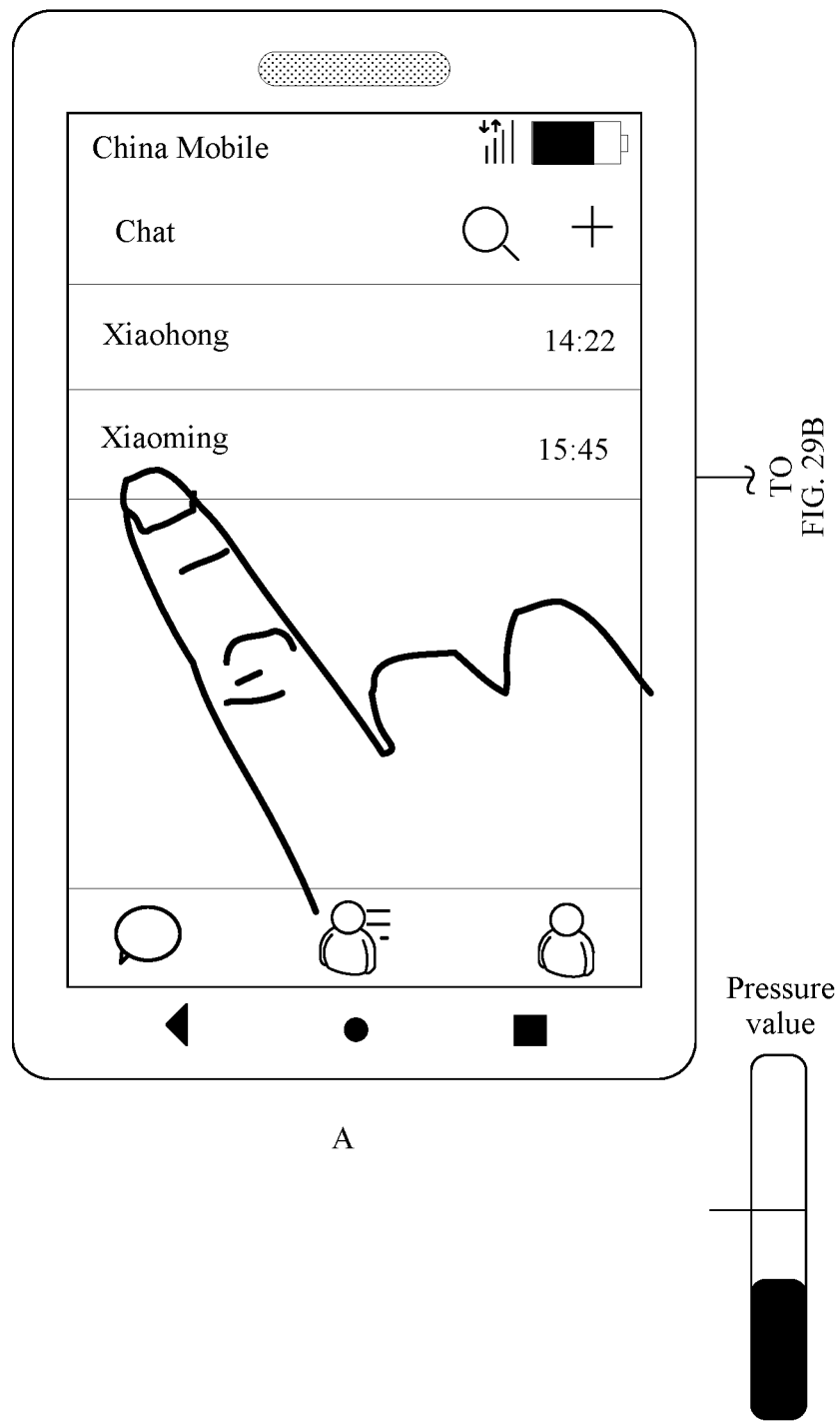
FIG. 29A.
Figure 29B:
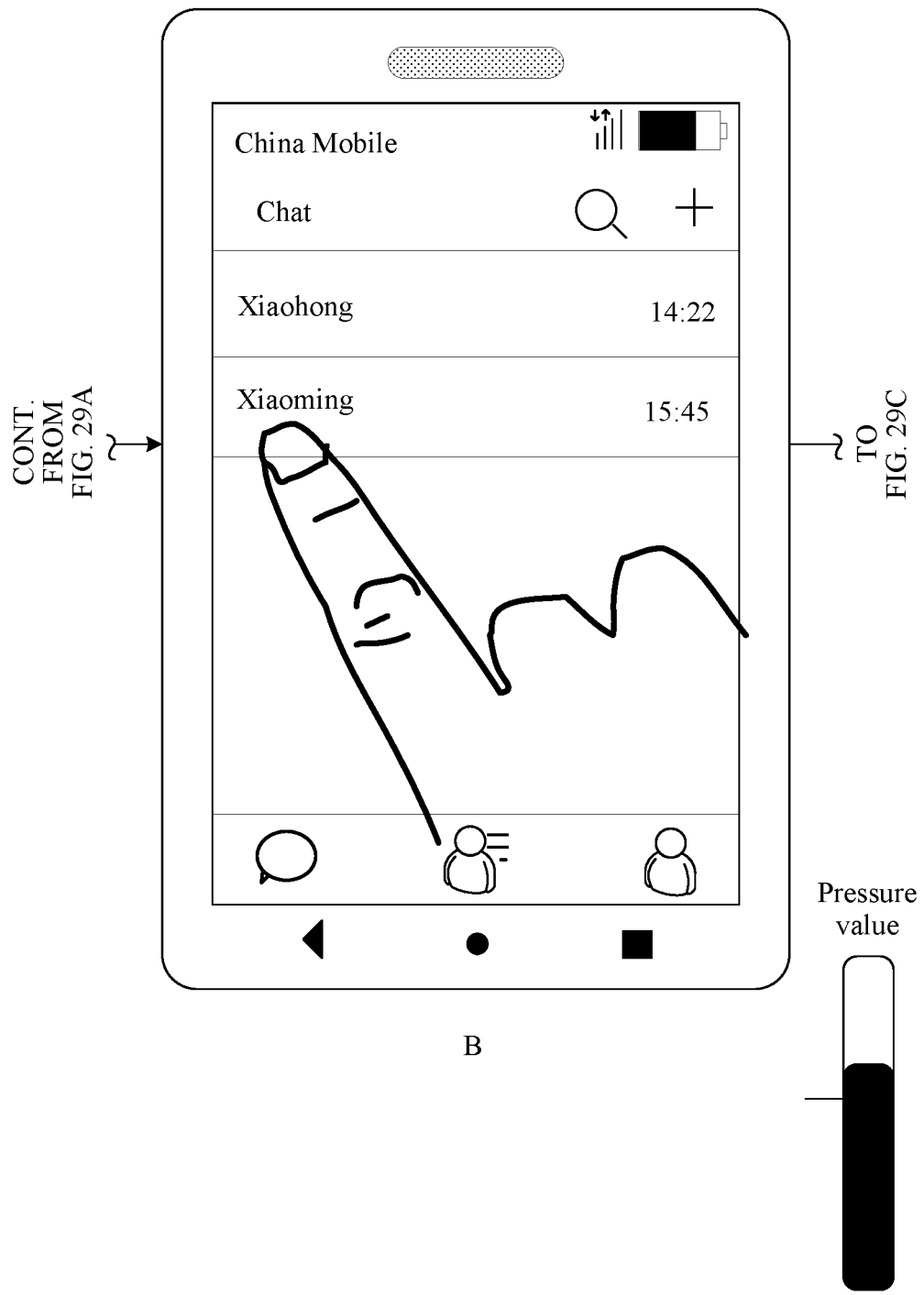
FIG. 29B, and FIG. 29C are a schematic diagram of another scenario in which a fingerprint recognition method in an embodiment of the present invention is applied according to an embodiment of the present invention.
Figure 29C:
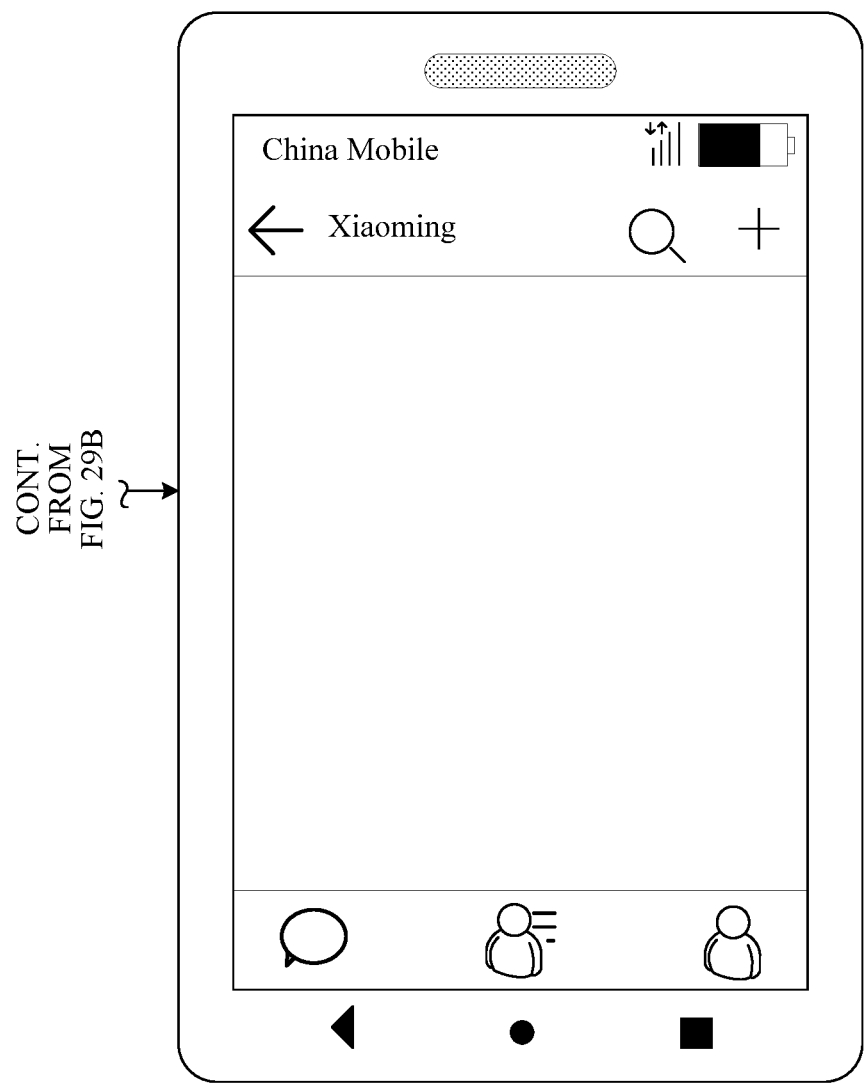

As shown in A in FIG. 29, it is assumed that the user performs a press operation on Xiaoming displayed on the screen. In this case, the terminal device may detect the press operation of the user, and determine that the touch object is Xiaoming. As shown in B in FIG. 29, a pressure value of pressing Xiaoming by the user reaches a preset threshold. Because Xiaoming is included in the whitelist, the terminal device may collect the fingerprint information of the user. As shown in C in FIG. 29, after the terminal device collects the fingerprint information, when the fingerprint information fails to be authenticated by using the fingerprint, a screen of a blank historical chat record with Xiaoming may be displayed, to indicate that the fingerprint information is not matched.

Figure 30:
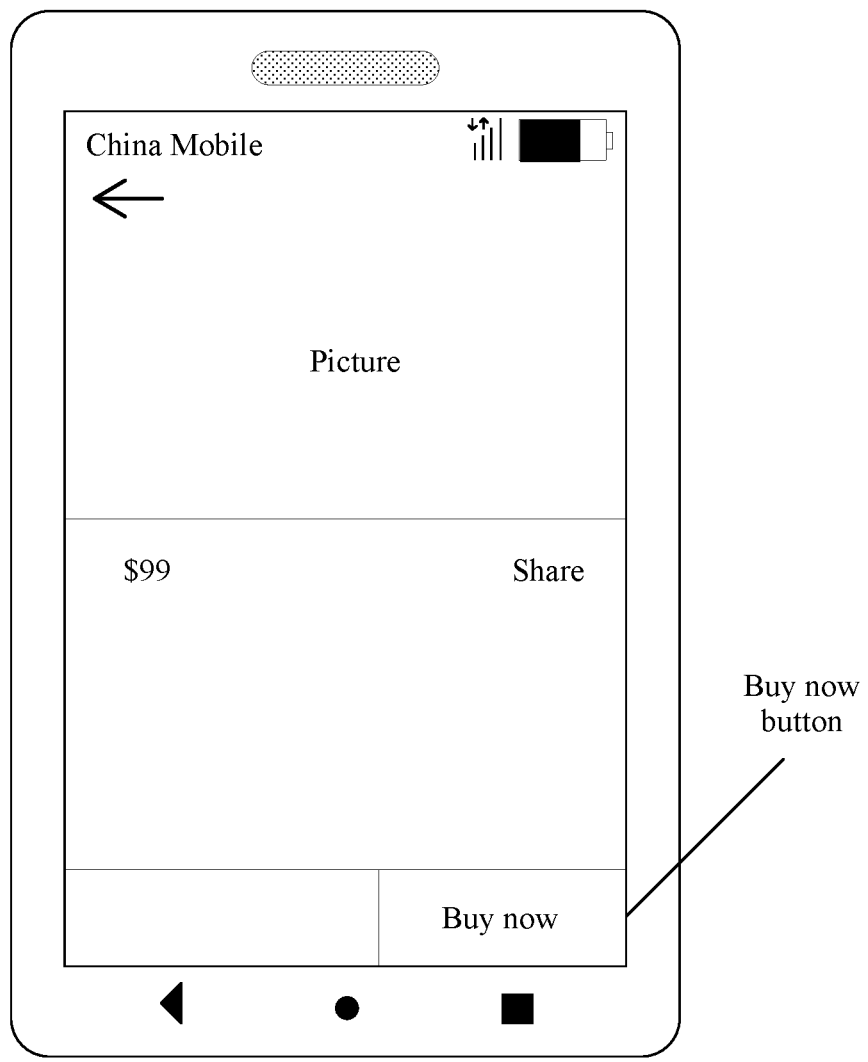
FIG. 30 is a schematic diagram of another scenario in which a fingerprint recognition method in an embodiment of the present invention is applied according to an embodiment of the present invention.
Figure 31A:
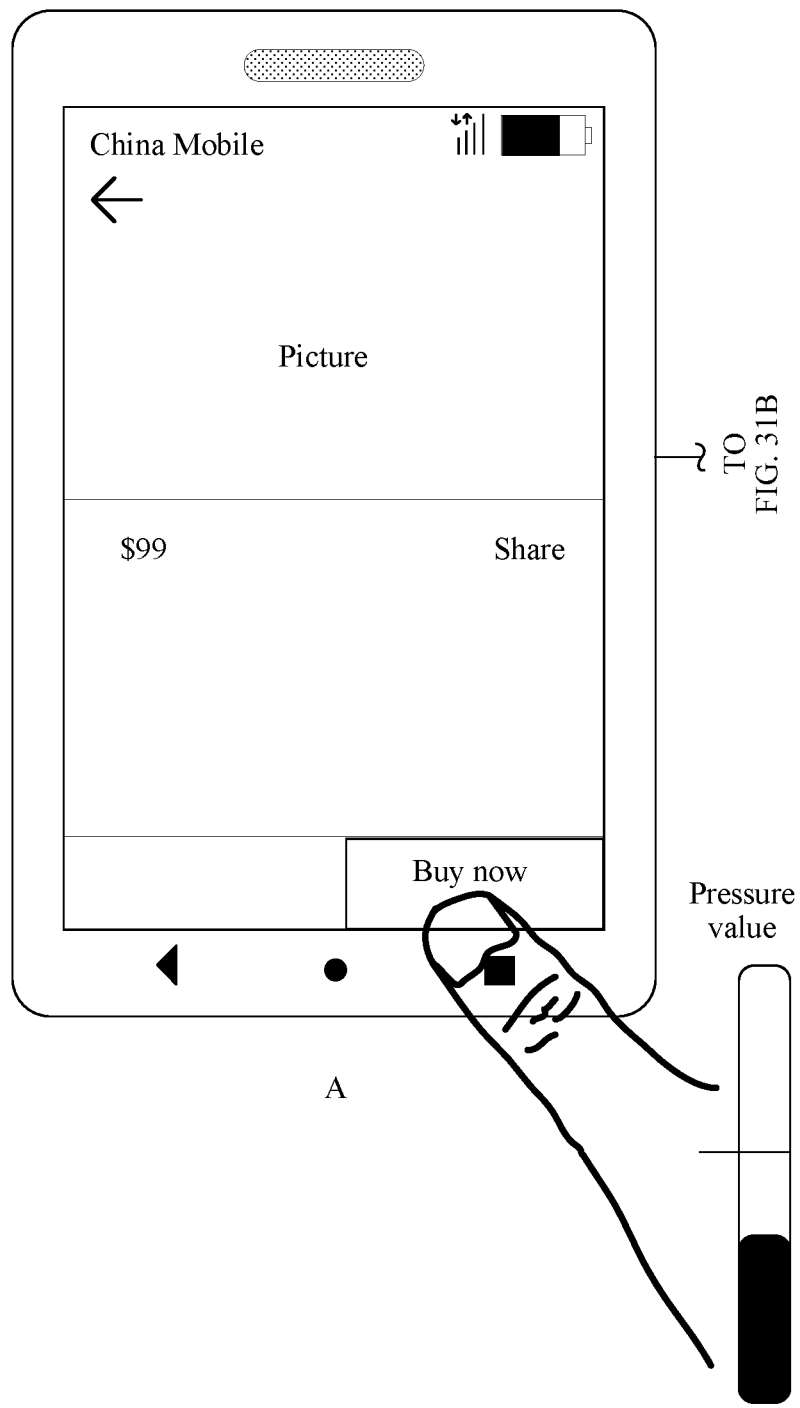
FIG. 31A.
Figure 31B:
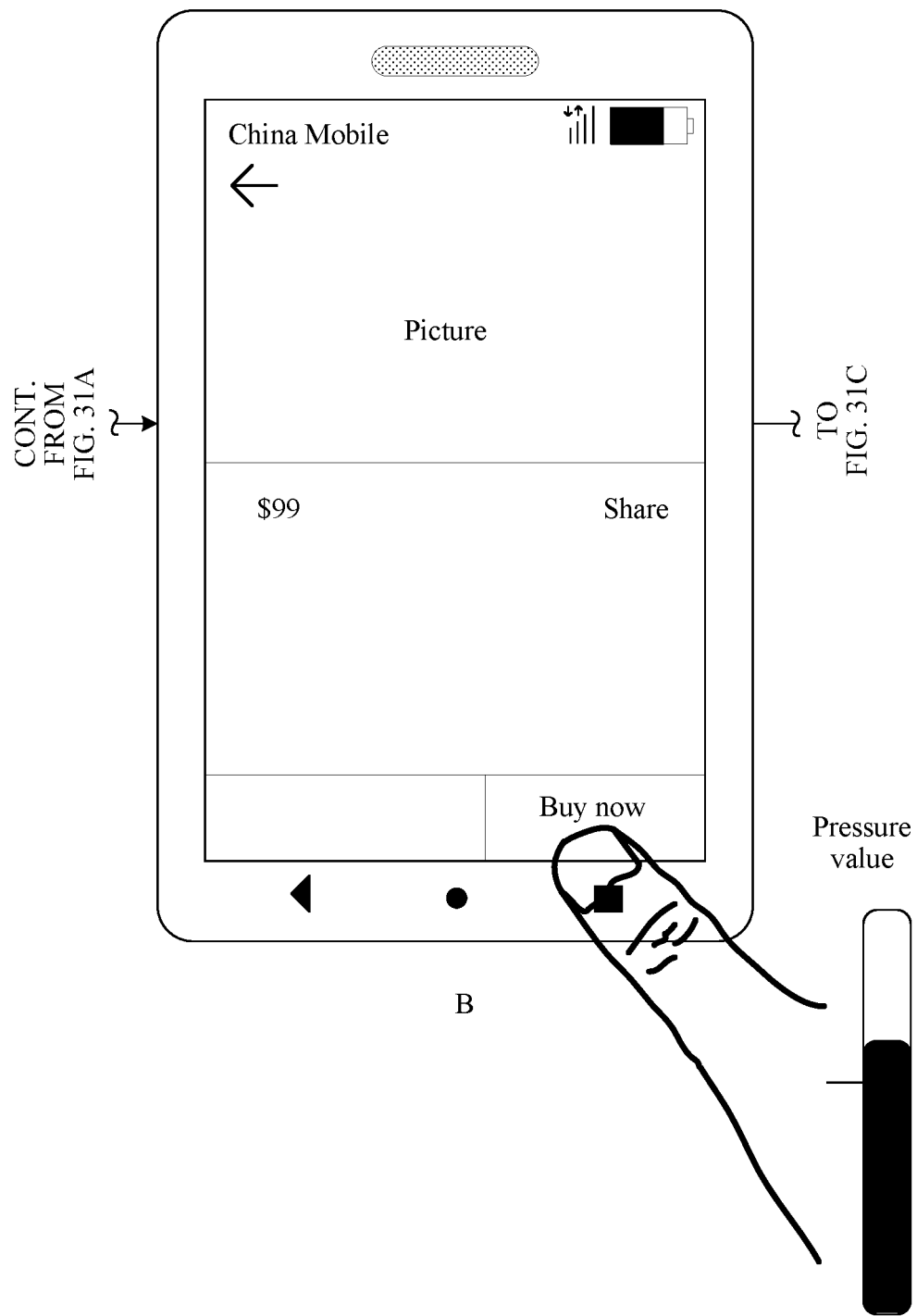
FIG. 31B, FIG. 31C, FIG. 31D, and FIG. 31E are a schematic diagram of another scenario in which a fingerprint recognition method in an embodiment of the present invention is applied according to an embodiment of the present invention.
Figure 31C:
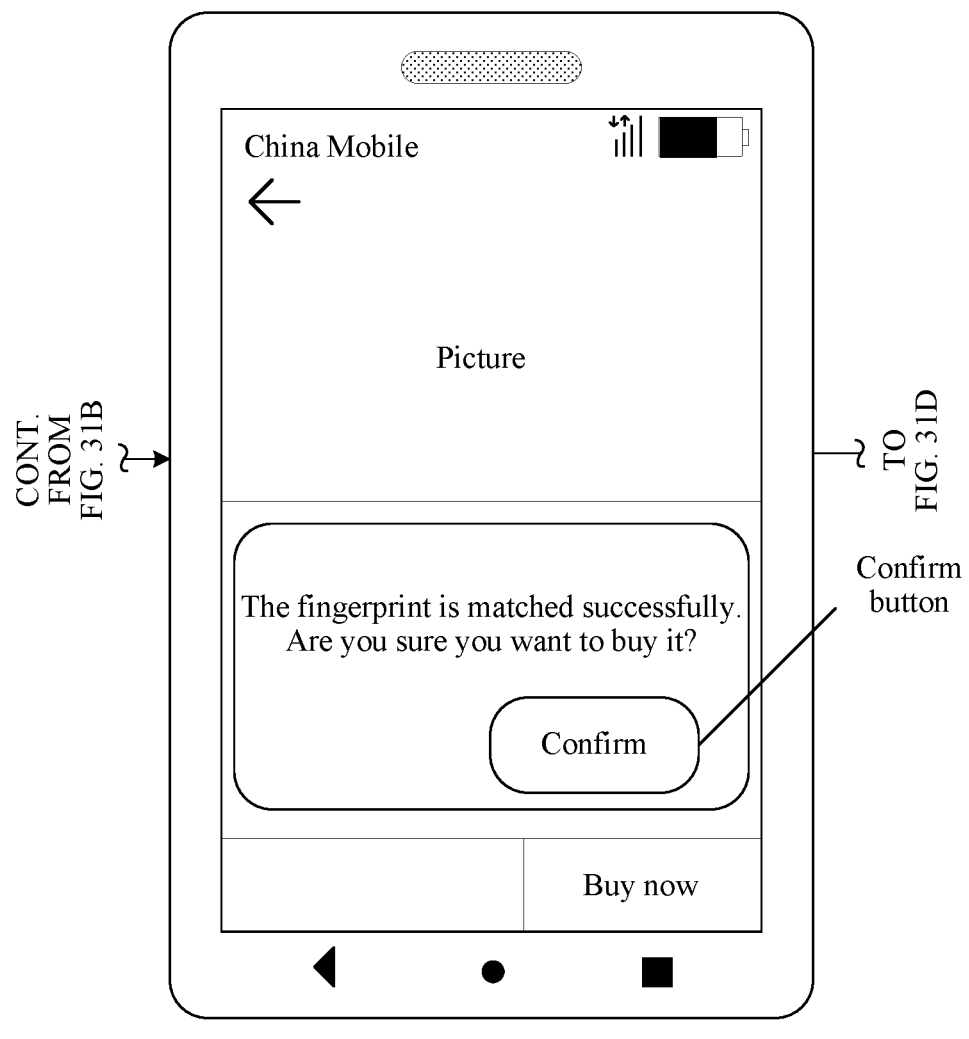
Figure 31D:
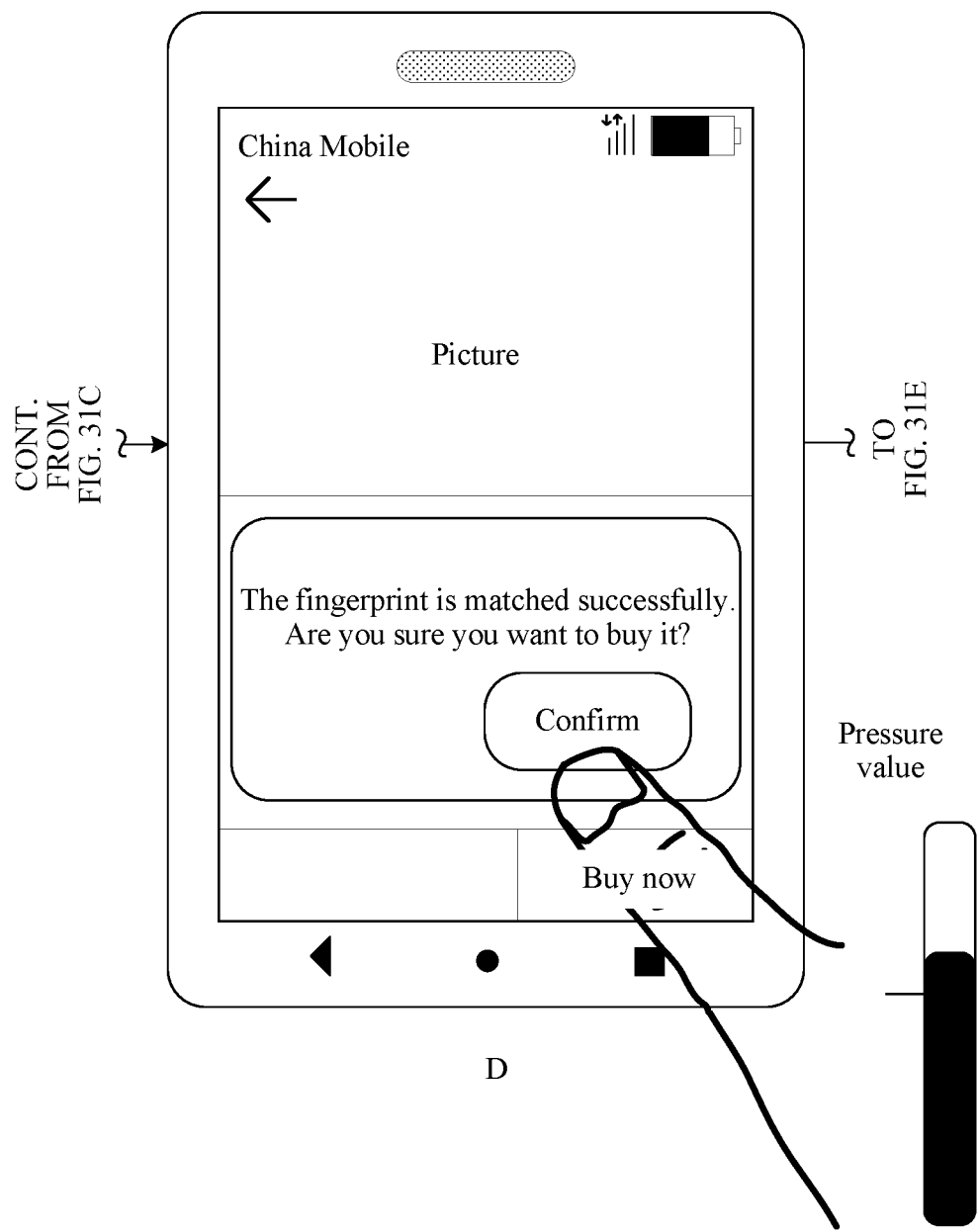
Figure 31E:
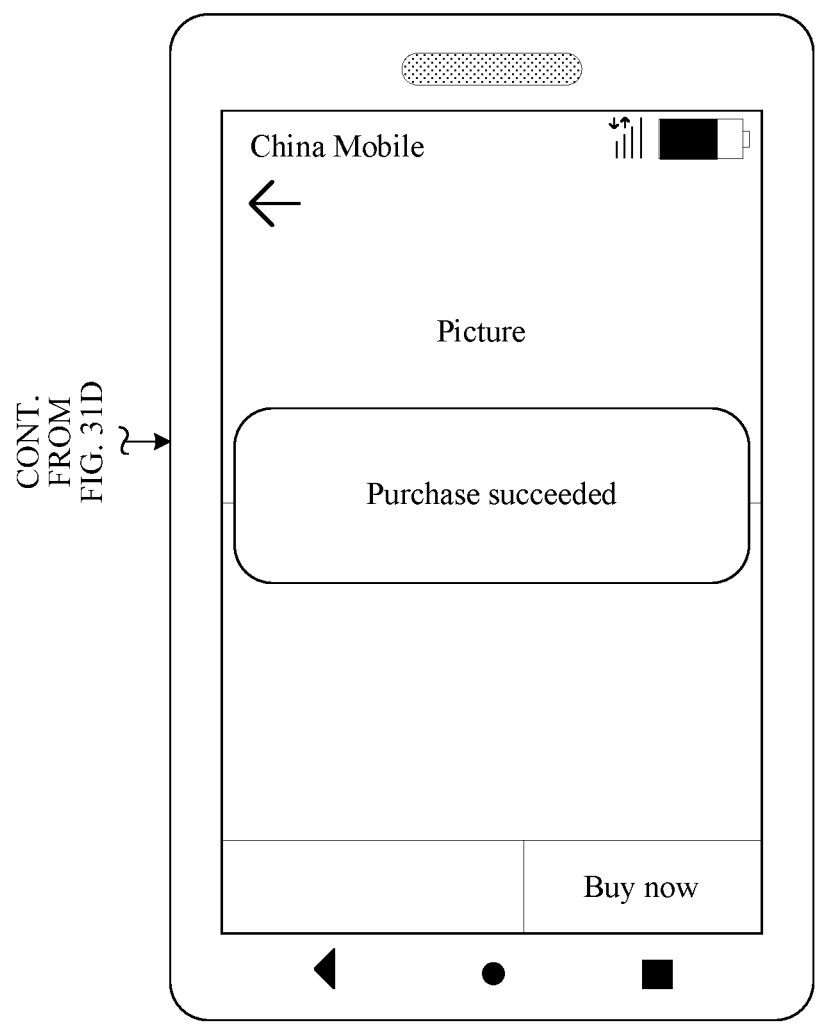
Figure 32A:
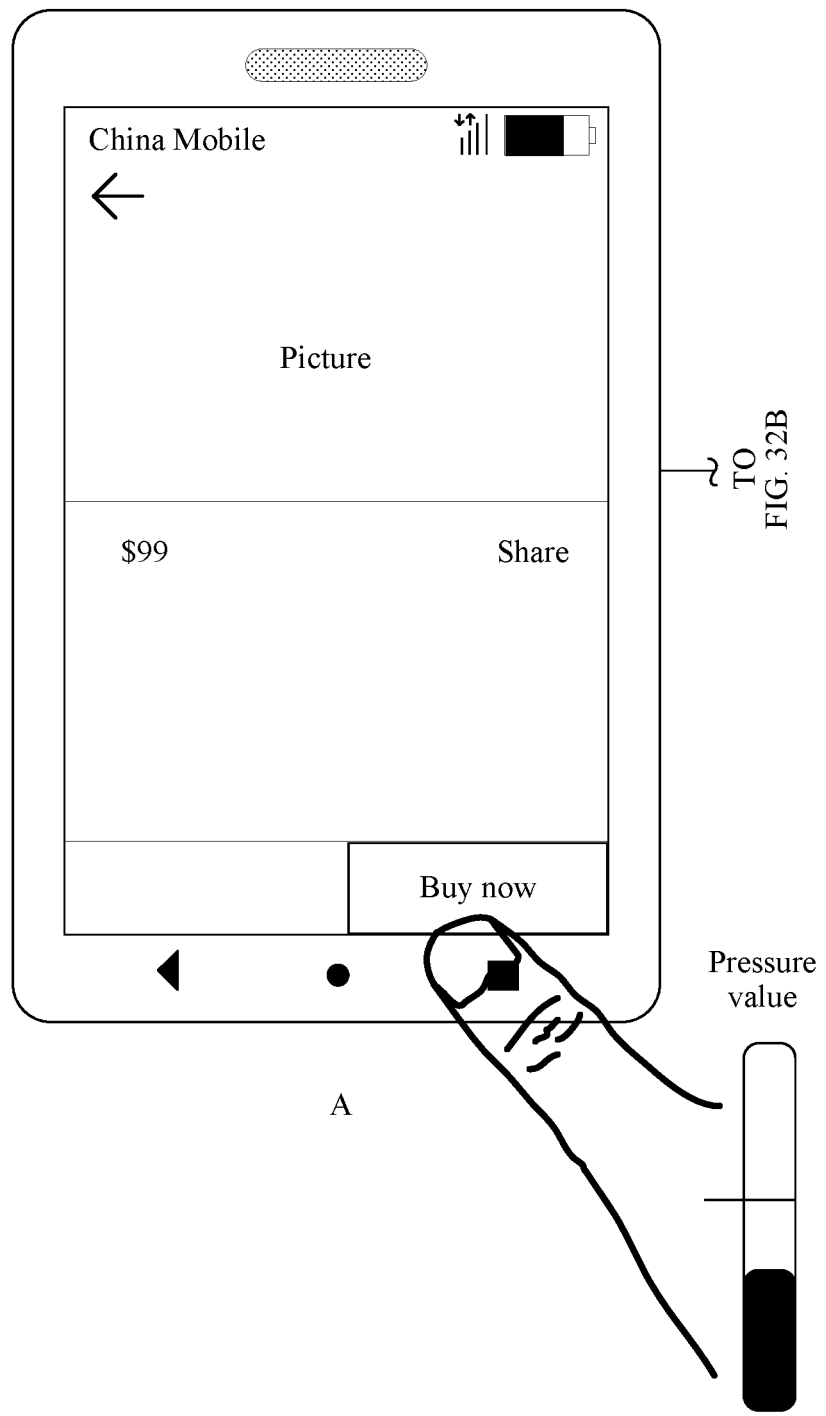
FIG. 32A.
Figure 32B:
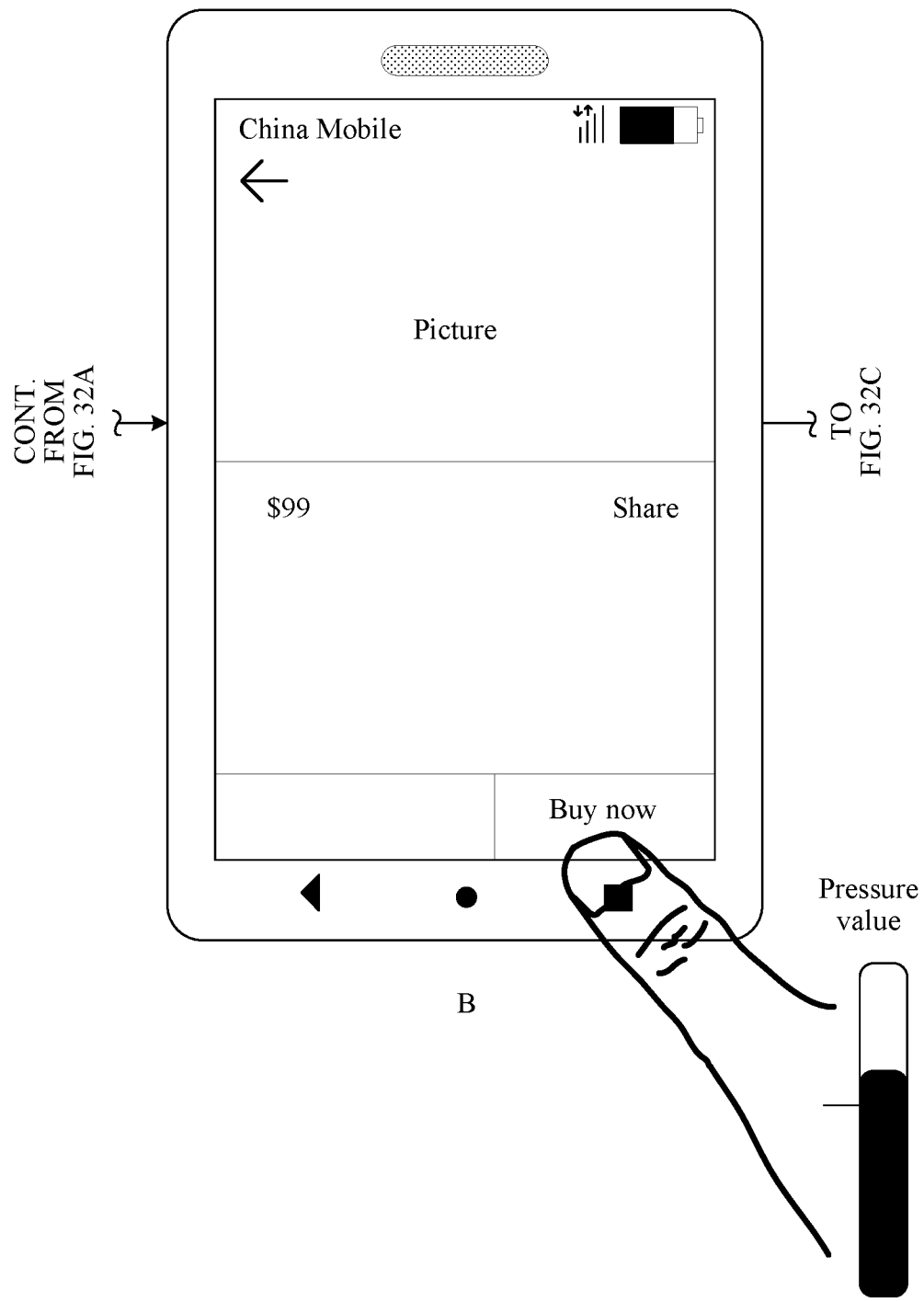
FIG. 32B, FIG. 32C, FIG. 32D, and FIG. 32E are a schematic diagram of another scenario in which a fingerprint recognition method in an embodiment of the present invention is applied according to an embodiment of the present invention.
Figure 32C:
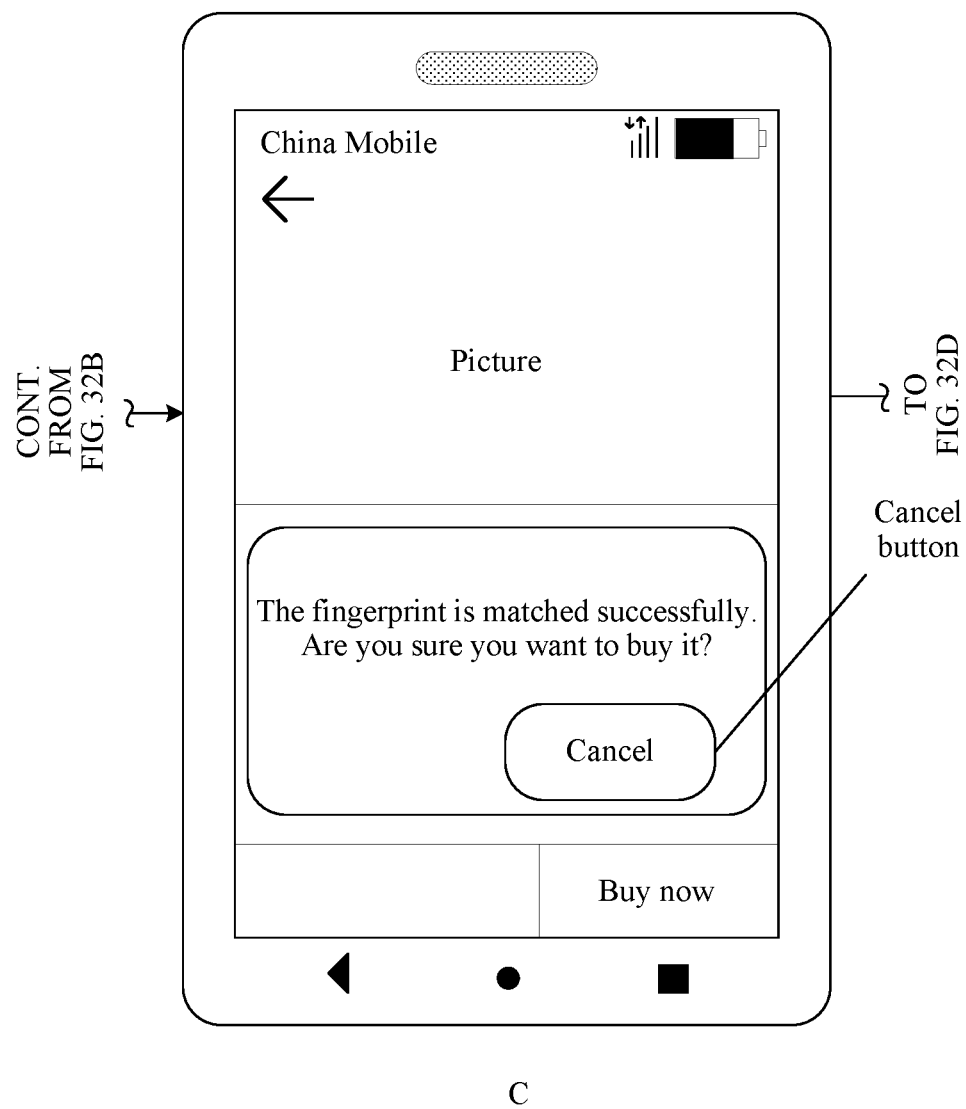
Figure 32D:
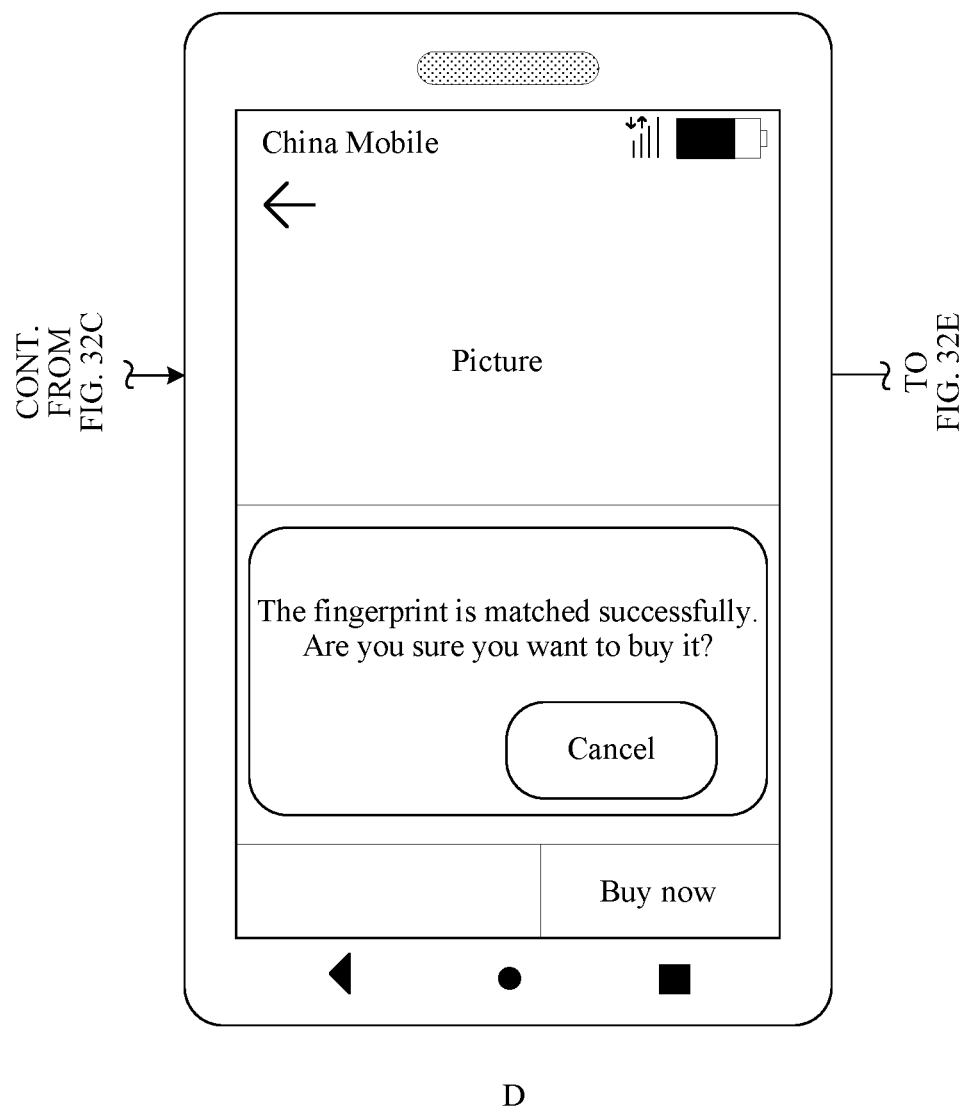
Figure 32E:
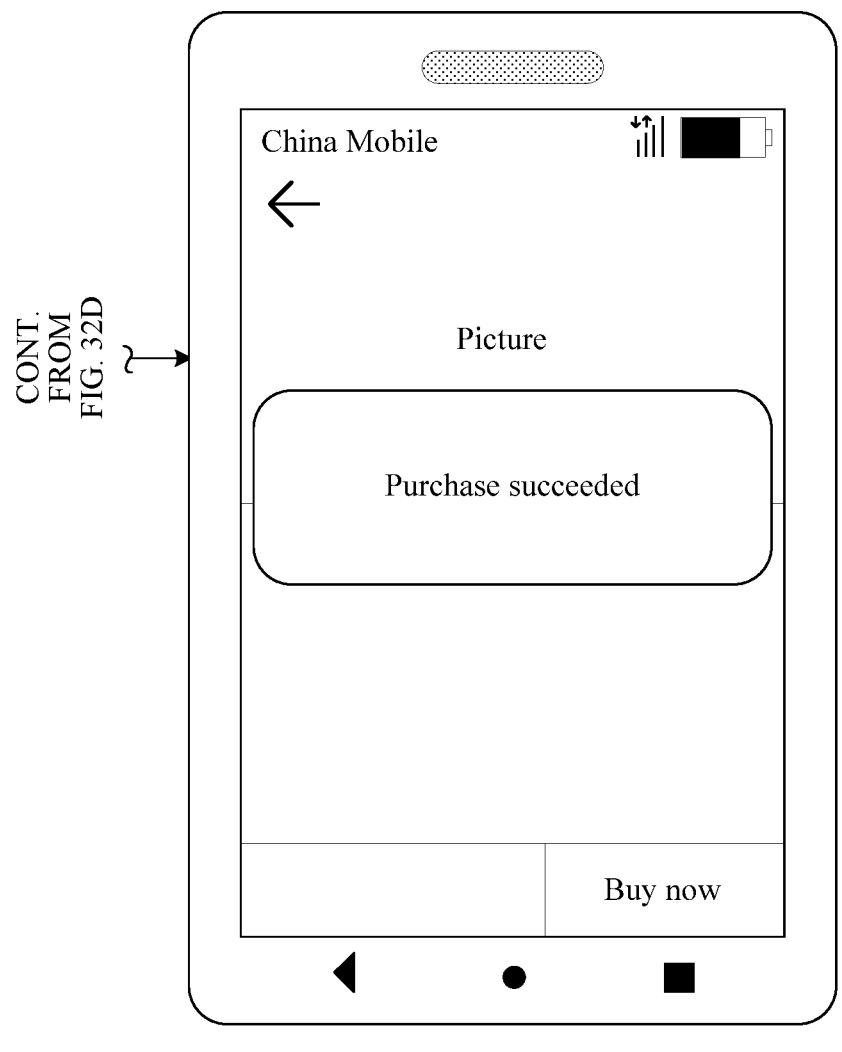

Scenario 9: A purchase screen of the application 3 displayed on the mobile phone is shown in FIG. 30, and a buy now button is displayed on the purchase screen.

It is assumed that in this scenario, the whitelist includes the buy now button, and the authentication information includes a payment password.

As shown in A in FIG. 31, it is assumed that the user performs a press operation on the buy now button displayed on the screen. In this case, the terminal device may detect the press operation of the user, and determine that the touch object is the buy now button. As shown in B in FIG. 31, a pressure value of pressing the buy now button by the user reaches a preset threshold. Because the buy now button is included in the whitelist, the terminal device may collect the fingerprint information of the user. As shown in C in FIG. 31, after the terminal device collects the fingerprint information, prompt information and a confirm button may be displayed on the purchase screen after the fingerprint information is authenticated by using the fingerprint. The prompt information is used to prompt the user whether to perform a purchase, to perform secondary authentication on the buy now button. As shown in D in FIG. 31, a pressure value of pressing the confirm button by the user reaches a preset threshold. As shown in E in FIG. 31, the terminal device uses an obtained payment password corresponding to the fingerprint information to purchase a corresponding article and display, on the purchase screen, prompt information that the purchase of the user succeeded.

As shown in A in FIG. 32, it is assumed that the user performs a press operation on the buy now button displayed on the screen. In this case, the terminal device may detect the press operation of the user, and determine that the touch object is the buy now button. As shown in B in FIG. 32, a pressure value of pressing the buy now button by the user reaches a preset threshold. Because the buy now button is included in the whitelist, the terminal device may collect the fingerprint information of the user. As shown in C in FIG. 32, after the terminal device collects the fingerprint information, prompt information and a cancel button may be displayed after the fingerprint information is authenticated by using the fingerprint. The prompt information is used to prompt the user whether to perform a purchase, to perform secondary authentication on the buy now button. As shown in D in FIG. 32, the user does not perform a cancellation operation within a preset time period. As shown in E in FIG. 32, the terminal device uses an obtained payment password corresponding to the fingerprint information to purchase a corresponding article and display, on the purchase screen, prompt information that the purchase of the user succeeded.

It should be noted that in the scenario 1 to the scenario 9, a specific process of fingerprint recognition is described by using an example in which the whitelist includes at least one touch object that supports fingerprint authentication. Certainly, when the whitelist includes an authentication area, a specific process of fingerprint recognition is similar to that in the scenario 1 to the scenario 9. Details are not described in this embodiment of the present invention again.

Figure 33:
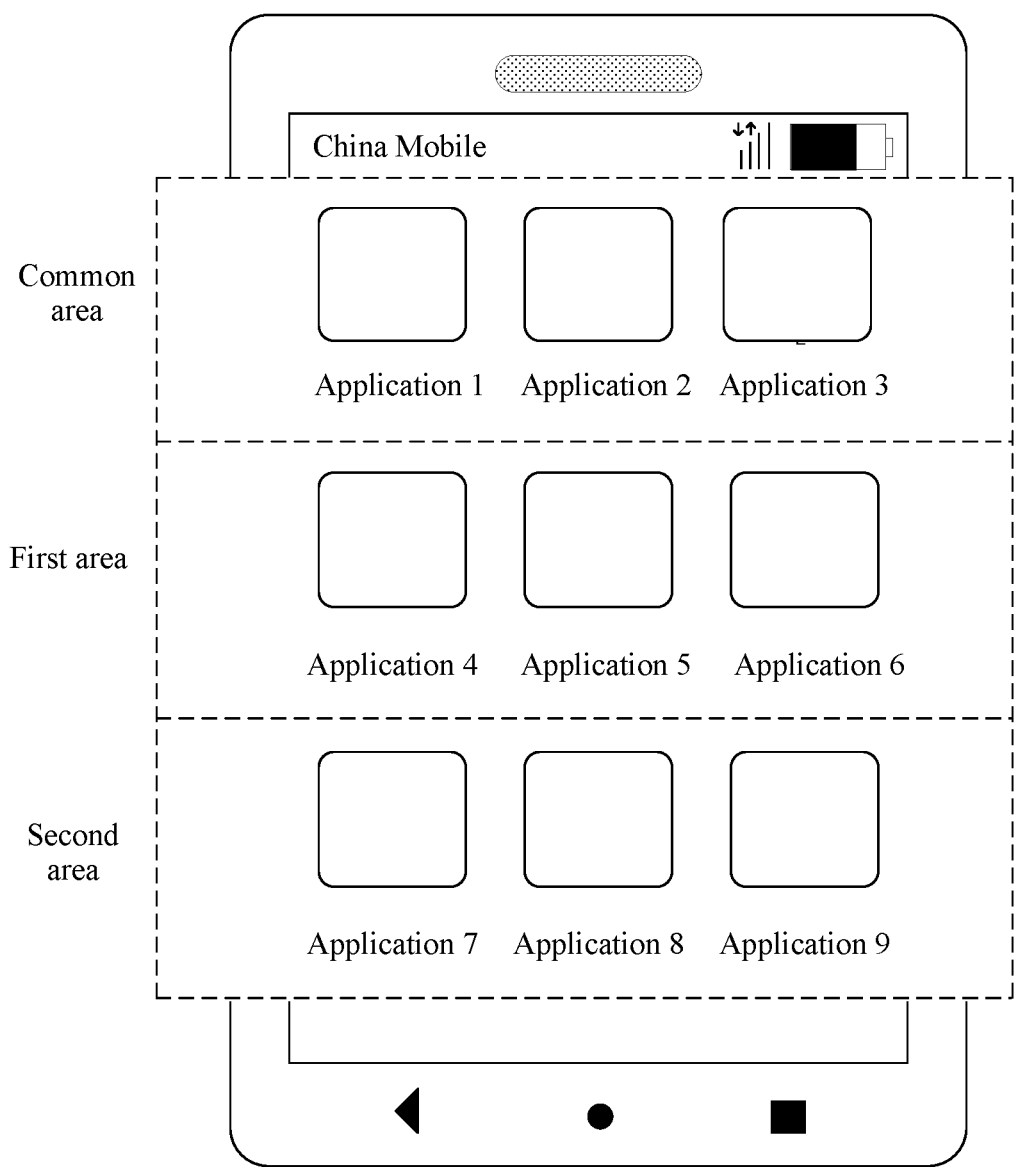
FIG. 33 is a schematic diagram of another scenario in which a fingerprint recognition method in an embodiment of the present invention is applied according to an embodiment of the present invention.

For example, an unlock screen displayed on the mobile phone is shown in FIG. 33. The unlock screen is divided into three areas: a common area, a first area, and a second area. The common area is an area that does not support fingerprint authentication, the first area is an area that supports the fingerprint authentication and in which the secondary authentication does not need to be performed, and the second area is an area that supports the fingerprint authentication and in which the secondary authentication needs to be performed. In this scenario, the whitelist includes the first area and the second area.

In addition, in the scenario 1 to the scenario 9, a case in which the touch object does not support the fingerprint authentication may occur. In this embodiment of the present invention, the scenario 2 is used as an example to describe the case in which the touch object does not support the fingerprint authentication.

Figure 34:
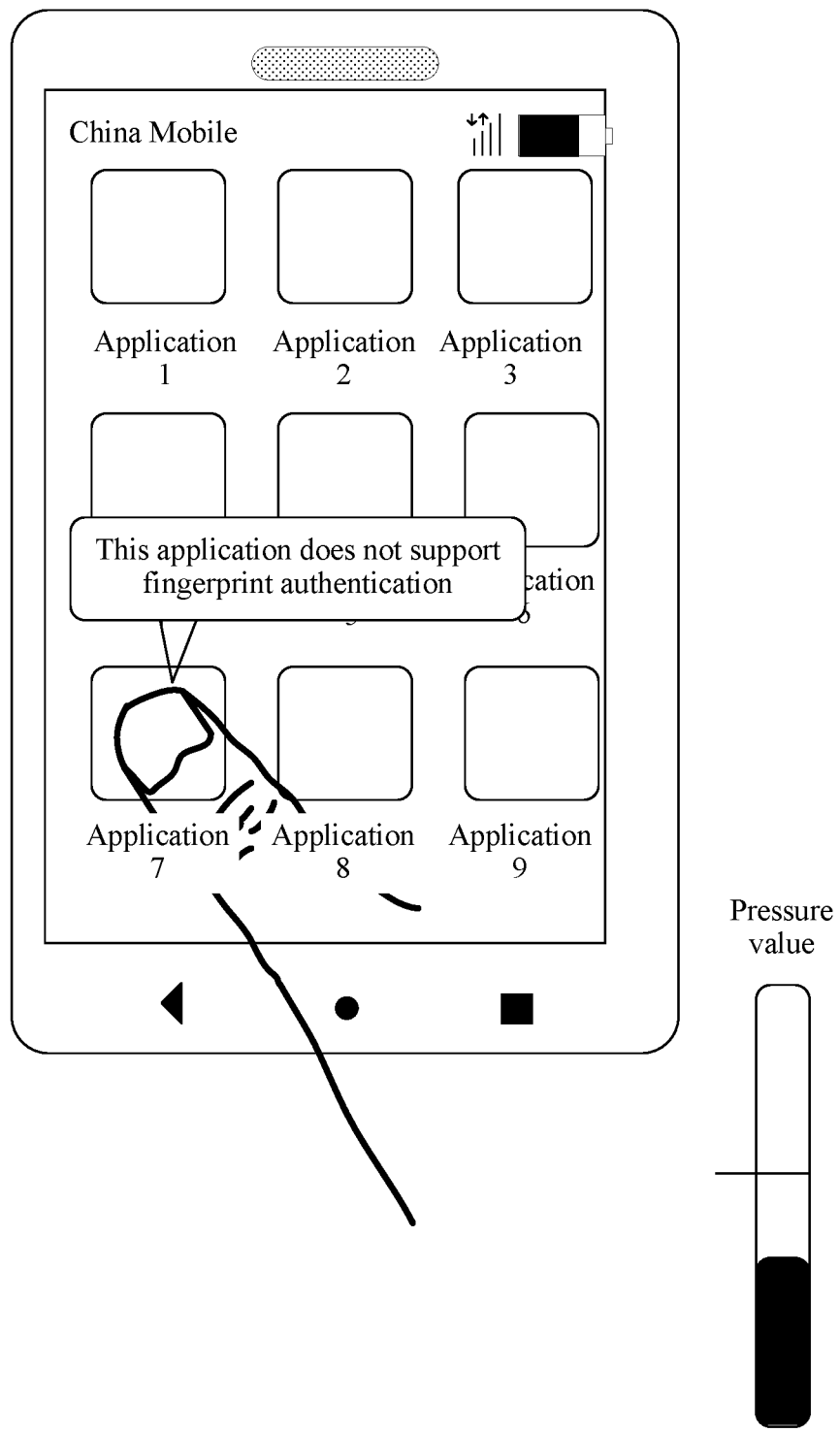
FIG. 34 is a schematic diagram of another scenario in which a fingerprint recognition method in an embodiment of the present invention is applied according to an embodiment of the present invention.

As shown in FIG. 34, it is assumed that the user performs a press operation on an icon of an application 7 displayed on the screen. In this case, the terminal device may detect the press operation of the user, and determine that the touch object is the application 7. Because the whitelist includes the application 3, the application 4, the application 5, and the application 9, the terminal device may display prompt information on the unlock screen. The prompt information is used to prompt the user that the application 7 does not support the fingerprint authentication.

It should be noted that in a scenario other than the scenario 2, a case in which the touch object does not support the fingerprint authentication is similar to that in the scenario 2. Details are not described in the present invention again.

In addition, the terminal device may perform visual processing on the at least one touch object that supports the fingerprint authentication and that is included in the whitelist, and displays a visually processed touch object. In this embodiment of the present invention, a display effect after visual processing is performed on the touch object supporting the fingerprint authentication is described by using an example in which the scenario is the scenario 2, the touch object is an application, and a display effect after visual processing is performed on the application supporting the fingerprint authentication is to display a symbol "*" on an application icon of the application.

Figure 35:
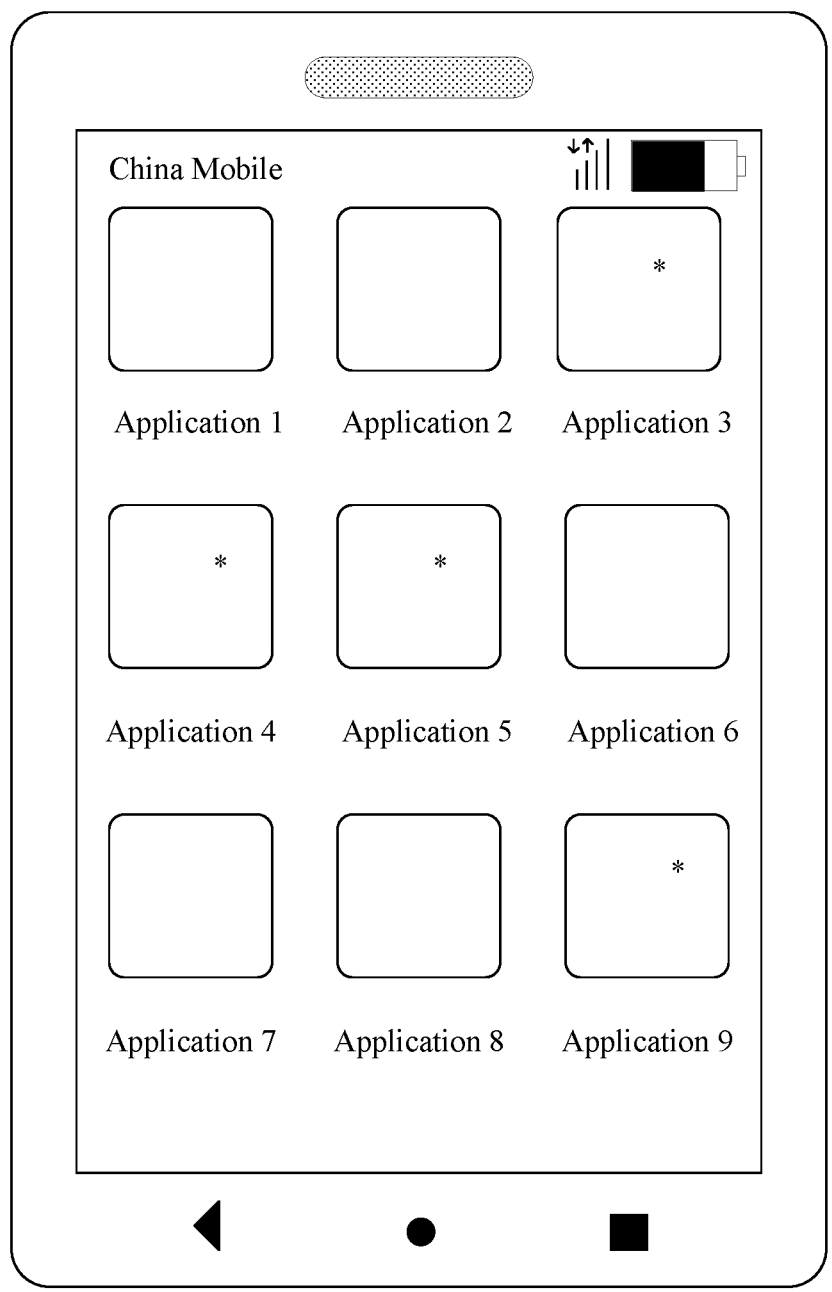
FIG. 35 is a schematic diagram of another scenario in which a fingerprint recognition method in an embodiment of the present invention is applied according to an embodiment of the present invention.

It is assumed that in this scenario, the whitelist includes the application 3, the application 4, the application 5, and the application 9. As shown in FIG. 35, in this case, the terminal device displays the symbol "*" at an upper right corner of the icon of the application 3, the icon of the application 4, the icon of the application 5, and the icon of the application 9. In this way, the user may directly learn, based on the display effect, that the application 3, the application 4, the application 5, and the application 9 support the fingerprint authentication, and the other applications do not support the fingerprint authentication.

In addition, in the scenario 1 to the scenario 5, and the scenario 9, there is a case in which the fingerprint information is not matched. In this embodiment of the present invention, the scenario 2 is used as an example to describe the case in which the fingerprint is not matched.

Figure 36A:
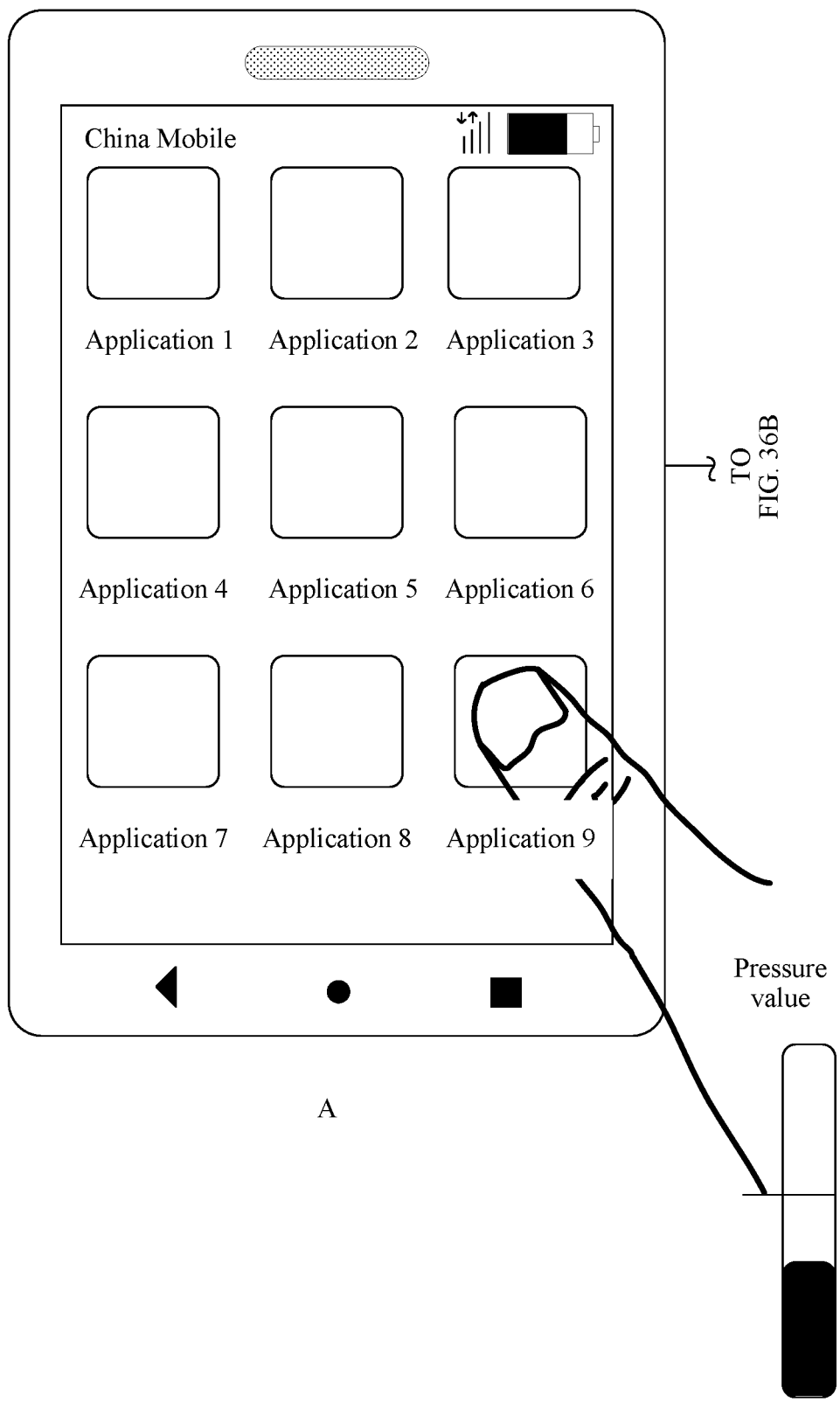
FIG. 36A, FIG. 36B, and FIG. 36C are a schematic diagram of another scenario in which a fingerprint recognition method in an embodiment of the present invention is applied according to an embodiment of the present invention.
Figure 36B:
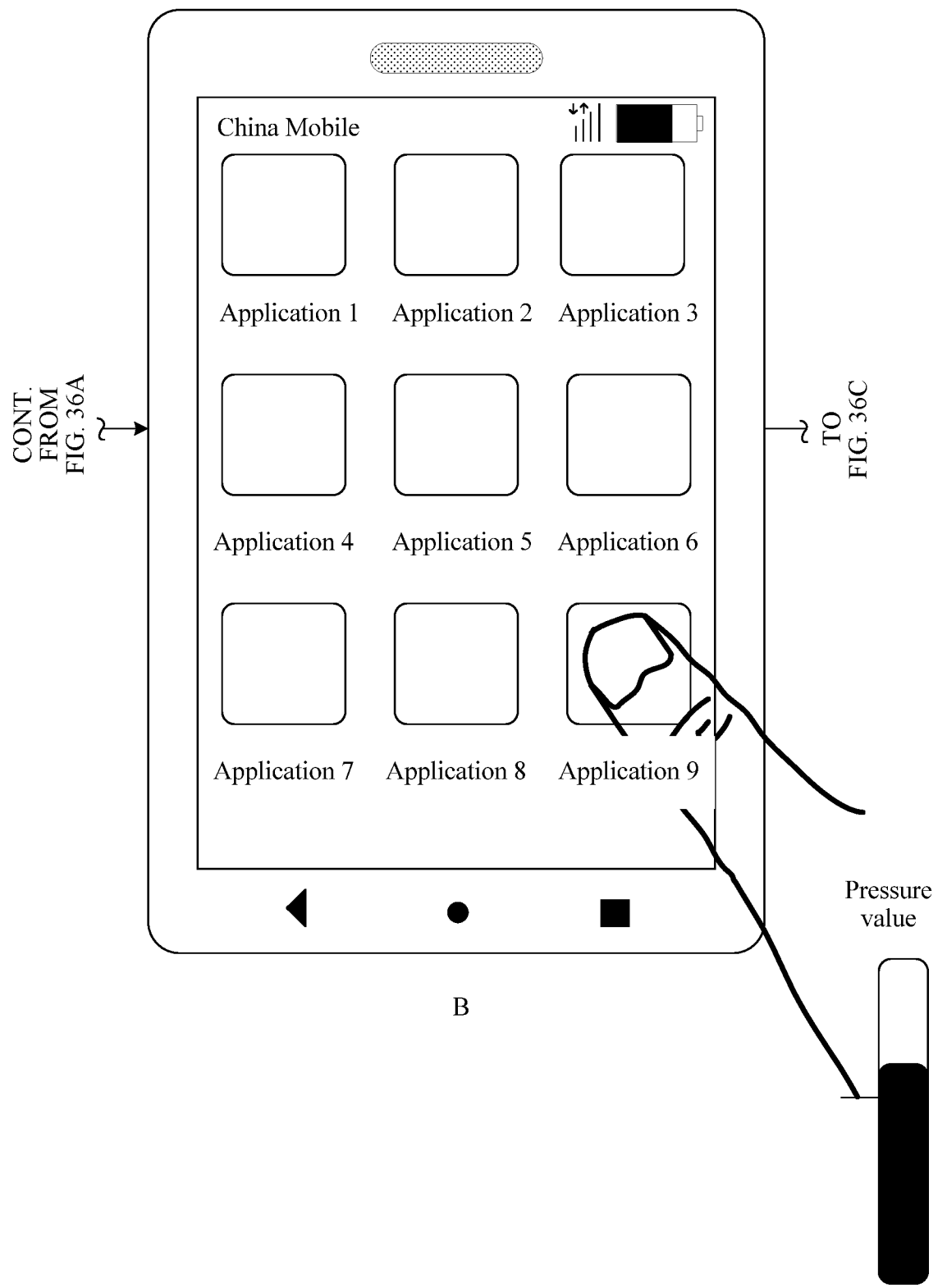
Figure 36C:
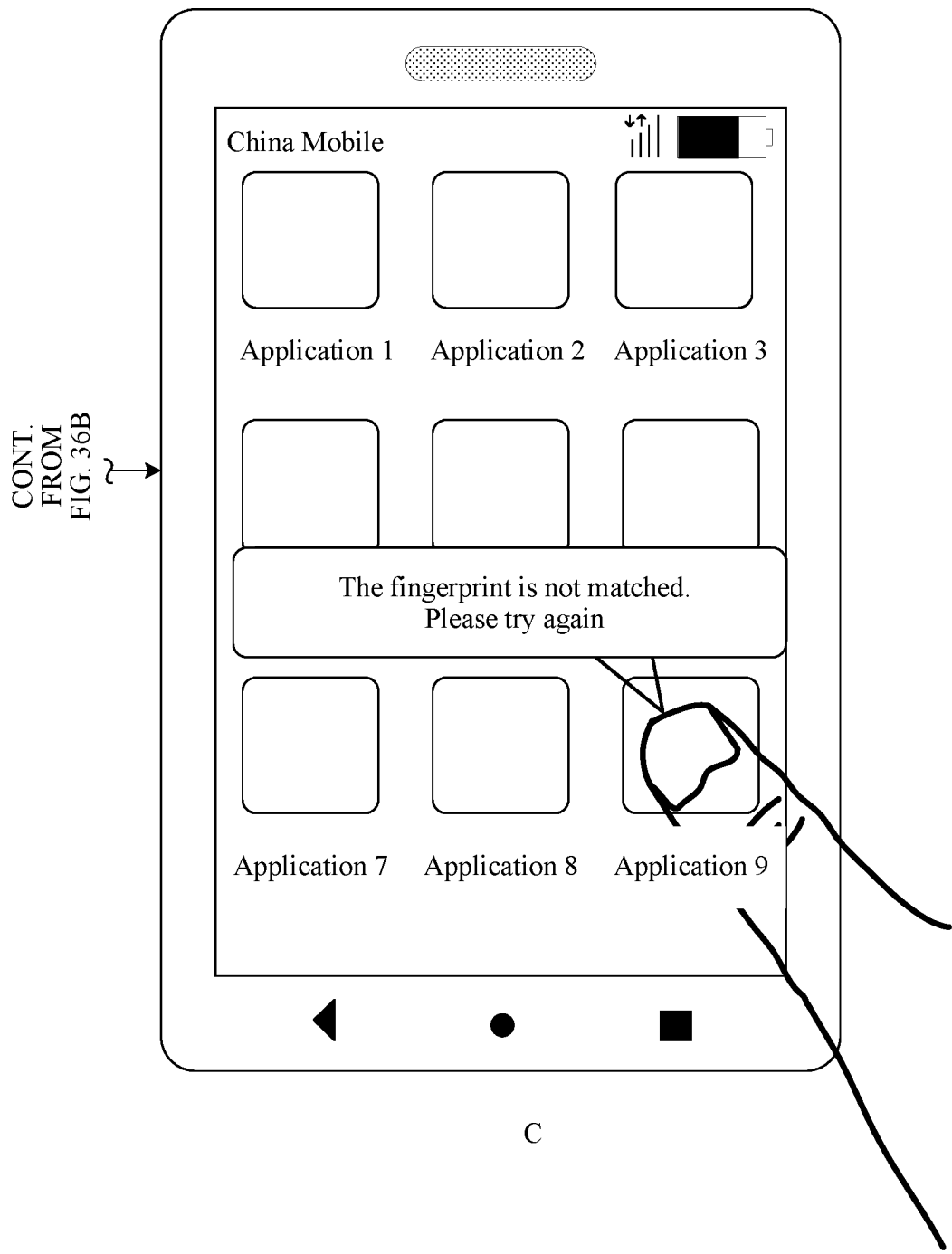

As shown in A in FIG. 36, it is assumed that the user performs a press operation on the icon of the application 9 displayed on the screen. In this case, the terminal device may detect the press operation of the user, and determine that the touch object is the application 9. As shown in B in FIG. 36, a pressure value of pressing the icon of the application 9 by the user reaches a preset threshold. Because the application 9 is included in the whitelist, the terminal device may collect the fingerprint information of the user. As shown in C in FIG. 36, after the terminal device collects the fingerprint information, when the fingerprint information fails to be authenticated by using the fingerprint, prompt information may be displayed on the unlock screen. The prompt information is used to prompt the user that the fingerprint information is not matched.

It should be noted that in the scenario 1, the scenario 3 to the scenario 5, and the scenario 9 other than the scenario 2, a case in which the fingerprint information is not matched is similar to that in the scenario 2. Details are not described in the present invention again.

The solutions provided in the embodiments of the present invention are described above from a perspective of the terminal device. It may be understood that to implement the foregoing functions, the terminal device includes corresponding hardware structures and/or corresponding software modules for performing the functions. A person of ordinary skill in the art should be easily aware that, the algorithm steps in the examples described with reference to the embodiments disclosed in this specification may be implemented by hardware or a combination of hardware and computer software in the present invention. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, the terminal device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of the present invention is an example, and is merely logical function division. There may be another division manner in an actual implementation.

Figure 37:
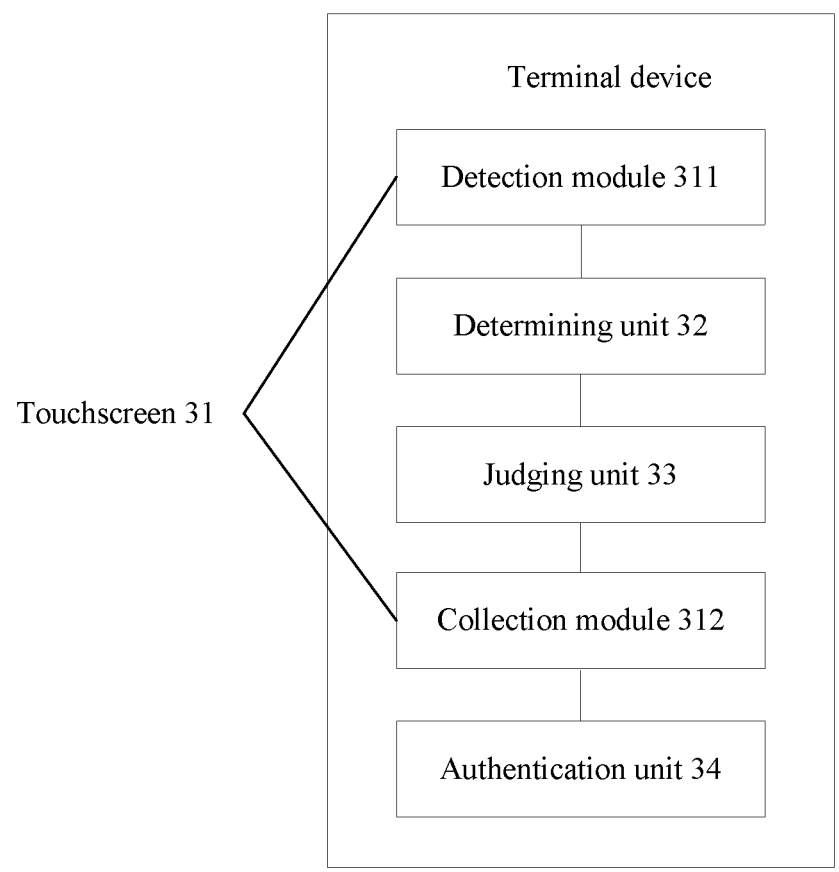
FIG. 37 is a schematic diagram of composition of another terminal device according to an embodiment of the present invention.

In a case in which each function module is obtained through division based on each corresponding function, FIG. 37 shows a possible schematic diagram of composition of a terminal device in the foregoing embodiments. As shown in FIG. 37, the terminal device may include a touchscreen 31, a determining unit 32, a judging unit 33, and an authentication unit 34. The touchscreen 31 may include a detection module 311 and a collection module 312.

Figure 2A:
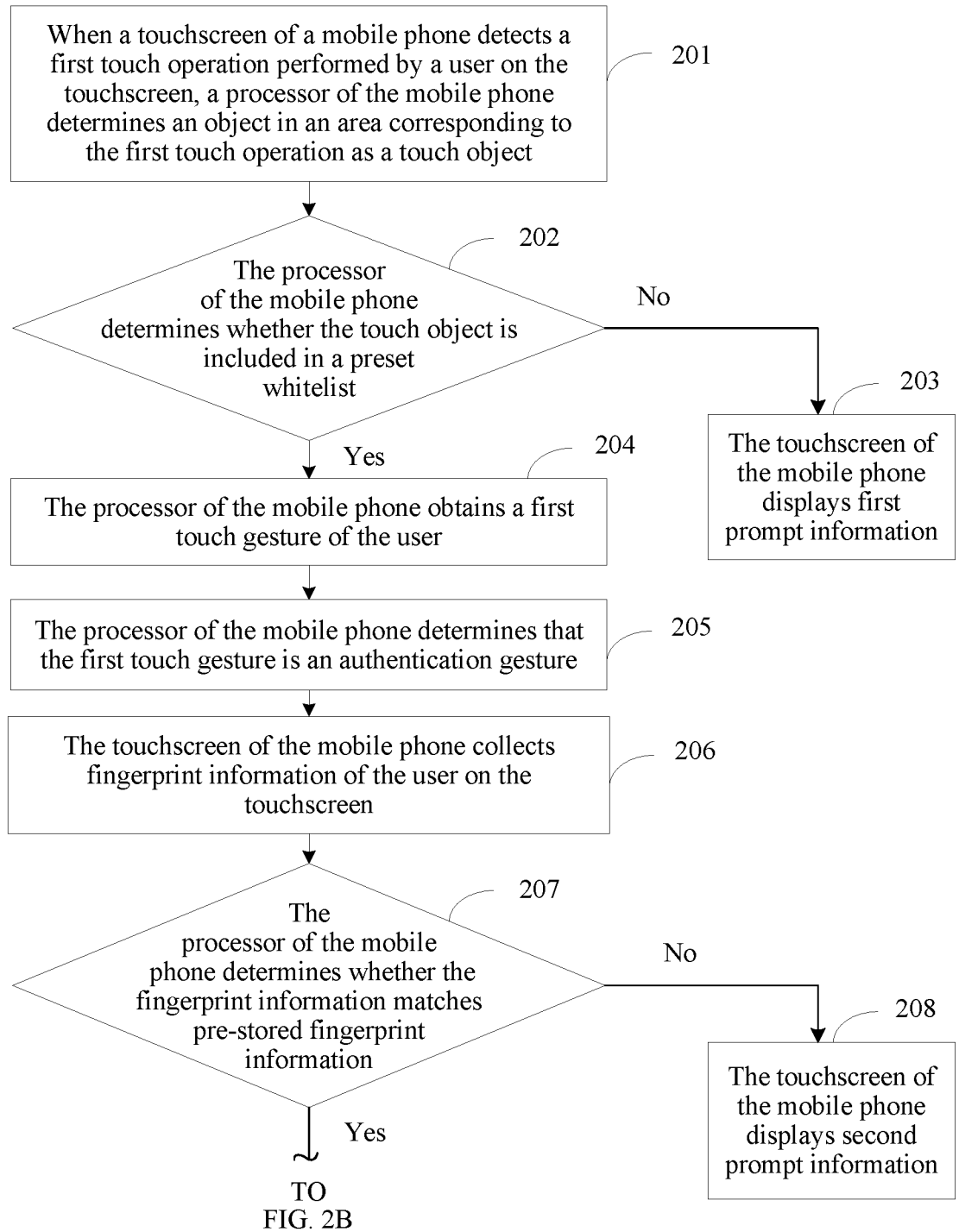
FIG. 2A and FIG. 2B are a flowchart of a fingerprint recognition method according to an embodiment of the present invention.
Figure 2B:
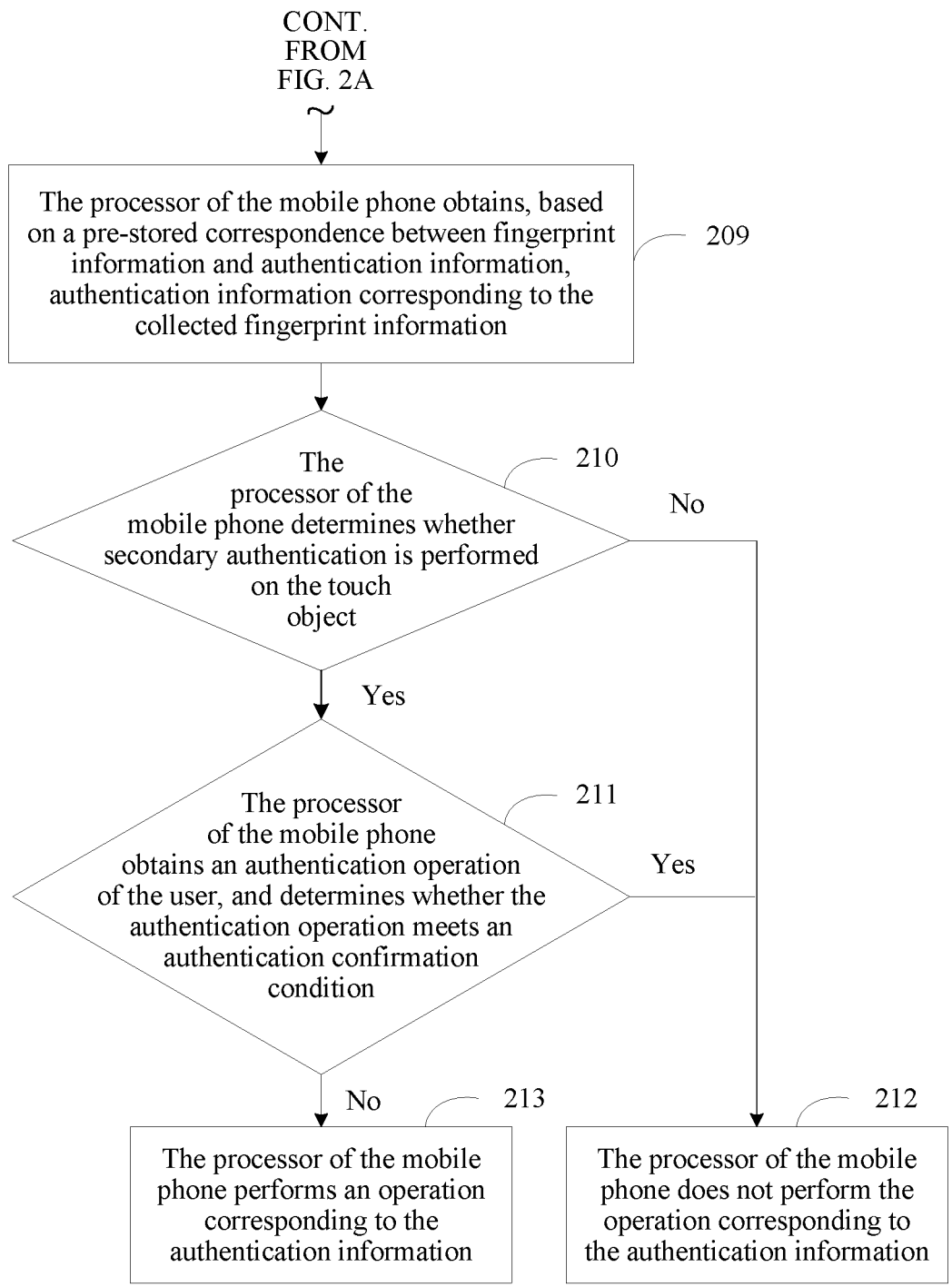

The detection module 311 is configured to support the terminal device in detecting a touch operation performed by a user on a touchscreen in the fingerprint recognition method shown in FIG. 2A and FIG. 2B.

The collection module 312 is configured to support the terminal device in performing step 206 in the fingerprint recognition method shown in FIG. 2A and FIG. 2B.

The determining unit 32 is configured to support the terminal device in performing step 201 and step 205 in the fingerprint recognition method shown in FIG. 2A and FIG. 2B.

The judging unit 33 is configured to support the terminal device in performing step 202, step 210, and step 211 in the fingerprint recognition method shown in FIG. 2A and FIG. 2B.

The authentication unit 34 is configured to support the terminal device in performing step 207 in the fingerprint recognition method shown in FIG. 2A and FIG. 2B.

Figure 38:
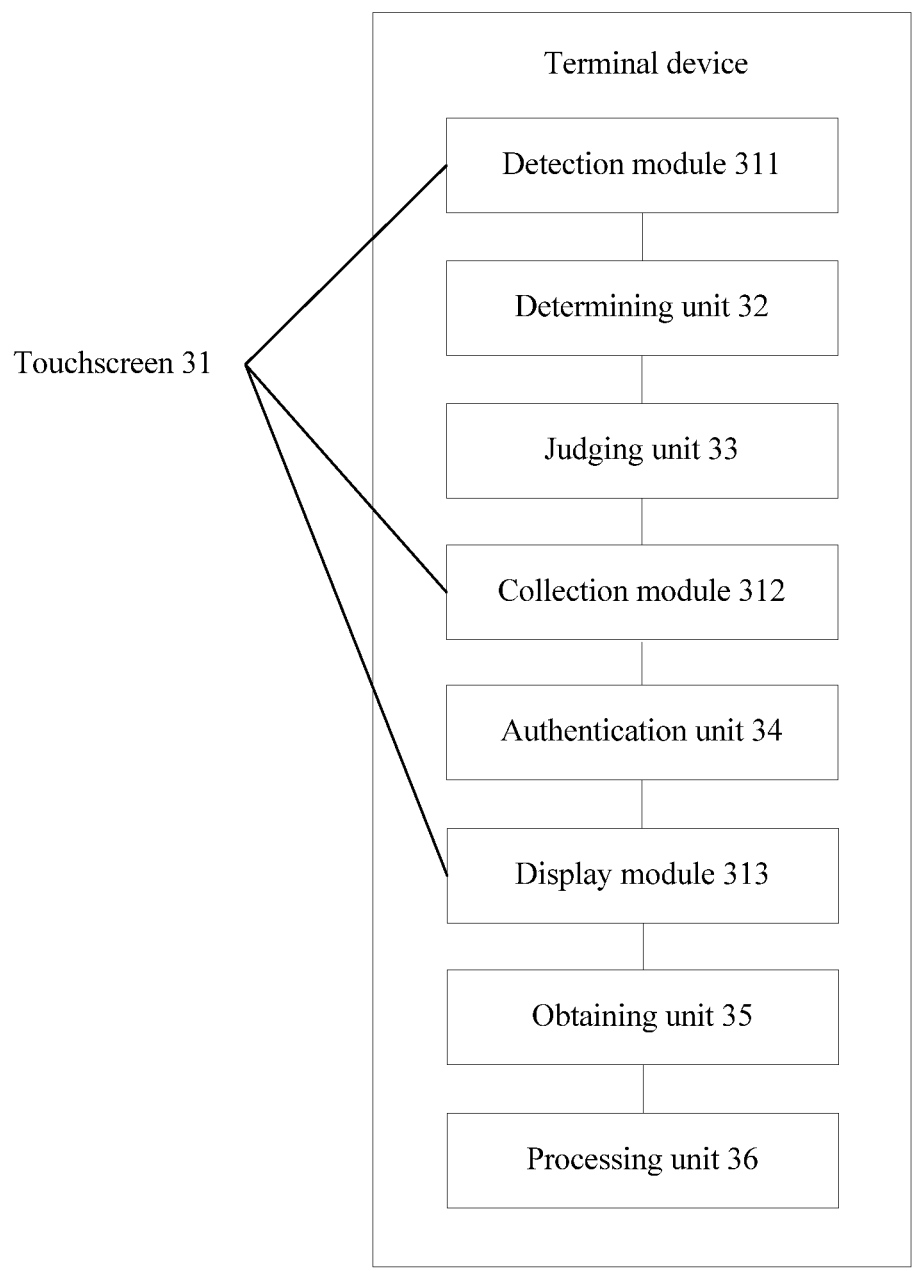
FIG. 38 is a schematic diagram of composition of another terminal device according to an embodiment of the present invention.

In this embodiment of the present invention, further, as shown in FIG. 38, the touchscreen 31 may further include a display module 313, and the terminal device may further include an obtaining unit 35 and a processing unit 36.

The display module 313 is configured to support the terminal device in performing step 203 and step 208 in the fingerprint recognition method shown in FIG. 2A and FIG. 2B.

The obtaining unit 35 is configured to support the terminal device in performing step 204 and step 209 in the fingerprint recognition method shown in FIG. 2A and FIG. 2B.

The processing unit 36 is configured to support the terminal device in performing step 212 and step 213 in the fingerprint recognition method shown in FIG. 2A and FIG. 2B.

It should be noted that all related content of steps in the foregoing method embodiments may be cited in function descriptions of corresponding function modules. Details are not further described herein again.

The terminal device provided in this embodiment of the present invention is configured to perform the foregoing fingerprint recognition method, so that an effect that is the same as that in the foregoing fingerprint recognition method can be achieved.

Figure 39:
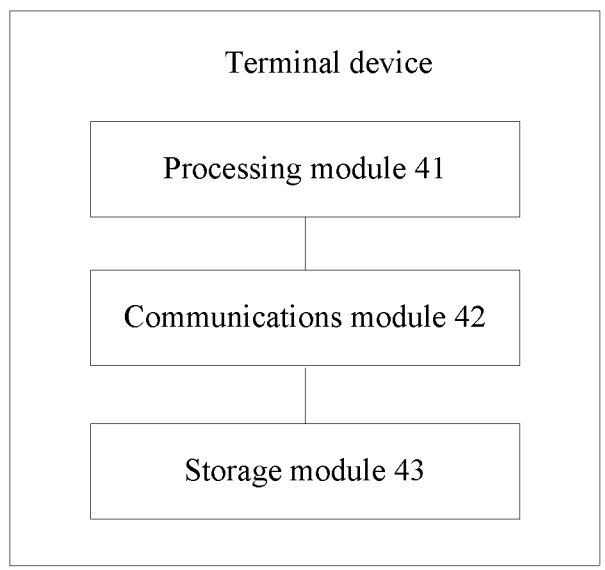
FIG. 39 is a schematic diagram of composition of another terminal device according to an embodiment of the present invention.

When an integrated unit is used, FIG. 39 shows another possible schematic diagram of composition of a terminal device in the foregoing embodiments. As shown in FIG. 39, the terminal device includes a processing module 41 and a communications module 42.

The processing module 41 is configured to control and manage an action of the terminal device. For example, the processing module 41 is configured to support the terminal device in performing step 201, step 202, step 203, step 204, step 205, step 206, step 207, step 208, step 209, step 210, step 211, step 212, and step 213 in FIG. 2A and FIG. 2B, and/or another process of the technology described in this specification. The communications module 42 is configured to support the terminal device in communicating with another network entity. The terminal device may further include a storage module 43, configured to store program code and data of the terminal device.

The processing module 41 may be a processor or a controller. It may implement or execute various examples of logical blocks, modules, and circuits that are described with reference to the contents disclosed in the present invention. The processor may also be a combination of computing functions, for example, a combination of one or more microprocessors or a combination of a digital signal processor (Digital Signal Processor, DSP) and a microprocessor. The communications module 42 may be a transceiver, a transceiver circuit, a communications interface, or the like. The storage module 43 may be a memory.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely specific embodiments of the present invention, but are not intended to limit the protection scope of the present invention. Any variation or replacement disclosed in the present invention shall fall within the protection scope of the present invention. Therefore, the protection scope of the present invention shall be subject to the protection scope of the claims.

What is claimed is:

1. A method, comprising:
    when a first touch operation performed by a user on a touchscreen of a terminal device is detected, determining, by the terminal device, an object in an area corresponding to the first touch operation as a touch object, wherein the touchscreen has a fingerprint recognition function;
    determining, by the terminal device, whether the touch object is comprised in a preset whitelist, wherein the whitelist comprises at least one object that supports fingerprint authentication;
    when it is determined that the touch object is comprised in the whitelist, collecting, by the terminal device, fingerprint information of the user using the touchscreen;
    performing, by the terminal device, fingerprint authentication using the fingerprint information;
    in response to the fingerprint information being authenticated using a fingerprint, obtaining, by the terminal device based on a pre-stored correspondence between the fingerprint information and authentication information, the authentication information corresponding to the fingerprint information;
    determining, by the terminal device based on a pre-stored correspondence between the authentication information and an authentication level, the authentication level corresponding to the authentication information, wherein the authentication level is a first level or a second level; and
    performing an operation corresponding to the authentication information by:
        in response to the authentication level corresponding to the authentication information being the first level, performing, by the terminal device, the operation corresponding to the authentication information; and
        in response to the authentication level corresponding to the authentication information being the second level, obtaining, by the terminal device, an authentication operation of the user, determining whether the authentication operation of the user meets an authentication confirmation condition, and when the authentication operation of the user meets the authentication confirmation condition, performing the operation corresponding to the authentication information.

2. The method according to claim 1, further comprising:
    when it is determined that the touch object is not comprised in the whitelist, displaying, by the terminal device, first prompt information, wherein the first prompt information prompts the user that the touch object does not support the fingerprint authentication.

3. The method according to claim 1, wherein before collecting, by the terminal device, the fingerprint information of the user using the touchscreen, the method further comprises:
    obtaining, by the terminal device, a first touch gesture of the user, wherein the first touch gesture is a gesture used when the user performs the first touch operation on the touchscreen; and
    wherein collecting, by the terminal device, the fingerprint information of the user using the touchscreen comprises:
    when determining that the first touch gesture is an authentication gesture, collecting, by the terminal device, the fingerprint information using the touchscreen, wherein the authentication gesture triggers the collection of the fingerprint information.

4. The method according to claim 3, wherein the first touch gesture comprises a pressure recognition gesture, a long-press gesture, an area change gesture, a multi-touch gesture, a sliding gesture, a double-press gesture, a double-tap gesture, a tangential gesture, or a specified area gesture.

5. The method according to claim 1, wherein obtaining, by the terminal device, the authentication operation of the user, determining whether the authentication operation of the user meets the authentication confirmation condition, and when the authentication operation of the user meets the authentication confirmation condition, performing the operation corresponding to the authentication information, comprises:
    when a second touch operation performed by the user on the touchscreen is detected, obtaining, by the terminal device, a second touch gesture of the user, wherein the second touch gesture is a gesture used when the user performs the second touch operation on the touchscreen;
    determining, by the terminal device, whether the second touch gesture is an authentication confirmation gesture; and
    when it is determined that the second touch gesture is the authentication confirmation gesture, performing the operation corresponding to the authentication information.

6. The method according to claim 5, wherein the second touch gesture comprises a pressure recognition gesture, a long-press gesture, an area change gesture, a multi-touch gesture, a sliding gesture, a double-press gesture, a double-tap gesture, a tangential gesture, or a specified area gesture.

7. The method according to claim 1, wherein obtaining, by the terminal device, the authentication operation of the user, determining whether the authentication operation of the user meets an authentication confirmation condition, and when the authentication operation of the user meets the authentication confirmation condition, performing the operation corresponding to the authentication information, comprises:
    determining, by the terminal device, whether a cancellation operation of the user is detected within a preset time period; and
    when no cancellation operation of the user is detected within the preset time period, performing the operation corresponding to the authentication information.

8. The method according to claim 1, wherein the authentication information comprises: a login account and password, a payment password, an unlocking password, an encryption password, a decryption password, or a function instruction.

9. The method according to claim 1, further comprises:
    when the fingerprint information fails to be authenticated using a fingerprint, displaying, by the terminal device, second prompt information, wherein the second prompt information prompts the user that the fingerprint information does not match.

10. The method according to claim 1, wherein the touch object comprises an application or a screen area.

11. A terminal device, comprising:
    at least one processor;
    a non-transitory memory; and
    a touchscreen;
    wherein the non-transitory memory is configured to store an instruction; and
    wherein the processor is configured to invoke the instruction stored in the non-transitory memory, to cause the terminal device to perform the following operations:
        when a first touch operation performed by a user on the touchscreen of the terminal device is detected, determining an object in an area corresponding to the first touch operation as a touch object, wherein the touchscreen has a fingerprint recognition function;
        determining whether the touch object is comprised in a preset whitelist, wherein the whitelist comprises at least one object that supports fingerprint authentication;
        when it is detected that the touch object is comprised in the whitelist, collecting fingerprint information of the user using the touchscreen;
        performing fingerprint authentication using the fingerprint information;
        in response to the fingerprint information being authenticated using a fingerprint, obtaining, based on a pre-stored correspondence between the fingerprint information and authentication information, the authentication information corresponding to the fingerprint information;
        determining, based on a pre-stored correspondence between the authentication information and an authentication level, the authentication level corresponding to the authentication information, wherein the authentication level is a first level or a second level; and
        performing an operation corresponding to the authentication information by:
            in response to the authentication level corresponding to the authentication information being the first level, performing the operation corresponding to the authentication information; and
            in response to the authentication level corresponding to the authentication information being the second level, obtaining an authentication operation of the user, determining whether the authentication operation of the user meets an authentication confirmation condition, and when the authentication operation of the user meets the authentication confirmation condition, performing the operation corresponding to the authentication information.

12. The terminal device according to claim 11, wherein the touchscreen is configured to:
    when it is determined that the touch object is not comprised in the whitelist, display first prompt information, wherein the first prompt information prompts the user that the touch object does not support the fingerprint authentication.

13. The terminal device according to claim 11, wherein the processor is configured to invoke the instruction stored in the non-transitory memory, to further cause the terminal device to perform the following operations:
    before collecting the fingerprint information of the user, obtaining a first touch gesture of the user, wherein the first touch gesture is a gesture used when the user performs the first touch operation on the touchscreen; and
    wherein collecting the fingerprint information of the user comprises:
        when determining that the first touch gesture is an authentication gesture, the fingerprint information using the touchscreen, wherein the authentication gesture triggers the collection of the fingerprint information.

14. The terminal device according to claim 13, wherein the first touch gesture comprises a pressure recognition gesture, a long-press gesture, an area change gesture, a multi-touch gesture, a sliding gesture, a double-press gesture, a double-tap gesture, a tangential gesture, or a specified area gesture.

* * * * *